(12) United States Patent
Bartel

(10) Patent No.: US 9,327,632 B1
(45) Date of Patent: May 3, 2016

(54) TRANSLATING CARGO BED

(71) Applicant: Excel Industries, Inc., Hesston, KS (US)

(72) Inventor: Harlan John Bartel, North Newton, KS (US)

(73) Assignee: Excel Industries, Inc., Hesston, KS (US)

( * ) Notice: Subject to any disclaimer, the term of this patent is extended or adjusted under 35 U.S.C. 154(b) by 0 days.

(21) Appl. No.: 14/260,810

(22) Filed: Apr. 24, 2014

Related U.S. Application Data

(63) Continuation-in-part of application No. 13/368,808, filed on Feb. 8, 2012, now Pat. No. 8,708,400, which is a continuation-in-part of application No. 12/657,937, filed on Jan. 29, 2010, now Pat. No. 8,157,316.

(60) Provisional application No. 61/206,418, filed on Jan. 30, 2009.

(51) Int. Cl.
*B60P 1/04* (2006.01)
*B60P 1/34* (2006.01)

(52) U.S. Cl.
CPC .................................. *B60P 1/34* (2013.01)

(58) Field of Classification Search
USPC ......... 414/500, 498, 477, 478, 480, 812, 914; 298/14, 22 P, 11, 12; 296/183.2, 35.3, 296/26.08, 37.6
See application file for complete search history.

(56) References Cited

U.S. PATENT DOCUMENTS

| | | | |
|---|---|---|---|
| 1,650,815 A | 11/1927 | Barrett | |
| 2,732,960 A | 1/1956 | Nilson | |
| 2,867,339 A * | 1/1959 | Nelson | 414/494 |
| 3,195,248 A * | 7/1965 | Martin | 37/442 |
| 3,351,220 A | 11/1967 | Kirkbride | |
| 3,356,240 A | 12/1967 | Zink | |
| 3,399,795 A * | 9/1968 | Clucker et al. | 414/500 |
| 3,688,926 A | 9/1972 | Stefanelli | |
| 3,902,616 A | 9/1975 | Santic et al. | |
| 4,147,263 A | 4/1979 | Frederick et al. | |
| 4,230,359 A | 10/1980 | Smith | |
| 4,325,668 A | 4/1982 | Julian et al. | |
| 4,359,137 A | 11/1982 | Merz et al. | |
| 4,456,093 A | 6/1984 | Finley et al. | |
| 4,460,246 A | 7/1984 | Peel | |
| 4,540,032 A | 9/1985 | Pelletier et al. | |
| 4,558,758 A | 12/1985 | Littman et al. | |
| 4,671,729 A | 6/1987 | McFarland | |
| 4,673,328 A | 6/1987 | Shiels | |

(Continued)

OTHER PUBLICATIONS

Sales brochure for the TEREX(R), TA2E, TA2SE Power Tip/Swivel Elevating Site Dumpers, Publication Date Nov. 13, 2007 (2 pages).

(Continued)

*Primary Examiner* — Glenn Dayoan
*Assistant Examiner* — Sunsurraye Westbrook

(57) ABSTRACT

A vehicle includes a vehicle frame, a plurality of wheels and a cargo bed assembly. A cargo bed translation mechanism is operable between the vehicle frame and the cargo bed to translate the cargo bed between a range of positions including a first transport position, a plurality of raised position a variety of loading positions. A cargo bed dumping mechanism is operable for tipping the cargo bed to dump the contents of the cargo bed at least from the transport position and the raised positions.

5 Claims, 54 Drawing Sheets

(56) References Cited

U.S. PATENT DOCUMENTS

| | | | |
|---|---|---|---|
| 4,676,339 A | | 6/1987 | Rybka et al. |
| 4,750,855 A | * | 6/1988 | Anderson ............ 414/498 |
| 4,909,700 A | | 3/1990 | Fontecchio et al. |
| 4,951,999 A | | 8/1990 | Rudolph et al. |
| 4,966,242 A | | 10/1990 | Baillargeon |
| 4,968,096 A | | 11/1990 | Chattin |
| 5,035,462 A | | 7/1991 | Page et al. |
| 5,106,257 A | | 4/1992 | Braud et al. |
| 5,249,642 A | | 10/1993 | Kishi |
| 5,253,973 A | | 10/1993 | Fretwell |
| 5,364,224 A | | 11/1994 | Padgett |
| 5,427,495 A | | 6/1995 | Vlaanderen |
| 5,470,188 A | | 11/1995 | Ebato |
| 5,584,637 A | * | 12/1996 | Jensen, Sr. ............ 414/24.5 |
| 5,921,743 A | | 7/1999 | Slagter |
| 5,951,235 A | | 9/1999 | Hedstrom et al. |
| 5,975,830 A | | 11/1999 | Antrim et al. |
| 6,036,275 A | | 3/2000 | Hansen et al. |
| 6,050,769 A | | 4/2000 | Papalia et al. |
| 6,158,947 A | | 12/2000 | Goiran et al. |
| 6,224,161 B1 | | 5/2001 | Hansen et al. |
| 6,234,741 B1 | | 5/2001 | McDaniel |
| D459,368 S | | 6/2002 | Westendorf et al. |
| 6,409,457 B1 | | 6/2002 | Korycan et al. |
| 6,435,806 B1 | | 8/2002 | Rinderknecht |
| 6,688,837 B2 | | 2/2004 | Rinderknecht |
| 6,749,389 B1 | | 6/2004 | Vlaanderen |
| 6,789,829 B1 | | 9/2004 | Kapels |
| 6,817,677 B1 | | 11/2004 | Beiler |
| 6,817,825 B1 | | 11/2004 | O'Hagen |
| 6,910,544 B2 | | 6/2005 | Sewell |
| 6,916,142 B2 | | 7/2005 | Hansen et al. |
| 6,976,820 B2 | | 12/2005 | Sandy |
| 7,004,285 B2 | | 2/2006 | Bailey |
| 7,033,128 B2 | | 4/2006 | Poindexter |
| 7,037,062 B2 | | 5/2006 | Oliver |
| 7,055,878 B2 | | 6/2006 | Imhof |
| 7,182,173 B2 | | 2/2007 | Bailey |
| 7,189,048 B2 | | 3/2007 | Rinderknecht |
| 7,306,421 B2 | | 12/2007 | Wolfe |
| D572,277 S | | 7/2008 | Pinther et al. |
| 7,810,198 B2 | | 10/2010 | Sahr et al. |
| 8,322,966 B2 | | 12/2012 | Doskocil |
| 2003/0082037 A1 | | 5/2003 | Khodkov |
| 2004/156703 A1 | | 8/2004 | Benedikt |
| 2005/0220591 A1 | | 10/2005 | Doskocil |
| 2006/0033378 A1 | | 2/2006 | Sargent et al. |
| 2006/0119164 A1 | | 6/2006 | Keskin |
| 2007/0212205 A1 | | 9/2007 | Lowecki |
| 2008/0112786 A1 | | 5/2008 | Deist et al. |

OTHER PUBLICATIONS

Sales brochure for the Wacker Neuson All-wheel Dumper 1001, published in the year 2001 (2 pages).

* cited by examiner

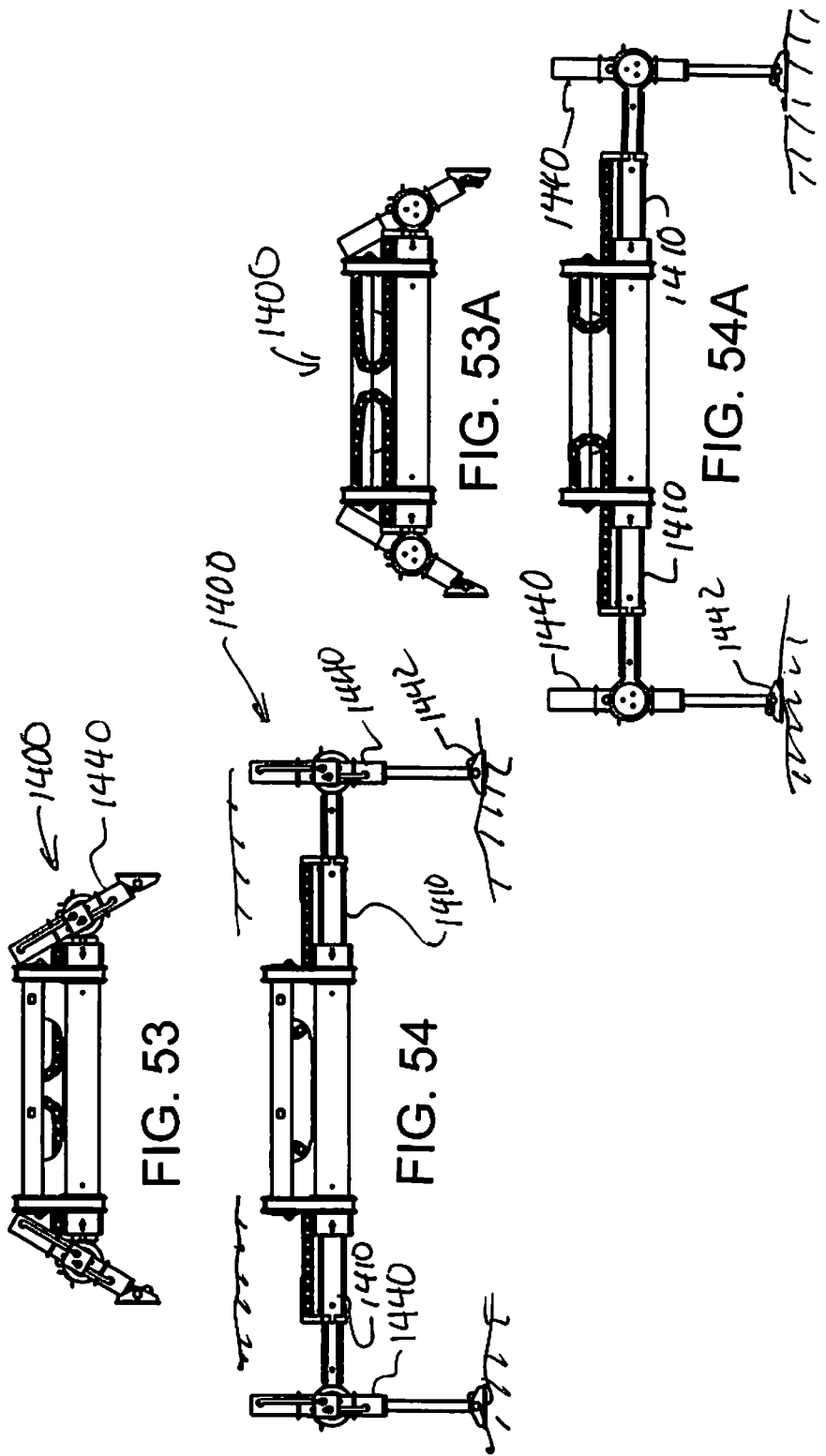

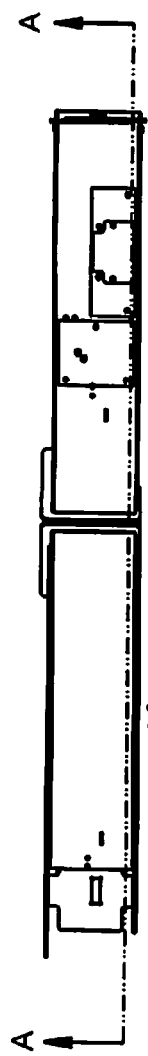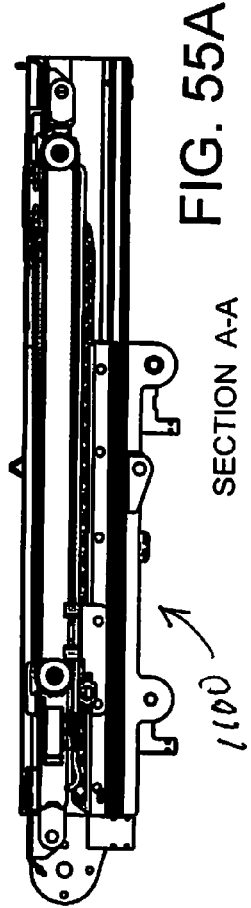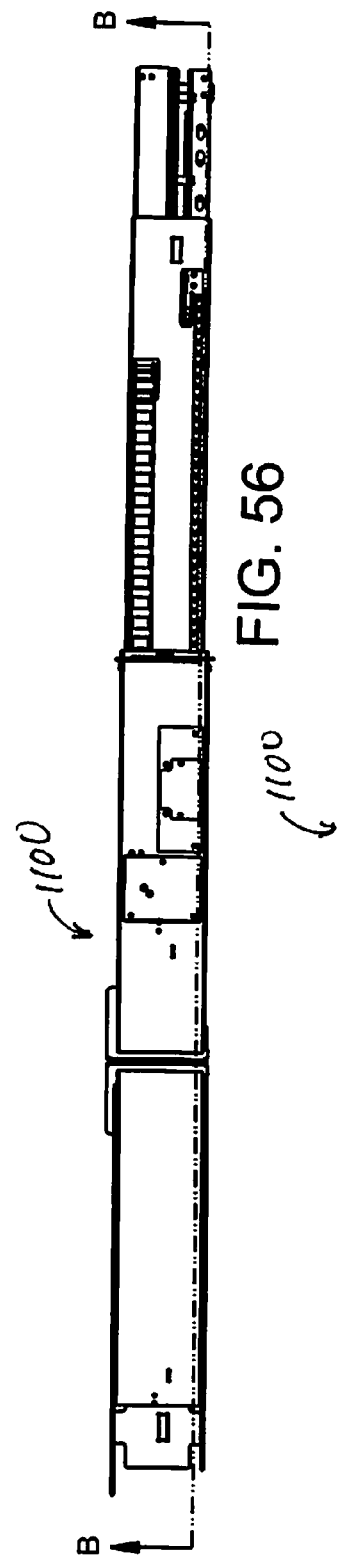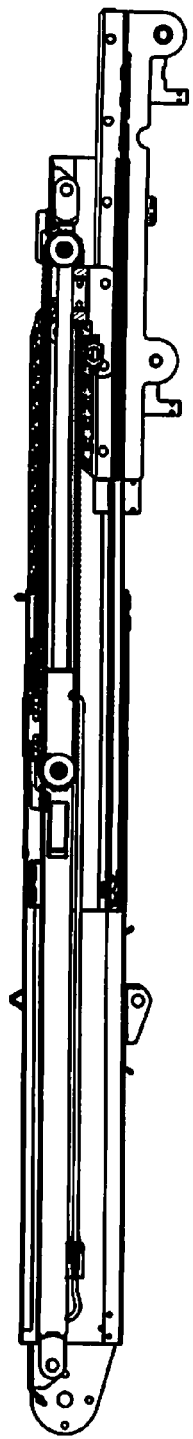

US 9,327,632 B1

TRANSLATING CARGO BED

RELATED APPLICATIONS

This application is a Continuation-in-Part of U.S. patent application Ser. No. 13/368,808 filed on Feb. 2, 2012 which is incorporated herein by reference.

Patent application Ser. No. 13/368,808 was a Continuation-in-Part of U.S. patent application Ser. No. 12/657,937 filed on Jan. 29, 2010 which is incorporated herein by reference.

U.S. patent application Ser. No. 12/657,937 claimed the benefit of U.S. Provisional Patent Application Ser. No. 61/206,418 filed on Jan. 30, 2009 which is also incorporated herein by reference.

FIELD OF THE INVENTION

This invention relates to a vehicle, and in particular a vehicle having a cargo bed which can be translated between a variety of positions.

SUMMARY OF THE INVENTION

The present translating cargo bed is intended for use with a vehicle includes a vehicle frame, a prime mover such as an engine, a plurality of wheels, including, for example, a pair of rear wheels. A cargo bed translation mechanism is operatively positioned between the vehicle frame and the cargo bed and is able to translate the cargo bed through a range of positions including a first transport position in which the cargo bed is securely supported for transport and a plurality of other positions.

A cargo bed sub-frame supports the cargo bed and is mounted to the translation mechanism. The cargo bed sub-frame is preferably adapted to receive the cargo bed in a sliding fashion so that the cargo bed may be removed and replaced as needed.

The cargo bed is pivotably mounted to the cargo bed sub-frame at the rear end of the cargo bed and a dump mechanism connecting between the cargo bed sub-frame and the cargo bed and is operable for rotating the cargo bed from a level cargo hauling position to a tilted dumping position in order to dump out the contents of the cargo bed.

An optional outrigger assembly may be added to the vehicle in order to stabilize the vehicle as the cargo bed is translated rearward toward the loading position. The outrigger assembly includes rear support members which, when deployed behind the rear wheels, contact the ground to stabilize the vehicle when the cargo bed is translated to the rear of the vehicle.

BRIEF DESCRIPTION OF THE DRAWINGS

FIG. 53 is a first rear view of a lateral stabilizer assembly for use with the forth embodiment translating cargo bed showing the stabilizer assembly in the refracted position.

FIG. 53A is a second rear view of the lateral stabilizer assembly for use with the forth embodiment translating cargo bed showing the stabilizer assembly in the retracted position shown with coverings removed to show internal components of the lateral stabilizer assembly.

FIG. 54 is a first rear view of the lateral stabilizer assembly for use with the forth embodiment translating cargo bed showing the stabilizer assembly in the extended position suitable for laterally stabilizing the vehicle.

FIG. 54A is a second rear view of the lateral stabilizer assembly for use with the forth embodiment translating cargo bed showing the stabilizer assembly in the extended position suitable for laterally stabilizing the vehicle shown with coverings removed to show internal components of the lateral stabilizer assembly.

FIG. 55 is a top view a telescoping arm in a retracted position.

FIG. 55A is a cut away side view a telescoping arm in the retracted position taken from plane A-A of FIG. 55.

FIG. 56 is a top view a telescoping arm in an extended position.

FIG. 56A is a cut away side view a telescoping arm in the extended position taken from plane A-A of FIG. 55.

DETAILED DESCRIPTION OF THE INVENTION

Figure 1:
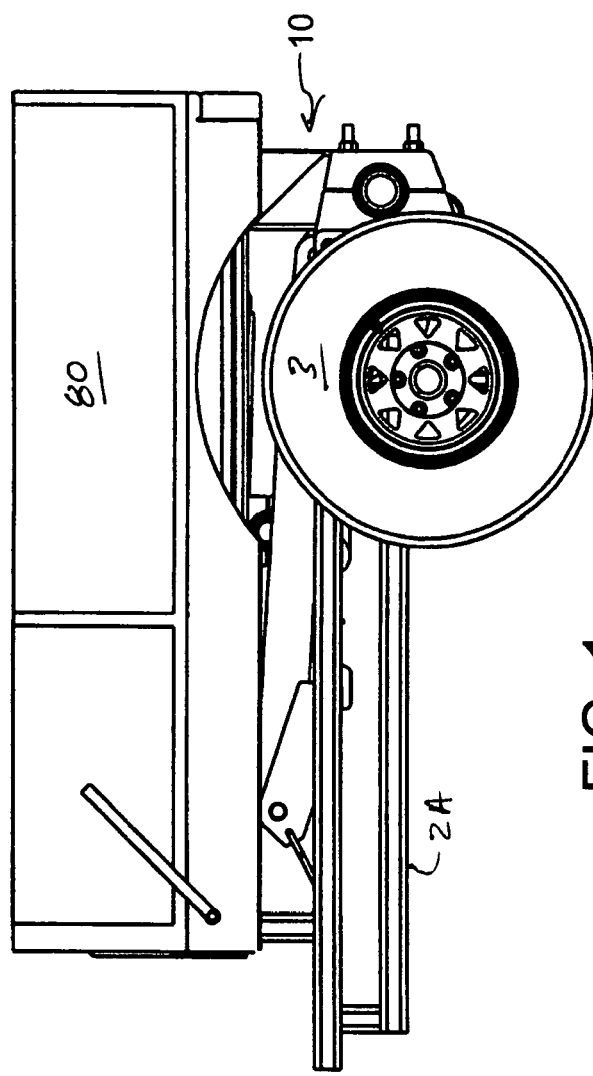
FIG. 1 is a side view of the rear portion of a vehicle with a cargo bed in a transport position.

Referring to the drawings, in FIG. 1 a vehicle frame 2A supports a cargo bed translation mechanism 10 which is connected to a cargo bed 80. Vehicle frame 2A is conventionally supported by a pair of opposite rear wheels 3. The remainder of the vehicle could be a utility vehicle used for grounds maintenance or light construction or the like and would typically include a seat for accommodating an operator, an engine, and appropriate controls for operating the vehicle.

Figure 2:
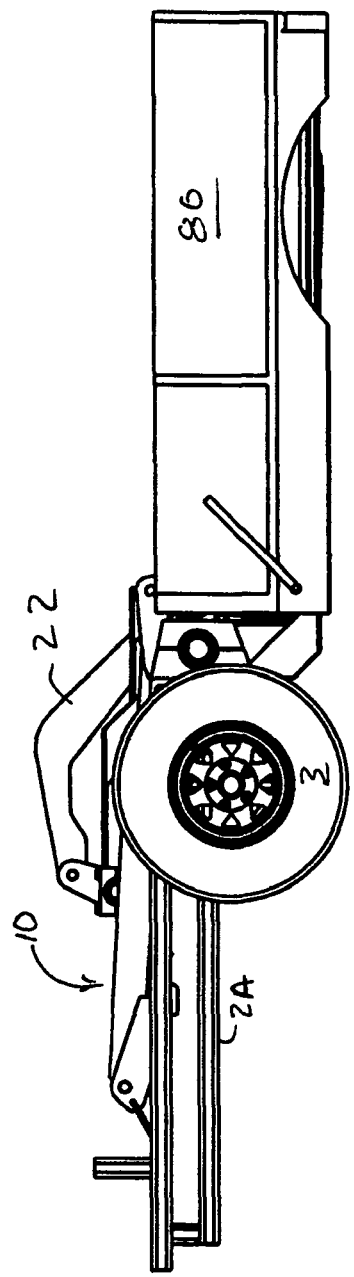
FIG. 2 is a side view of a the rear portion of a vehicle with a cargo bed in a loading position.
Figure 8:
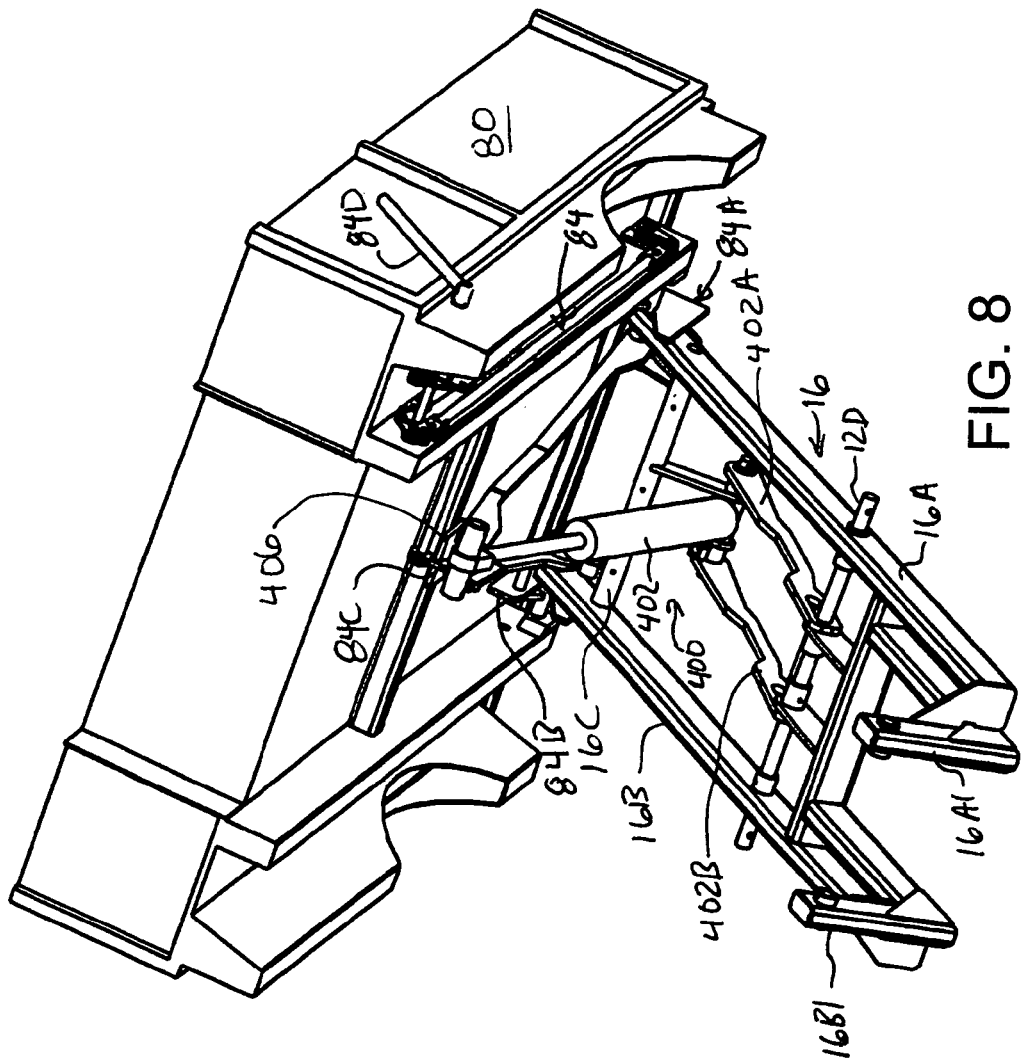
FIG. 8 is a perspective view showing the cargo bed sub-frame with the dump mechanism in the extended position and the cargo bed tilted up in a dumping position.
Figure 9:
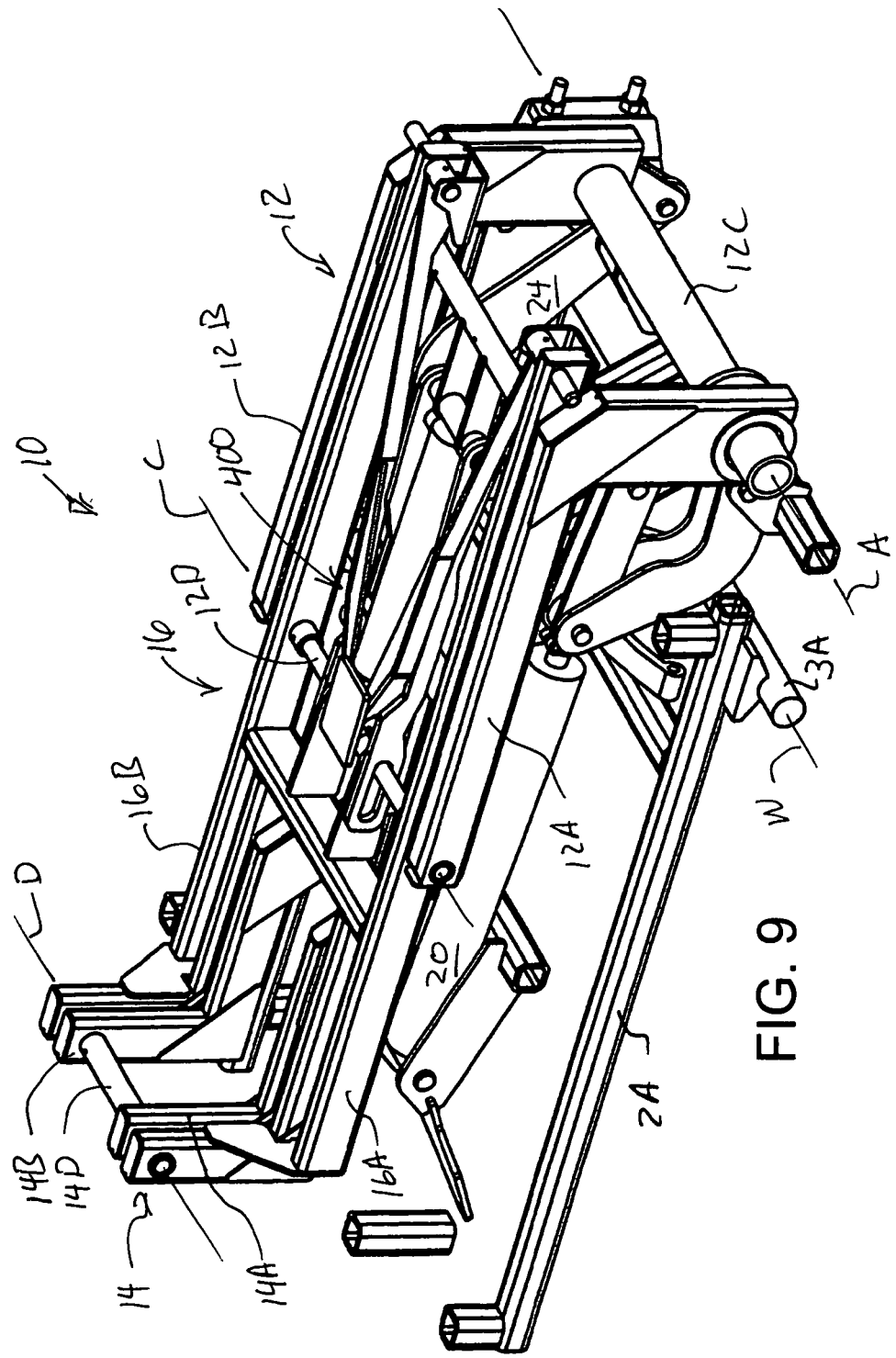
FIG. 9 is a perspective view of the translation mechanism in the transport position.

In the embodiment shown in FIGS. 1-13, translation mechanism 10 includes a parallel linkage structure which supports cargo bed 80. The purpose of translation mechanism 10 is to translate cargo bed 80, for example, between a transport position as shown in FIG. 1 and a loading position as shown in FIG. 2 as well as to translate cargo bed 80 to intermediate positions there between. When in a transport position, cargo bed 80 is generally level and preferably located such that the center of gravity of cargo bed 80 and its contents, if any, are located forward of the center of rear wheels 3 or axle W of vehicle 2 as shown in FIGS. 1 and 9. When in a loading position, for example as shown in FIG. 2, cargo bed 80 is translated so that it is at rest on the ground or at least supported near ground level preferably behind rear wheels 3.

Figure 10:
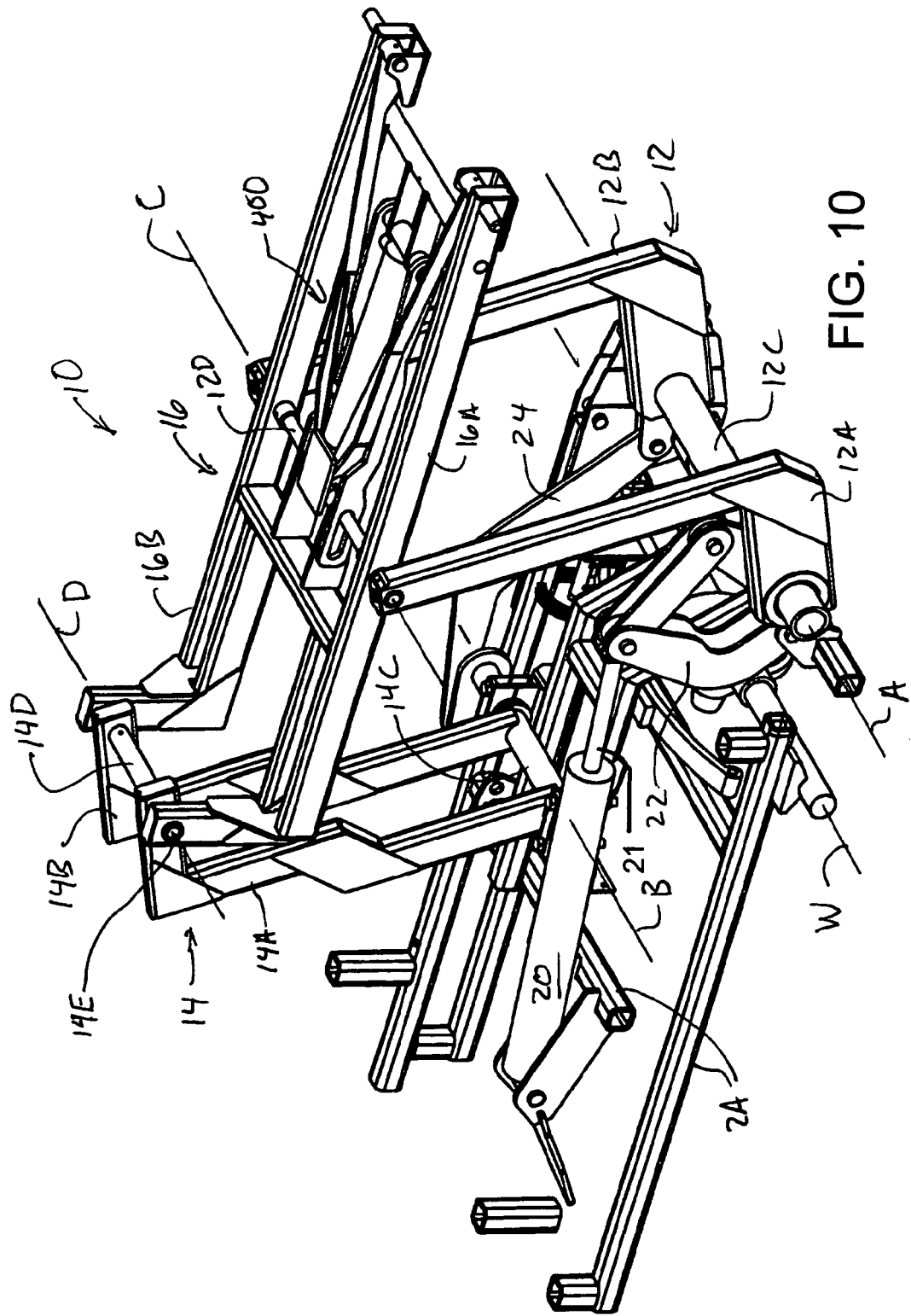
FIG. 10 is a perspective view showing the translation mechanism partially extended from the transport position.
Figure 11:
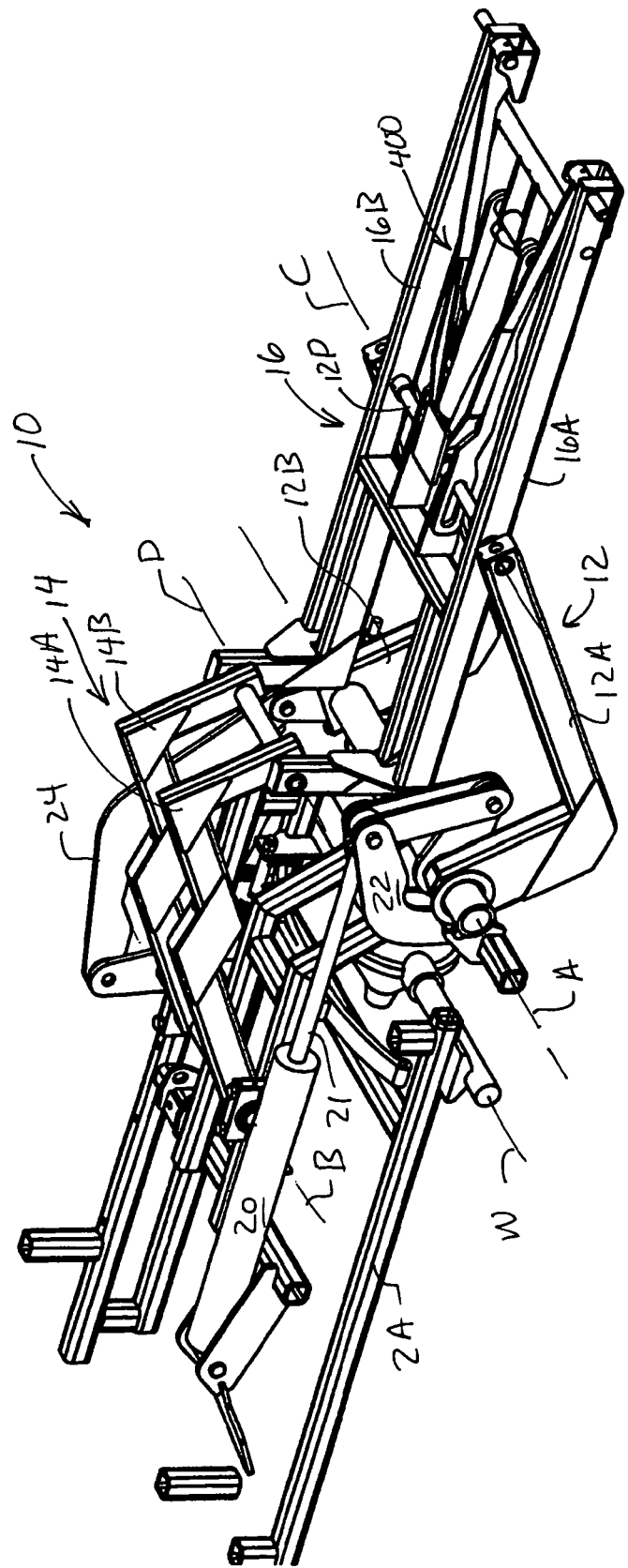
FIG. 11 is a perspective view showing the translation mechanism extended mostly toward the loading position.
Figure 12:
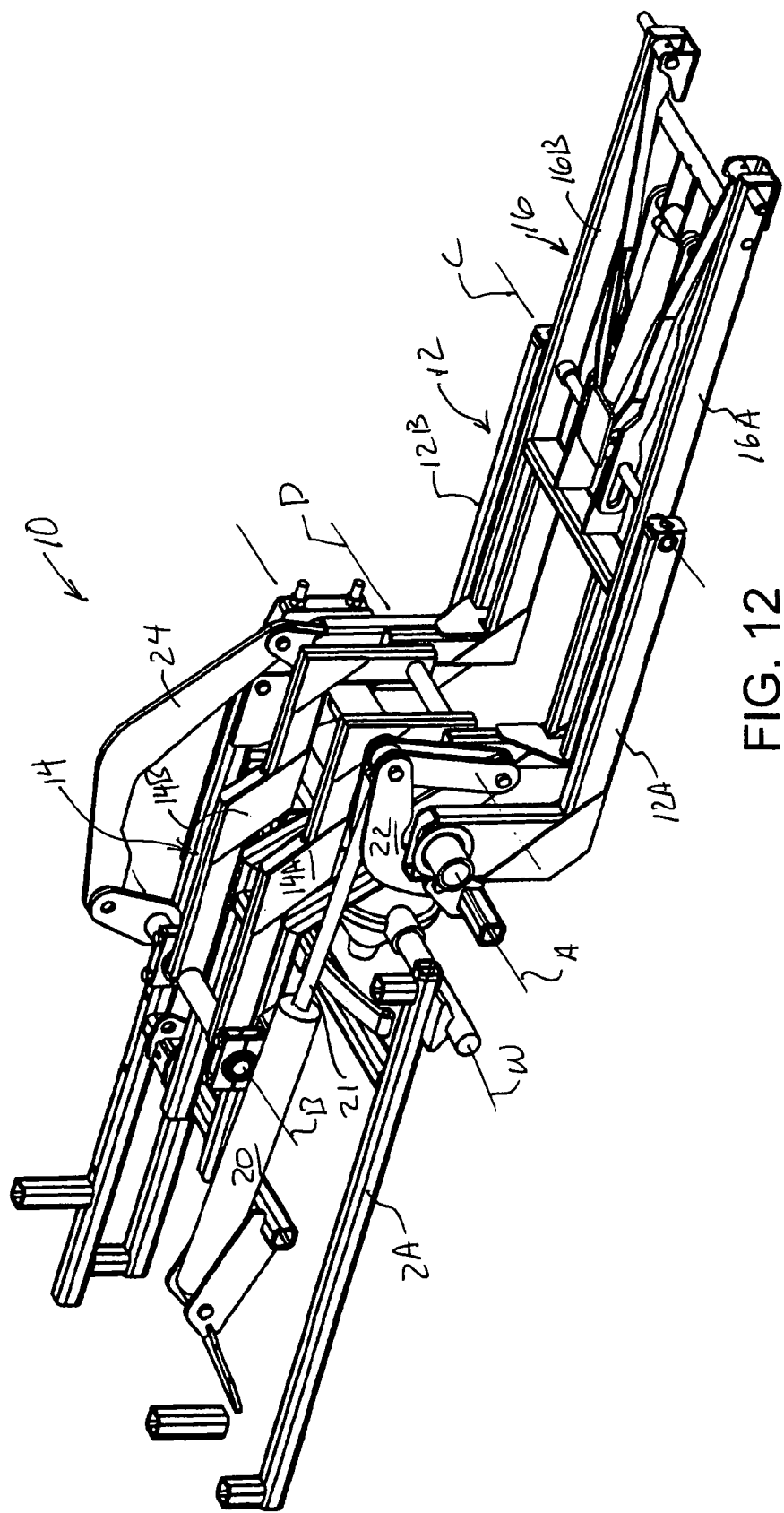
FIG. 12 is a perspective view showing the translation mechanism fully extended in the loading position.

The movement of translation mechanism 10 between the transport position shown in FIG. 1 and the position shown in FIG. 2 can be best understood by referring to FIGS. 9-12 wherein much of the vehicle body has been removed for clarity. An axle 3A for mounting rear wheel 3 is shown in FIGS. 9-12 without the wheels for clarity. As can be best seen in FIG. 10, translation mechanism 10 includes a rear pivot frame 12, a forward pivot frame 14, a cargo-bed sub-frame 16 and an actuator 20. As can be seen in FIG. 10, rear pivot frame 12 and forward pivot frame 14 are pivotably mounted at their respective proximate ends to vehicle frame 2A for rotation about axes A and B respectively. Axes A and B are generally horizontal, transverse, parallel to each other and spaced away from each other in a longitudinal direction. Rear pivot frame 12 and forward pivot frame 14 are also pivotably joined at their respective distal ends to cargo bed sub-frame 16 for rotation about axes C and D respectively. Axes C and D are fixed relative to cargo bed sub-frame 16, are also generally horizontal and transverse and are also spaced away from each other in a longitudinal direction. As can be further seen in FIG. 10, actuator 20 is operably positioned to connect between vehicle frame 2A and rear pivot frame 12 by a linkage assembly 22. In this example, actuator 20 is a hydraulic cylinder having a drive rod 21 which is connected with linkage assembly 22 to smoothly rotate rear pivot frame 12 around axis A through a range of motion. Also, in this example, a stabilizer link 24 connects between crank arms 24A and 24B which extend from 12C and 14C, respectively, and which together stabilize translation mechanism 10. Thus, in order to translate cargo bed sub-frame 16 from a transport position shown in FIG. 9, through intermediate positions shown in FIGS. 10 and 11, to a loading position shown in FIG. 12, actuator 20 is activated to cause the simultaneous rotation of rear pivot frame 12 and forward pivot frame 14 about their respective axes A and B.

As noted above, rear pivot frame 12, which can be best seen in FIG. 10, may be considered as single frame that is pivotably mounted to vehicle frame 2A for rotation about axis A. In this example, rear pivot frame 12 includes a left side member 12A, a right side member 12B, a transverse base tube 12C and a transverse end shaft 12D. The proximate ends of left side member 12A and right side member 12B are preferably fixed to base tube 12C. Base tube 12C rotates relative to vehicle frame 2A about horizontal transverse axis A. Transverse end shaft 12D extends between the distal ends of left side member 12A and right side member 12B and rotates about axis C. In order to define a rigid frame, it is preferable to fix the opposite ends of end shaft 12D to the respective distal ends of left and right side members 12A and 12B. In this example, left side member 12A and right side member 12B are generally L shaped in order to clear various structures of vehicle frame 2A. This configuration is advantageous in this example so that translation mechanism 10 occupies a minimum volume when it is in the transport position.

Forward pivot frame 14 may also be considered as single frame which is pivotably mounted to vehicle frame 2A for rotation about axis B. In this example, forward pivot frame 14 includes a left side member 14A, a right side member 14B, a transverse base tube 14C and a transverse end shaft 14D. The proximate ends left side member 14A and right side member 14B are preferably fixed to base tube 14C. Base tube 14C is preferably adapted for rotating on a shaft (not shown) which is fixed to vehicle frame 2A. Transverse end shaft 14D extends between the distal ends of left side member 14A and right side member 14B and is arranged to rotate around axis D. In order to define a rigid frame, it is preferable to weld or otherwise fix or fasten the opposite ends of end shaft 14D to the respective distal ends of left and right side members 14A and 14B. As was the case with rear pivot frame 12, in this example, in order to clear various structures of vehicle frame 2A, left side member 14A and right side member 14B of forward pivot frame 14 are generally L shaped and include a first portion and a second portion. The second portions of left and right side members 14A and 14B are upright when translation mechanism 10 is in the transport position shown in FIG. 9. The first portions of left and right side members 14A and 14B are longer than the second portions and are also jogged to clear portions of vehicle frame 2A. The first portions of left and right side members 14A and 14B are generally horizontal when translation mechanism 10 is in the transport position shown in FIG. 9.

Figure 7:
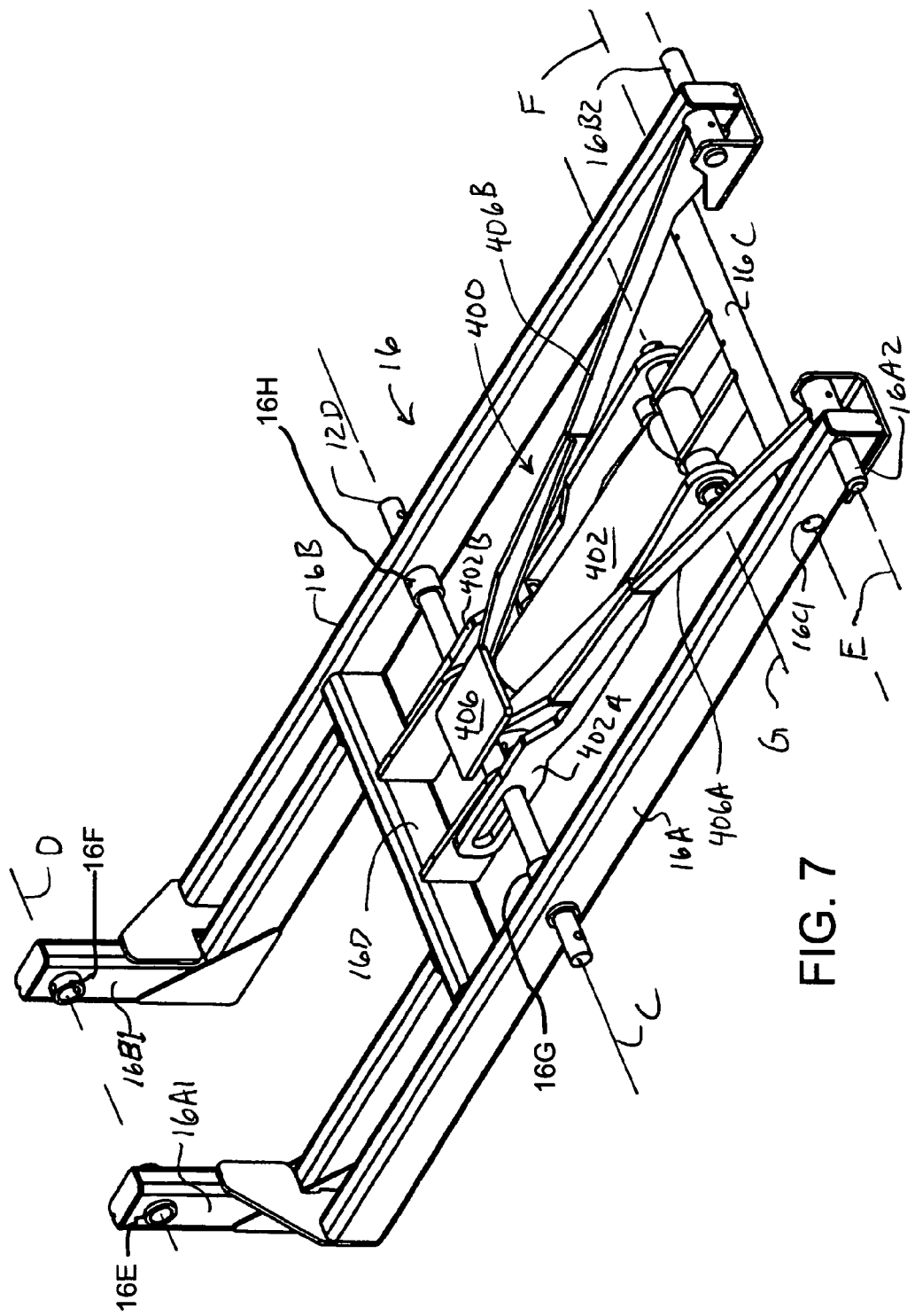
FIG. 7 is a perspective of the cargo bed sub-frame with the cargo bed removed showing the dump mechanism in a refracted position.

Cargo bed sub-frame 16 is shown in isolation in FIG. 7. In this example, cargo bed sub-frame 16 is a rigid frame and the various components of sub-frame 16 are generally oriented in a horizontal plane. Sub-frame 16 includes two longitudinal beam assemblies 16A and 16B that are interconnected by a transverse tube 16C at one end and a transverse member 16D mounted toward the opposite end. Transverse tube 16C is mounted for rotation about axis F on a transverse shaft 16C1 that is welded or otherwise fixed to sub-frame 16 between beam assemblies 16A and 16B. Longitudinal beam assemblies 16A and 16B further include upright end members 16A1 and 16B1 which further include concentric bushings 16E and 16F adapted for receiving end shaft 14D of forward pivot frame 14. Although end shaft 12D of rear pivot frame 12 is not a part of cargo bed sub-frame 16, it is nevertheless shown in FIG. 7 as being received by two bushings 16G and 16H mounted in opposite longitudinal beam assemblies 16A and 16B. When cargo bed sub-frame 16 is translated as shown in FIGS. 9-12, it remains substantially level. Cargo bed sub-frame 16 remains level, as is the case with a parallel linkage, because ideally, the distance between axes A and C is constant and is equal to the distance between axes B and D which is also constant, and the distance between axes C and D is constant and is equal to the distance between axes A and B which is also constant.

As noted above, cargo bed sub-frame 16 is adapted for receiving and supporting cargo bed 80 as shown in FIGS. 1 and 2. Accordingly, longitudinal beam assemblies 16A and 16B of sub-frame 16 present two horizontally extending pins 16A2 and 16B2 located at the back end of sub-frame 16 that are adapted for receiving corresponding latch elements associated with cargo bed 80. Pins 16A2 and 16B2 are centered on a horizontal, transverse axis E shown in FIG. 7. Once cargo bed 80 is positioned so that its latches engage pins 16A2 and 16B2 it is possible to tilt cargo bed 80 about axis E through a range of positions between a cargo hauling position shown in FIG. 1 and a cargo dumping position shown in FIG. 8. As can be seen in FIG. 8, cargo bed 80 includes a latching mechanism 84 for engaging cargo bed sub-frame 16. In this example, the latching mechanism has three latches, left and right latch plates 84A and 84B and forward latch plate 84C. Left and right latch plates 84A and 84B are adapted to receive pins 16A2 and 16B2 extending laterally from the back end of cargo bed sub-frame 16 when cargo bed 80 is slid forward onto sub-frame 16. Forward latch plate 84C is oriented vertically and has a notch for receiving a generally horizontally oriented actuator plate 406 which is associated with dump mechanism 400 and which will be described in greater detail below. When a latch mechanism handle 84D is placed in a latching position, latch plate 84C engages actuator plate 406 and latch plates 84A and 84B capture and receive pins 16A2 and 16B2 thus securing cargo-bed 80 to cargo sub-frame 16.

A particularly useful feature of this cargo bed system is that cargo bed 80 may be tilted to the dumping position shown in FIG. 8 even when cargo bed 80 is not in the transport position shown in FIG. 1. For example, cargo bed 80 may be tilted to dump its contents when translation mechanism 10 is in the raised position shown in FIG. 10. This capability would be useful for dumping cargo bed contents over an obstacle into an enclosed area or into the bed of another vehicle such as a pick-up truck. As can be best seen in FIGS. 8 and 9, a dump mechanism 400, mounted to cargo bed sub-frame 16 operates to tilt cargo bed 80 from a cargo hauling position shown in FIG. 1 to a raised cargo dumping position shown in FIG. 8. Dump mechanism 400 includes an actuator 402 that moves between a retracted position shown in FIG. 7 and an extended position shown in FIG. 8. Actuator 402 in this example is a hydraulic cylinder including a drive rod 402D. As can be best seen in FIG. 7, the proximate end of actuator 402 is pivotably mounted for rotation about axis G to the distal ends of a pair of members that extend away from transverse tube 16C. Transverse tube 16C, as noted above, pivots about axis F. A pair of straps 402A and 402B pivotably engage the proximate end of actuator 402 for rotation about axis G and slidably engage end shaft 12D of rear pivot frame 12. A second pair of straps 406A and 406B shown in FIG. 7 which are pivotably mounted to sub-frame 16 for rotation about axis E laterally stabilize actuator plate 406 which is mounted to the end of drive rod 402D of actuator 402. Thus, as drive rod 402D of actuator 402 extends, the proximate end of actuator 402 drops as tube 16C rotates counter clockwise as viewed from the vantage point of FIG. 7. This provides leverage for actuator 402 as it continues to extend. Thus, as drive rod 402D of actuator 402 continues to extend, actuator plate 406 is raised which causes cargo bed 80 to pivot about axis E between the level cargo hauling position of FIG. 1 to the tilted cargo dumping position shown in FIGS. 5, 6 and 8.

In this embodiment, a "cargo bed" is merely one of number of useful structures that can be mounted to cargo bed sub-frame 16. For example, cargo bed 80 could be replaced by a unit for drilling fence post holes, or a unit having a tank for distributing fertilizer liquids, or an extendable scaffold structure having a scissors lift for use in construction. Thus the term "cargo bed" could be equated with a more general term such as "utility apparatus". Cargo bed 80 is adapted to be an interchangeable unit having standard mounting provisions for attaching to a cargo bed sub-frame as described above. Thus, cargo bed 80 may be interchanged with other cargo beds of the same configuration or even other cargo beds of different configurations adapted for specialized purposes. For example, one cargo bed may be designed for carrying lawnmowers or landscaping tools while another cargo bed may have a specialized design for carrying bulk materials such as mulch or soil. Still another cargo bed may be designed to carry brush or tree branches or any other form of carrier for general hauling or for specialized tasks. Accordingly, a family including a multitude of "cargo attachments" may be developed for use with cargo bed sub-frame 82.

Figure 3:
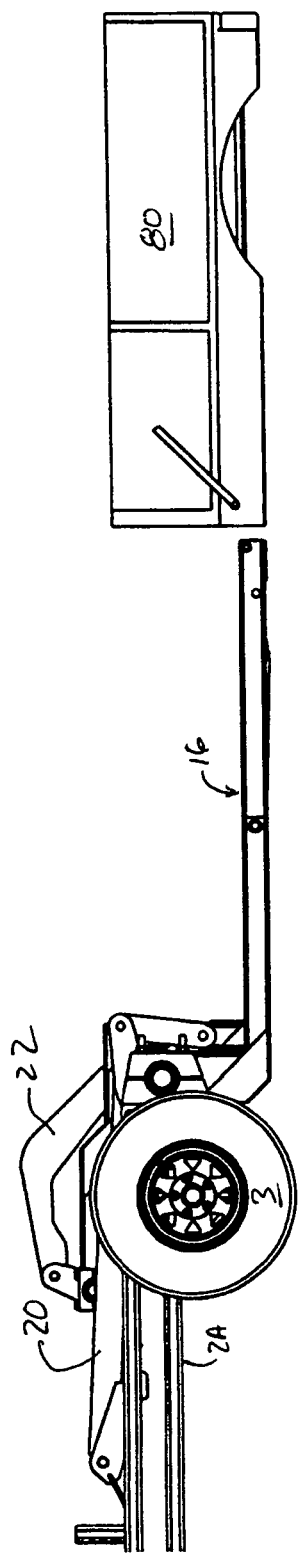
FIG. 3 is a side view of the rear portion of a vehicle with a cargo bed translation mechanism in a loading position and with the cargo bed separated from the cargo bed sub-frame.
Figure 4:
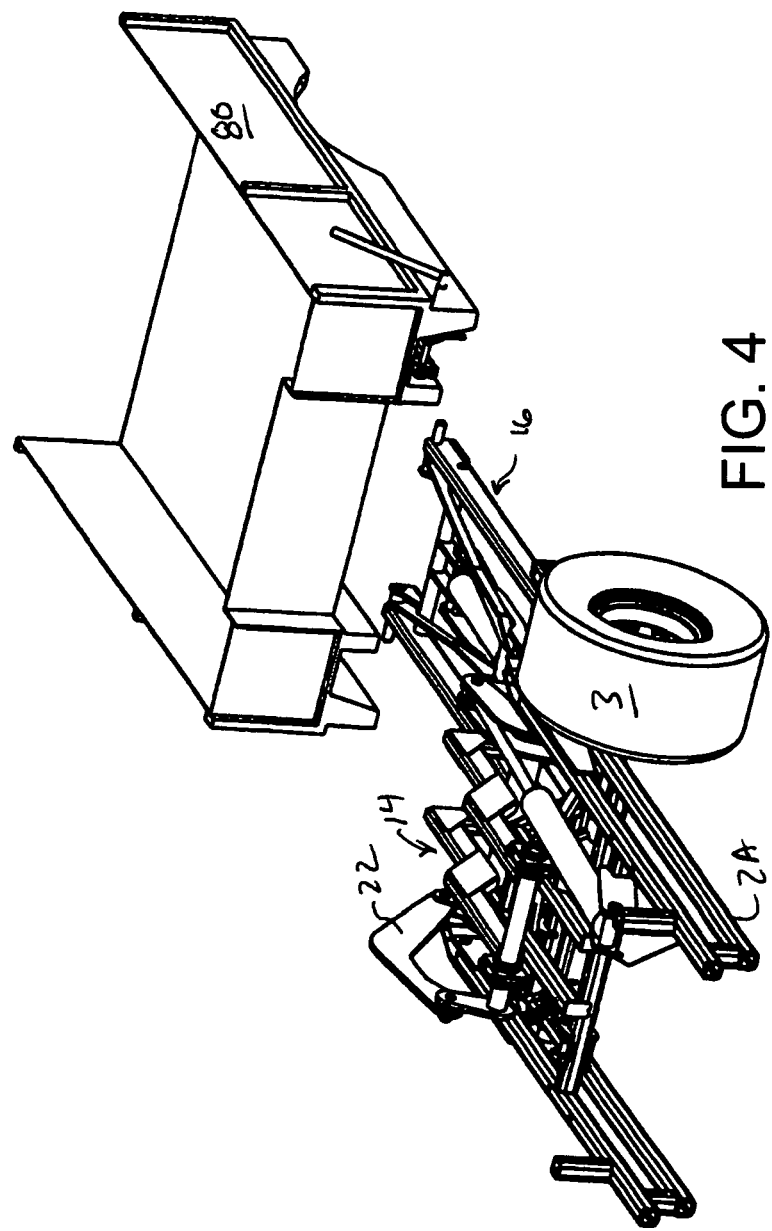
FIG. 4 is a perspective view of the rear portion of a vehicle with a cargo bed translation mechanism in a loading position and with the cargo bed separated from the cargo bed sub-frame.
Figure 5:
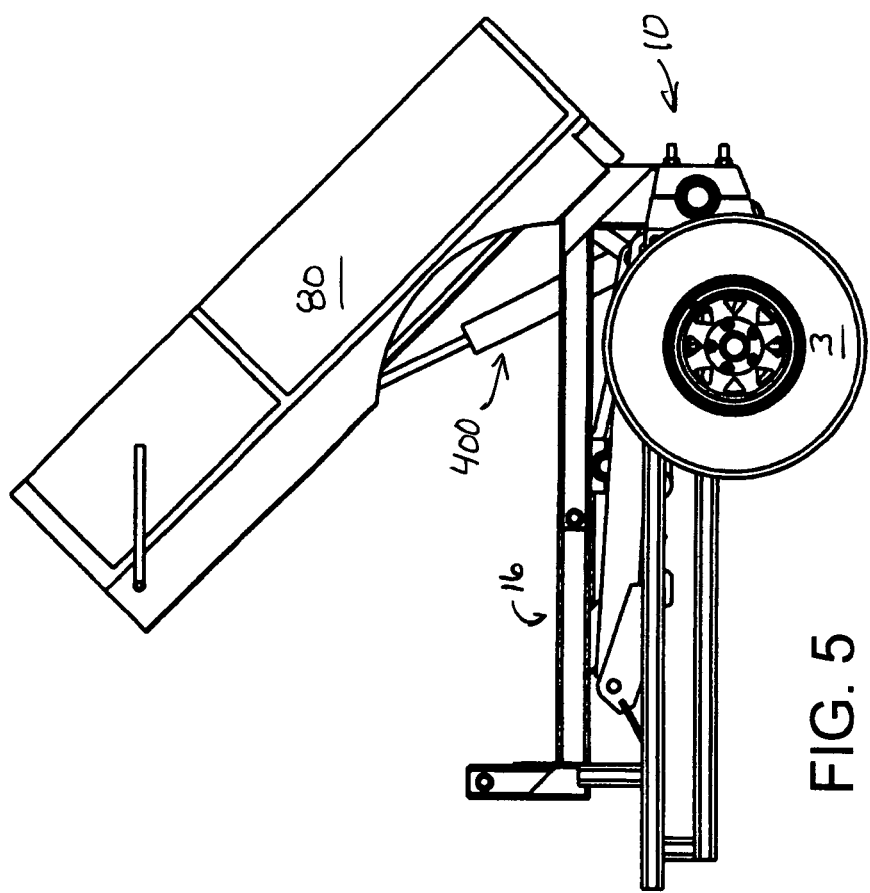
FIG. 5 is a side view showing the cargo bed translation mechanism in a transport position and with the cargo bed tilted in a dumping position.
Figure 6:
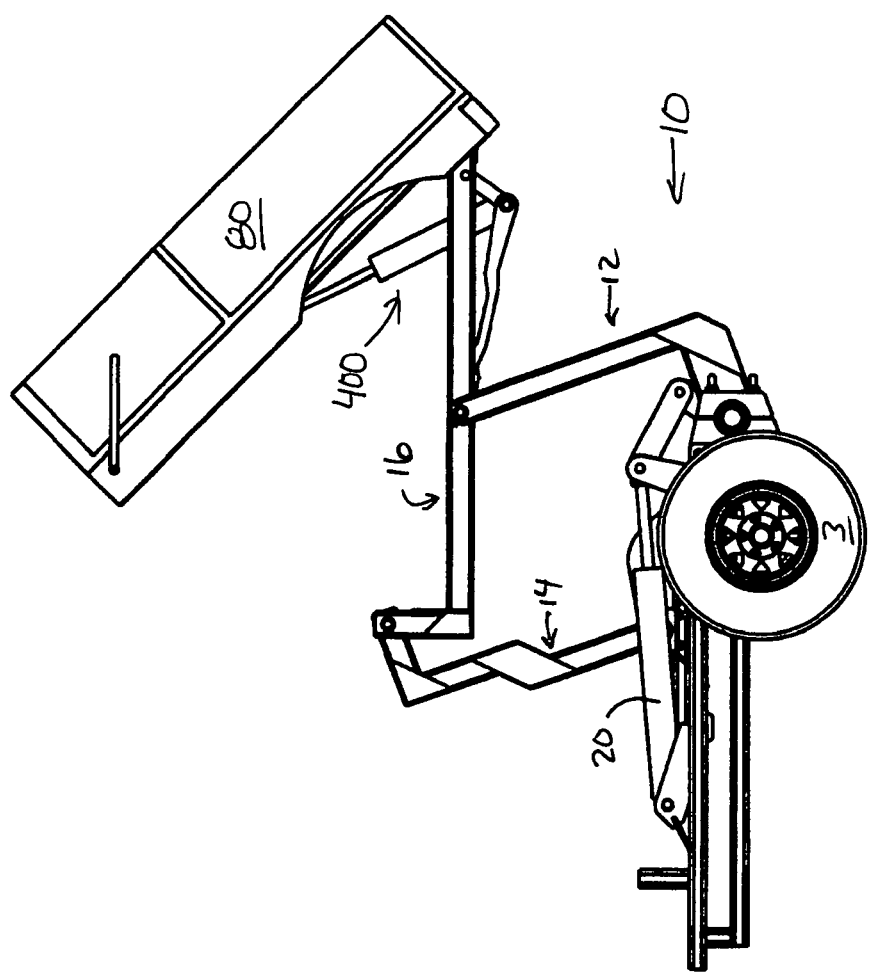
FIG. 6 is a side view of the cargo bed translation mechanism wherein the cargo bed support frame is elevated to the highest position and the cargo bed tilted up in a dumping position.

The above described mechanism provide a number of capabilities for use by the operator of a vehicle having a cargo bed. When translation mechanism 10 is in a fully raised position as shown in FIG. 6 and when cargo bed 80 is fully tilted as shown in FIG. 6, it may be possible to unload bulk material to be received by an elevated container or vehicle. Because cargo bed 80 may be translated to a loading position as shown in FIG. 2 and then released as shown in FIG. 3, it is possible for an operator to use the front end of vehicle 2, if it is equipped with a material moving blade or bucket, to push material into cargo bed 80 and then pick up cargo bed 80 for transport. Still further, because cargo bed 80 may be released as shown in FIG. 3, it becomes possible for an operator to deliver a cargo bed to a location and to pick up a cargo bed from a location. This can be done to distribute, pick up or relocate items as needed, for example, in a grounds keeping operation. Accordingly, with the capabilities described above, a vehicle becomes highly productive and versatile.

Figure 13:
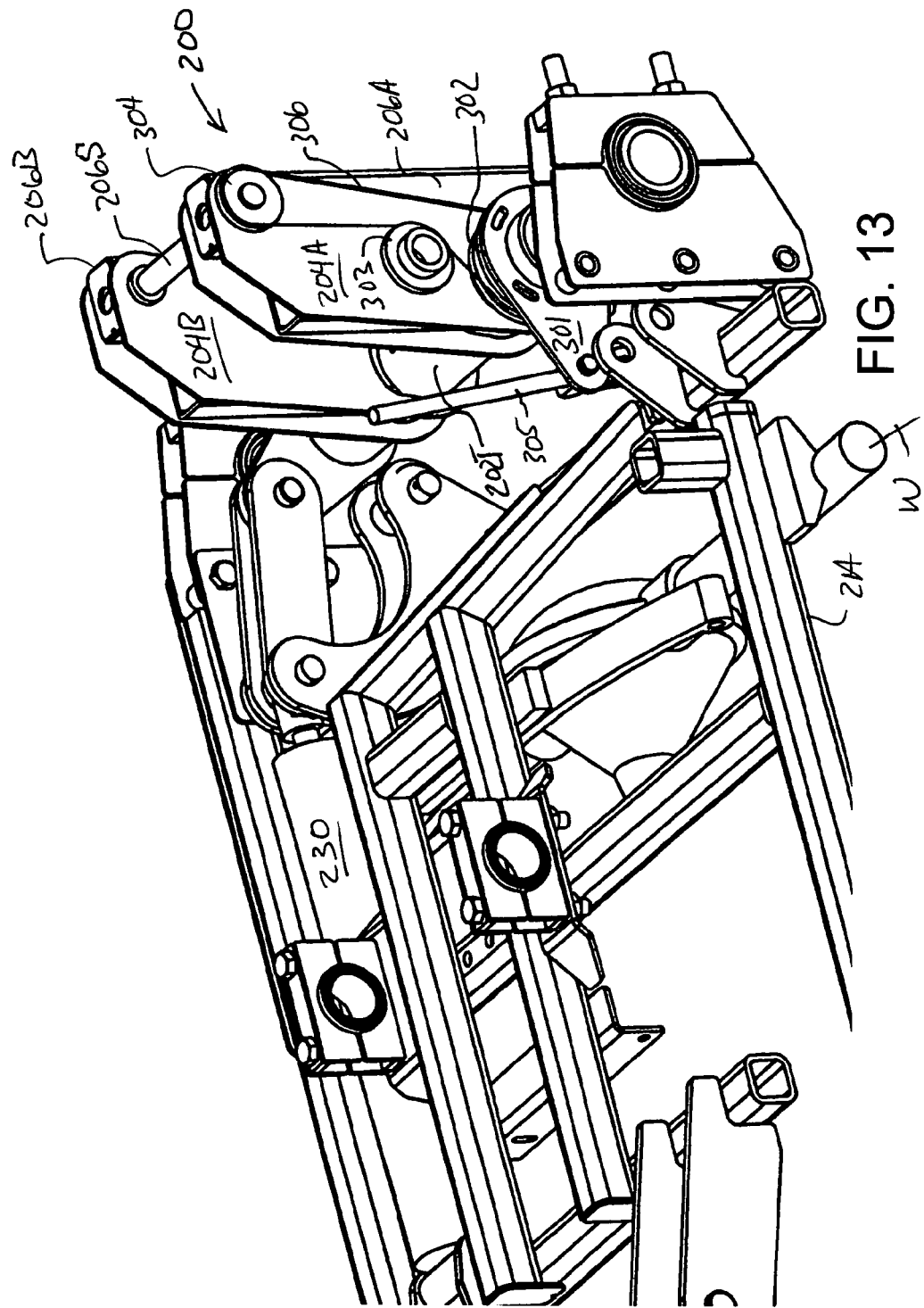
FIG. 13 is a perspective view showing an outrigger assembly mounted to a vehicle frame wherein the outrigger assembly is in the stowed position.
Figure 14:
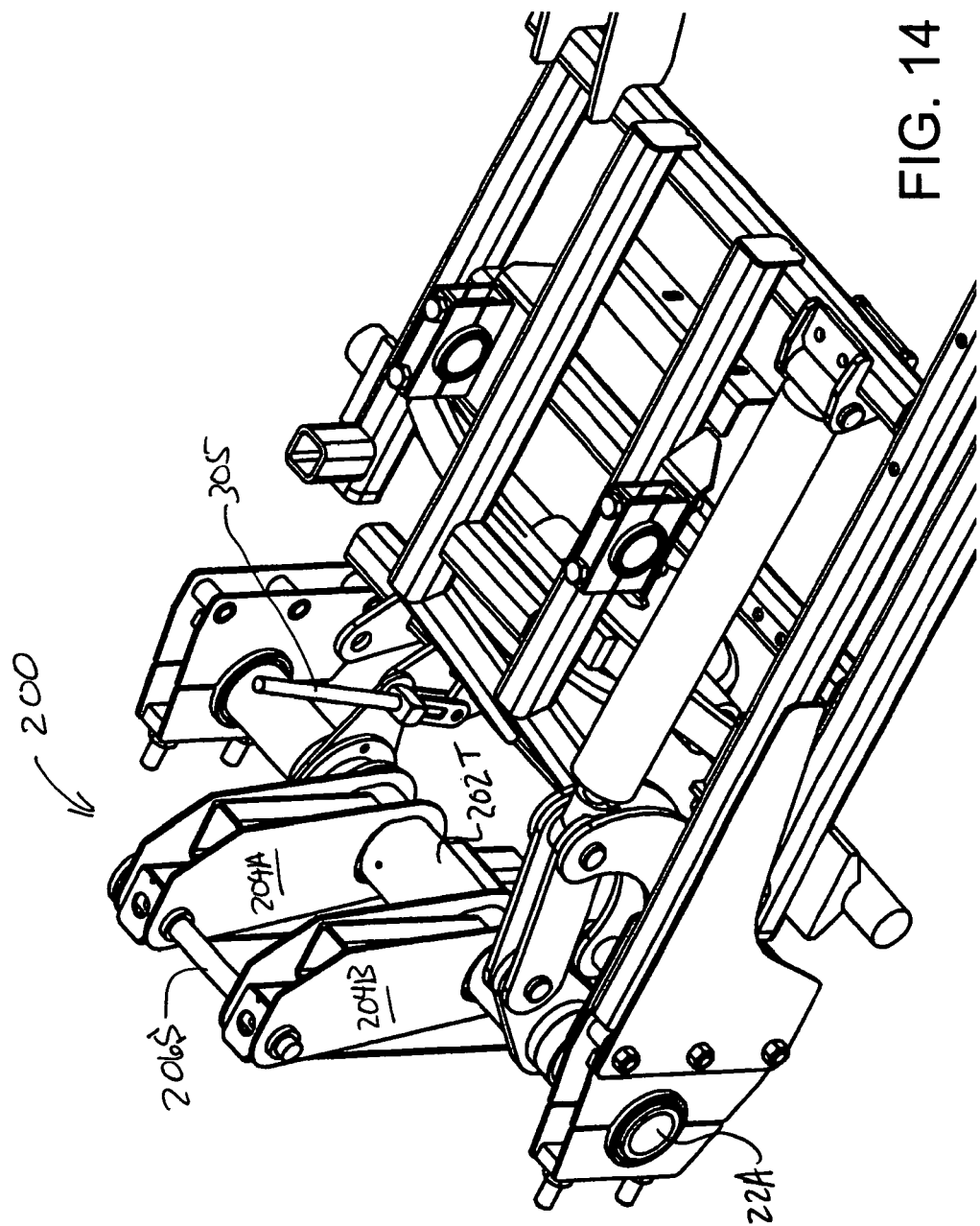
FIG. 14 is a side view showing an outrigger assembly in the stowed position with most of the vehicle frame removed for clarity.
Figure 15:
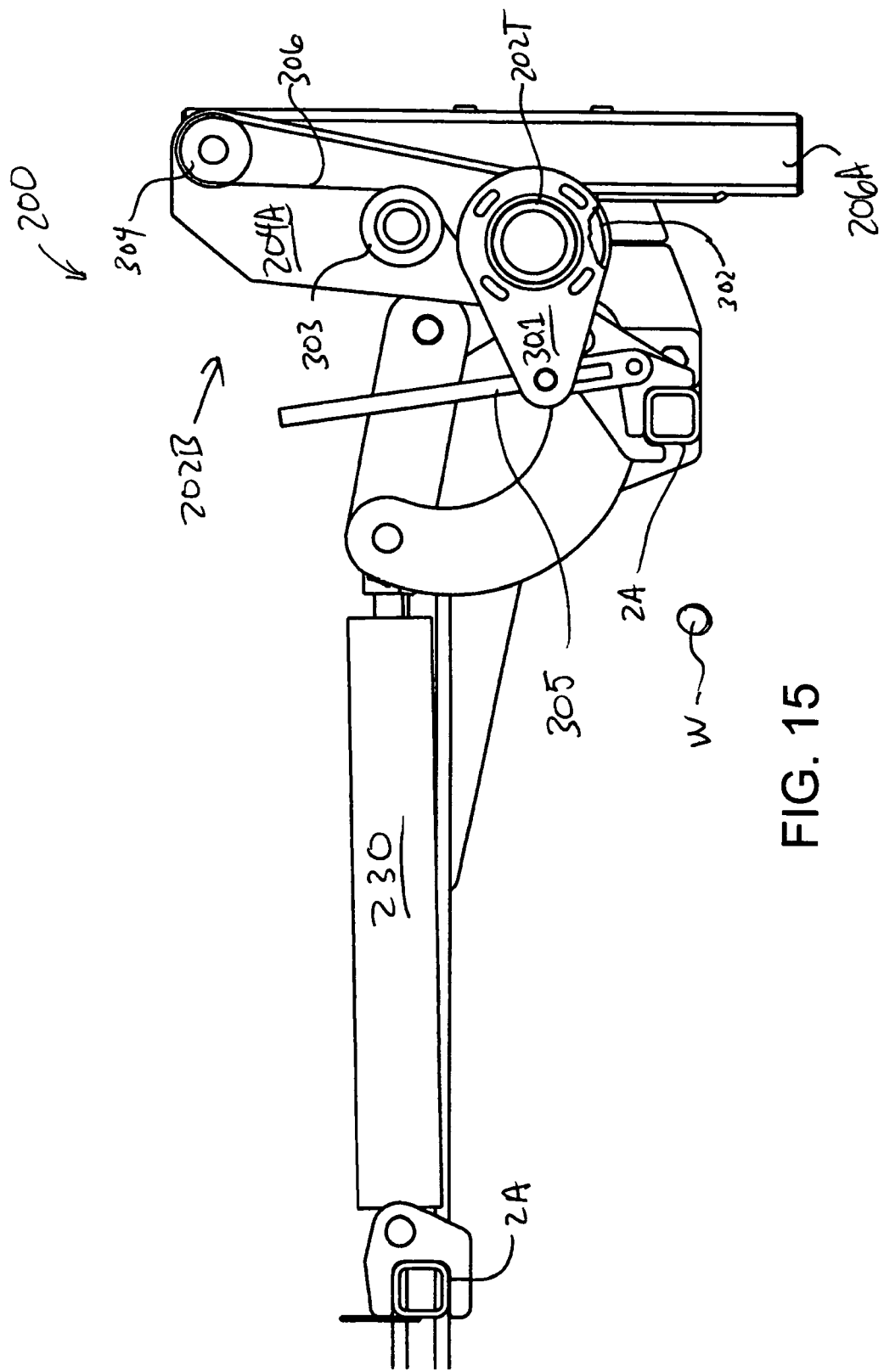
FIG. 15 is a side view showing an outrigger assembly in a first partially extended position with most of the vehicle frame removed for clarity.
Figure 16:
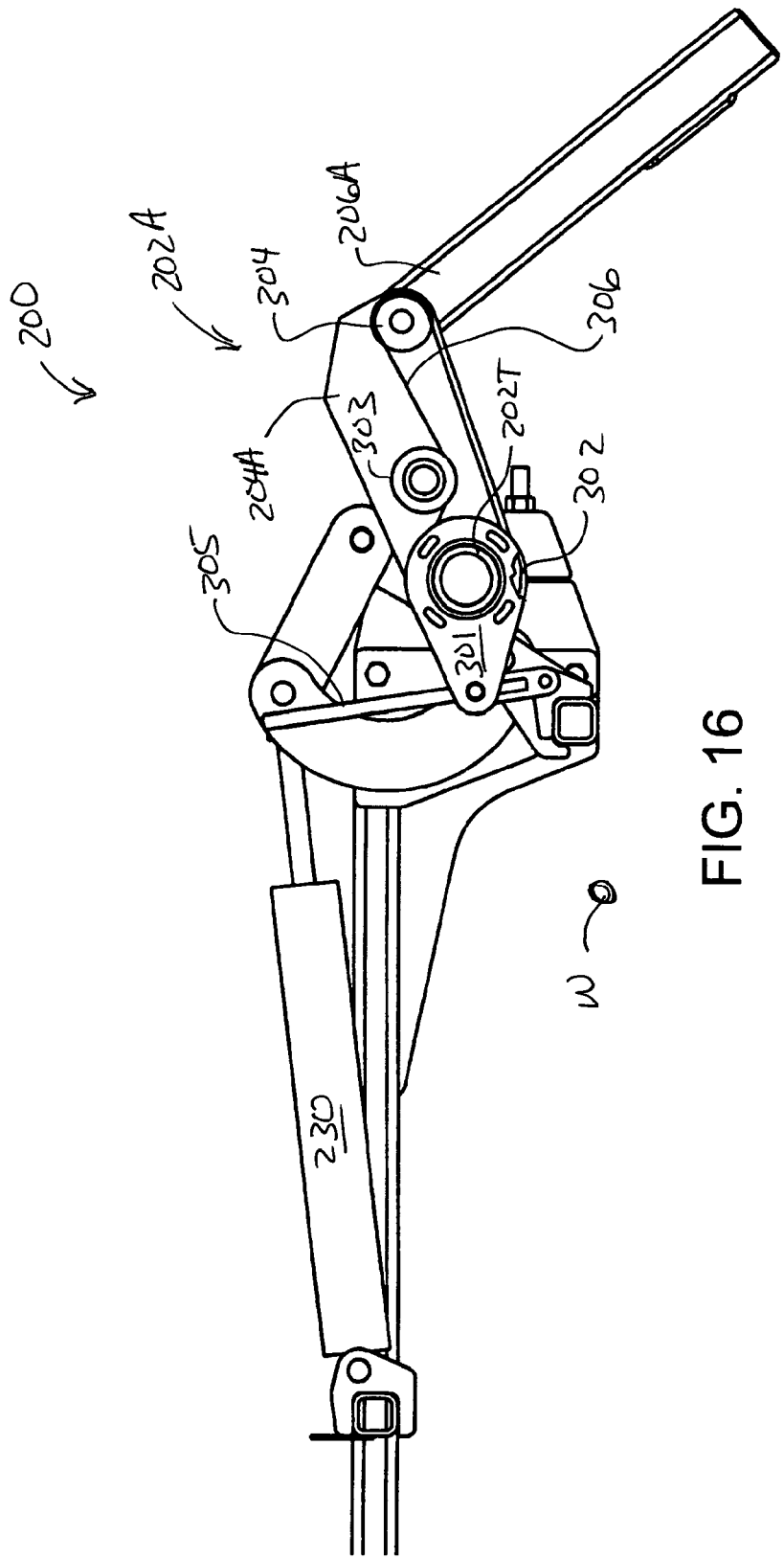
FIG. 16 is a side view showing an outrigger assembly in a second partially extended position with most of the vehicle frame removed for clarity.
Figure 17:
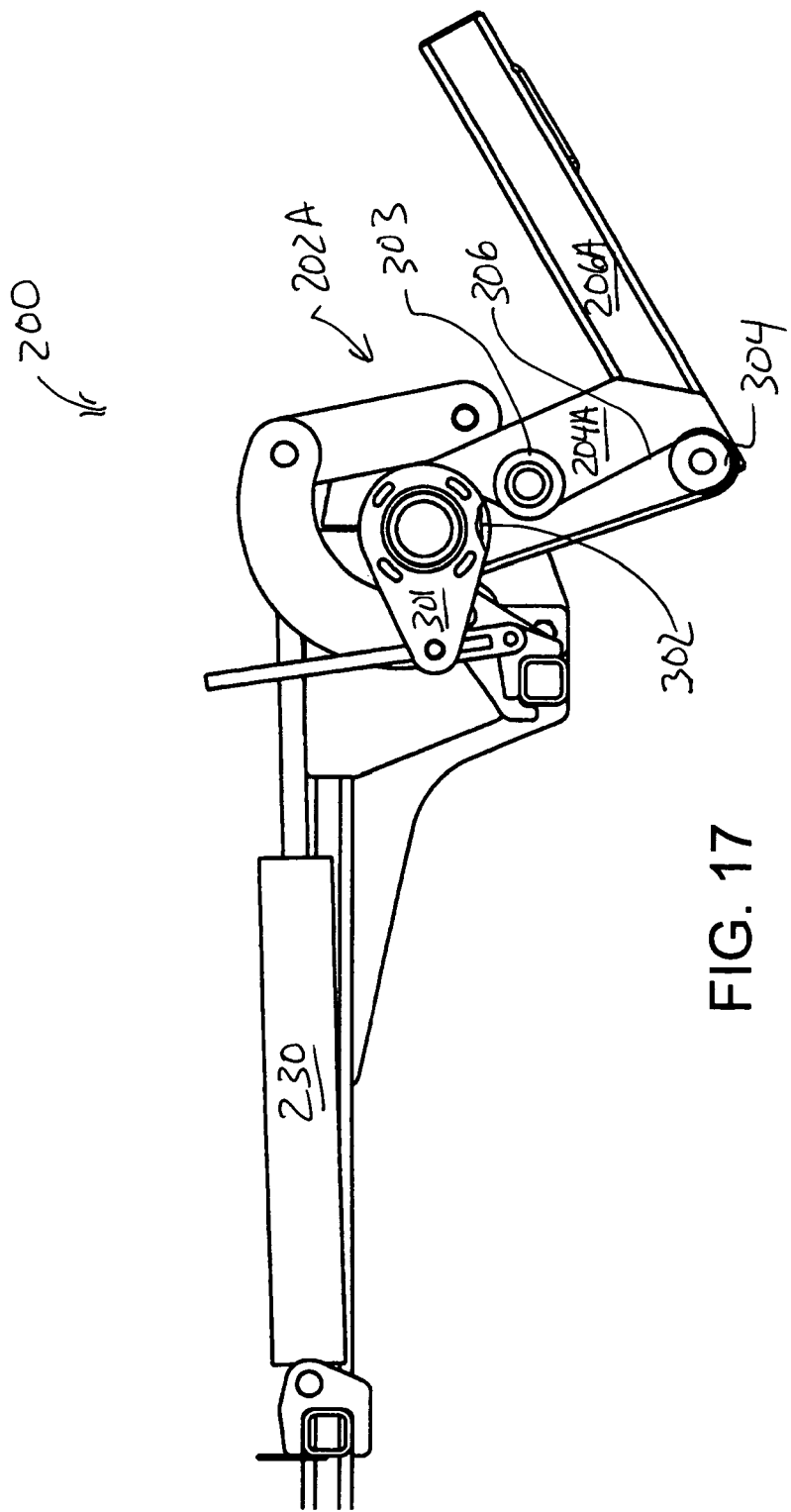
FIG. 17 is a side view showing an outrigger assembly in a third partially extended position wherein the foot member is fully extended relative to the support leg.
Figure 18:
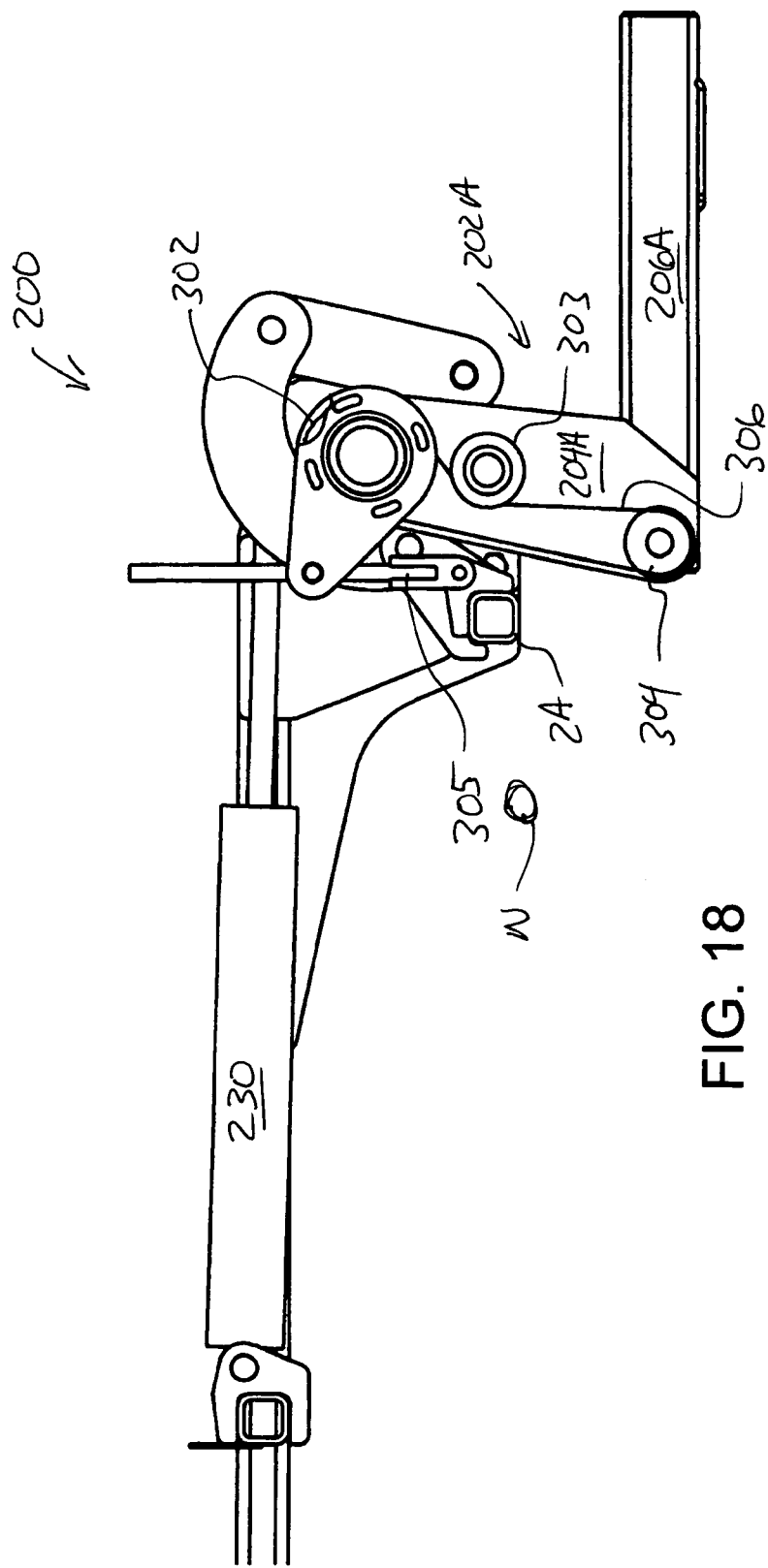
FIG. 18 is a side view showing an outrigger assembly in a fully deployed position.

If cargo-bed 80 is heavily loaded when it translated to a rearward extended position as shown in FIG. 2, the possibility exists that the combined center of gravity of the vehicle and cargo-bed 80 may shift to a location behind the axis of wheels 3. This could cause the front end of vehicle 2 to tip up in an unsafe manner. Accordingly, the apparatus optionally includes an outrigger installation 200 which is normally retracted as shown in FIGS. 13 and 14 and which deploys to stabilize the vehicle prior to the cargo-bed moving to a deployed position as shown in FIG. 18. Outrigger installation 200 is an example solution for stabilizing vehicle 2 when its center of gravity shifts to the rear of the vehicle. Those skilled in the art will readily appreciate how a number of various deployable structures may be employed to stabilize the back end of vehicle 2. Outrigger installation 200 is shown in FIGS. 13-18. As can be seen in FIG. 14, outrigger installation 200 is mounted to the back end of vehicle 2 behind axle W. As can be seen in FIG. 13, outrigger installation 200 includes two generally identical outrigger assemblies 202A and 202B.

Outrigger installation 200 may be better understood by considering one of the two generally identical outrigger assemblies 202A and 202B. Outrigger assemblies 202A and 202B are fixed to an outrigger tube 202T which is, in turn, rotatably carried by shaft 22A. Thus, for ease of illustration, we will consider outrigger assembly 202A while remembering that what is said about outrigger assembly 202A is also true of outrigger assembly 202B. Outrigger assembly 202A includes a leg member 204A and a foot member 206A. Although the operation of outrigger assembly 202A will be described in greater detail below, the skilled reader should understand outrigger installation 200 is arranged so that outrigger assemblies 202A and 202B deploy and retract in unison. Thus we can describe the motion both outrigger assemblies by considering the motion of outrigger assembly 202A as follows as outrigger assembly deploys from the stowed position shown in FIG. 14 to the deployed position shown in FIG. 18: (a) Leg member 204A rotates in a clockwise direction as viewed in FIG. 14 about its proximate end. Leg member 204A is fixed to outrigger tube 202T which is at least indirectly rotatably mounted to vehicle frame 2A. The rotation of outrigger tube 202T is actuated by actuator 230. (b) As the leg member 204A rotates away from the stowed position, foot member 206A rotates about its proximate end where it is rotatably mounted to the distal end of leg member 204A in a counterclockwise direction as viewed in FIG. 14 from a folded position as shown in FIG. 14 to an extended position shown in FIG. 18, and, foot member 206A preferably completes its rotation relative to leg member 204A and reaches its extended position relative to leg member 204A substantially before leg member 204A completes its rotation to its deployed position.

Outrigger assembly 202A is able to fold up into a relatively small volume as shown in FIG. 14 because leg member 204A has an open U shaped channel which is adapted for receiving foot member 206A. The center flange of the U shaped channel of leg member 204A is offset from the distal end of leg member 204A in order to present an recessed edge that engages foot member 206A when foot member 206A reaches the extended position shown in FIG. 18 thereby. This makes it possible for outrigger assembly 202A, when in the deployed position shown in FIG. 18, to function as a rigid load transferring support for stabilizing the vehicle should the center of gravity shift behind the rear wheels of the vehicle as described above.

Outrigger assemblies 202A and 202B are fixed to a transverse tube 202T which is, in turn, rotatably carried by transverse shaft 22A for simultaneous motion. We will describe the mechanism associated with outrigger assembly 202A which regulates the timing of the relative motions of leg member 204A and foot member 206A as outrigger assembly 202A moves from the stowed position to the deployed position. The following description is undertaken from the vantage point of FIGS. 14-18 which is the vantage point of an observer positioned away from the vehicle on the left side. The deploying motion of outrigger assembly 202A is actuated by the rotation of tube 202T. The rotation of tube 202T may be powered by any one of a number of types of actuators. In this example, a hydraulic cylinder 230 connects between vehicle frame 2A and a linkage 240 fixed to tube 202T. Thus, tube 202T rotates between a first position corresponding to the stowed position for outrigger installation 200 as shown in FIG. 14 and a second position corresponding to a deployed position for outrigger installation 200 as shown in FIG. 18.

The timing of the relative motion between leg member 204A and foot member 206A is regulated by a timing mechanism 300 which is mounted to outrigger assembly 200A and connected by a shaft 206S to outrigger assembly 200B on the opposite side of outrigger installation 200. Timing mechanism 300 includes a sprocket lobe 301, a first sprocket 302, a second sprocket 304, an endless timing chain 306 connecting between first sprocket 302 and second sprocket 304 and an idler sprocket 303. Idler sprocket 303, which is optional, is rotatably mounted to leg member 204A and functions to restrict timing chain 306 to a smaller volume. Sprocket lobe 301 is rotatably mounted to transverse tube 202T but is spring biased in a counterclockwise direction against a stationary stop by a spring assembly 305 in the position shown in FIG. 14. First sprocket 302 is fixed to sprocket lobe 301. Second sprocket 304 is fixed to the proximate end of foot member 206A. A shaft 206S which can be most easily seen in FIG. 13 is fixed to second sprocket 304 (and foot member 206A) and extends to the opposite side of outrigger installation 200 where it is fixed to the opposite foot member 206B of outrigger assembly 202B. With these relationships in mind, it is possible to determine the relative motion between leg member 204A and foot member 206A as tube 202T, to which leg member 204A is fixed, is rotated clockwise by actuator 230 (See FIGS. 14-18). As leg member 204A rotates clockwise, first sprocket 302 remains stationary with respect to frame 2A. This causes second sprocket 304 to rotate relative to leg member 204A as leg member 204A rotates about its proximate end. Since second sprocket 304 is fixed to the proximate end of foot member 206A, foot member 206A rotates in an opposite counter clockwise direction with respect to the distal end of leg member 204A as leg member 204A rotates clockwise. Because second sprocket 304 is substantially smaller than first sprocket 302, foot member 206A rotates at a higher rate than leg member 204A. Accordingly, as demonstrated in FIG. 17, leg member 204A has rotated approximately 160 degrees clockwise with respect to vehicle frame 2A while foot member 206A has rotated approximately 270 degrees counterclockwise with respect to foot member 204A. FIG. 17 shows the configuration of outrigger assembly 202A at the instant when foot member 206A has come in contact with the recessed edge of the center flange of leg member 204A. When foot member 206A thus contacts leg member 204A, second sprocket 304 stops rotating which in turn stops the movement of sprocket chain 306 as leg member 204A and foot member 206A continue to rotate as a unit to the position shown in FIG. 18. As the rotation of as leg member 204A and foot member 206A proceeds to the deployed position shown in FIG. 18, sprocket chain 306 forces the rotation of first sprocket 302 and sprocket lobe 300 which is fixed to sprocket 302 to rotate clockwise relative to vehicle frame 2A against the bias of spring member 305. As can be seen in FIG. 18, spring member 305 is deflected and sprocket lobe 300 has been rotated with respect to vehicle frame 2A in the clockwise direction by an angle corresponding to the angle of rotation of leg member 204A occurring between FIGS. 17 and 18.

Figure 19:
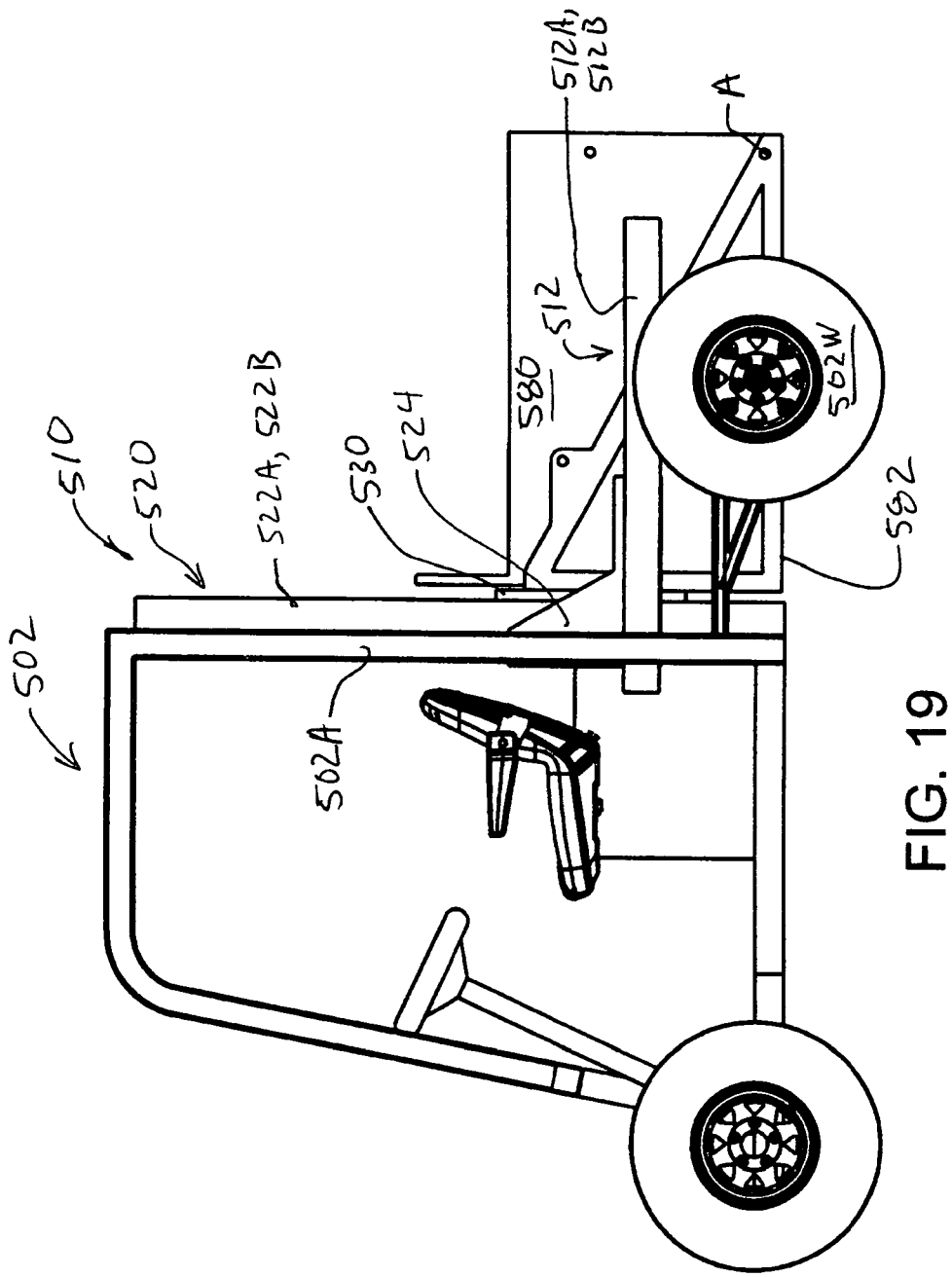
FIG. 19 is a side view showing a second embodiment of a translating cargo bed with the cargo bed in a transport position.

FIGS. 19-24 illustrate a second embodiment for a translation mechanism. As can be seen in FIG. 19, translation mechanism 510 is mounted to vehicle 502 having a vehicle frame 502A and generally includes a horizontal rail assembly 512, a mast assembly 520 and a cargo bed 580. In practice, horizontal rail assembly 512 and mast assembly 520 preferably include left and right rails or members as will be described in greater detail below. However, for simplicity, the description below may describe one side of the installation to teach the structure and function of the installation's components.

Figure 22:
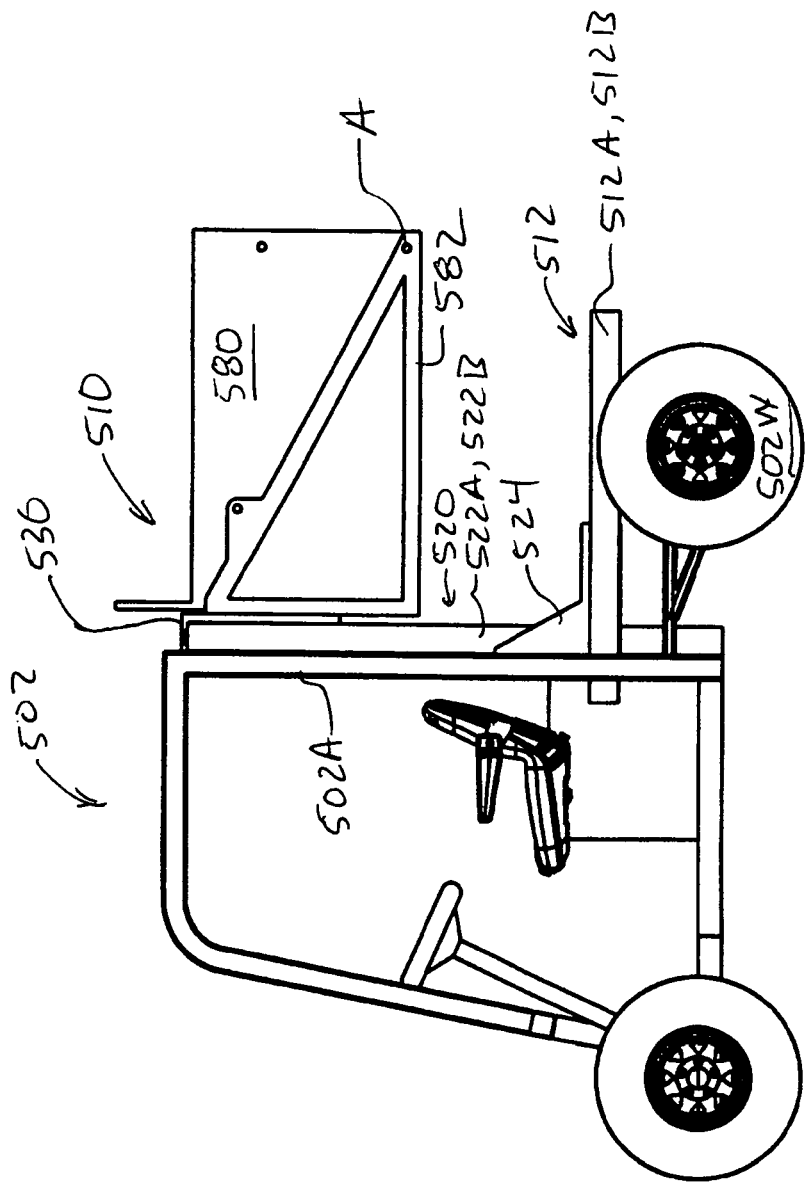
FIG. 22 is a side view showing a second embodiment of a translating cargo bed with the cargo bed in a raised position.
Figure 23:
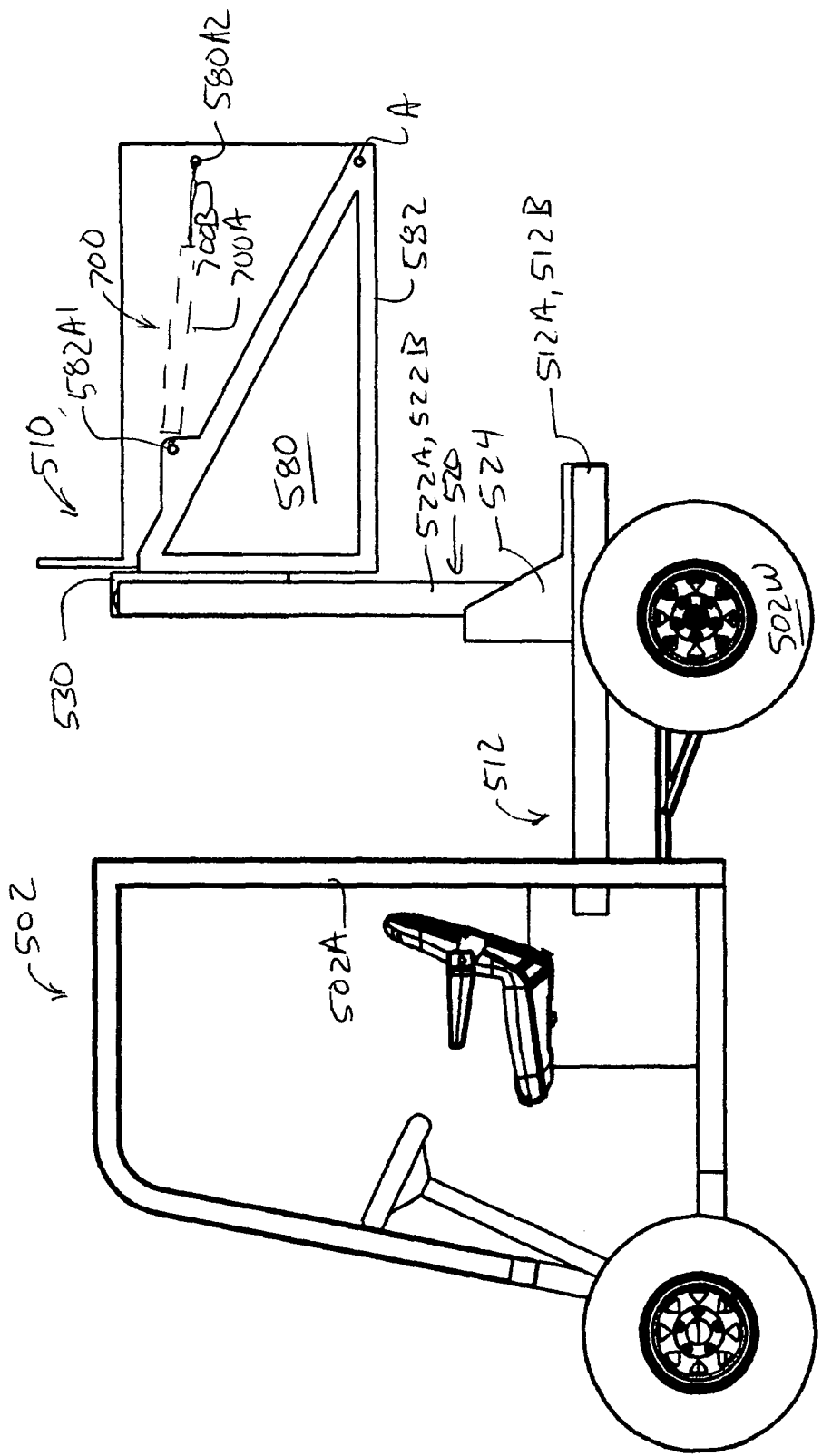
FIG. 23 is a side view showing a second embodiment of a translating cargo bed with the cargo bed in a raised rearward position.

A horizontal carriage assembly 524 carries mast assembly 520 and moves horizontally along rails 512A and 512B through a range of motion between the forward position shown in FIG. 22 and the rearward position shown in FIG. 23. Horizontal rail assembly 512, in this example, includes two parallel, spaced generally horizontal rails 512A and 512B. Mast assembly 520, in this example, includes two parallel upright mast rails 522A and 522B which are spaced sufficiently close to each other so that they can move between horizontal rails 512A and 512B of horizontal rail assembly 512 while moving between the forward position shown in FIG. 22 and the rearward position shown in FIG. 23. Horizontal carriage assembly 524 may employ powered rollers for engaging rails 512A and 512B, or powered gear wheels which engage linear racks disposed on one of the surfaces of one of or both of rails 512A and 512B or some other appropriate means well known by those skilled in the art for effecting low friction, powered controllable linear movement.

Figure 24:
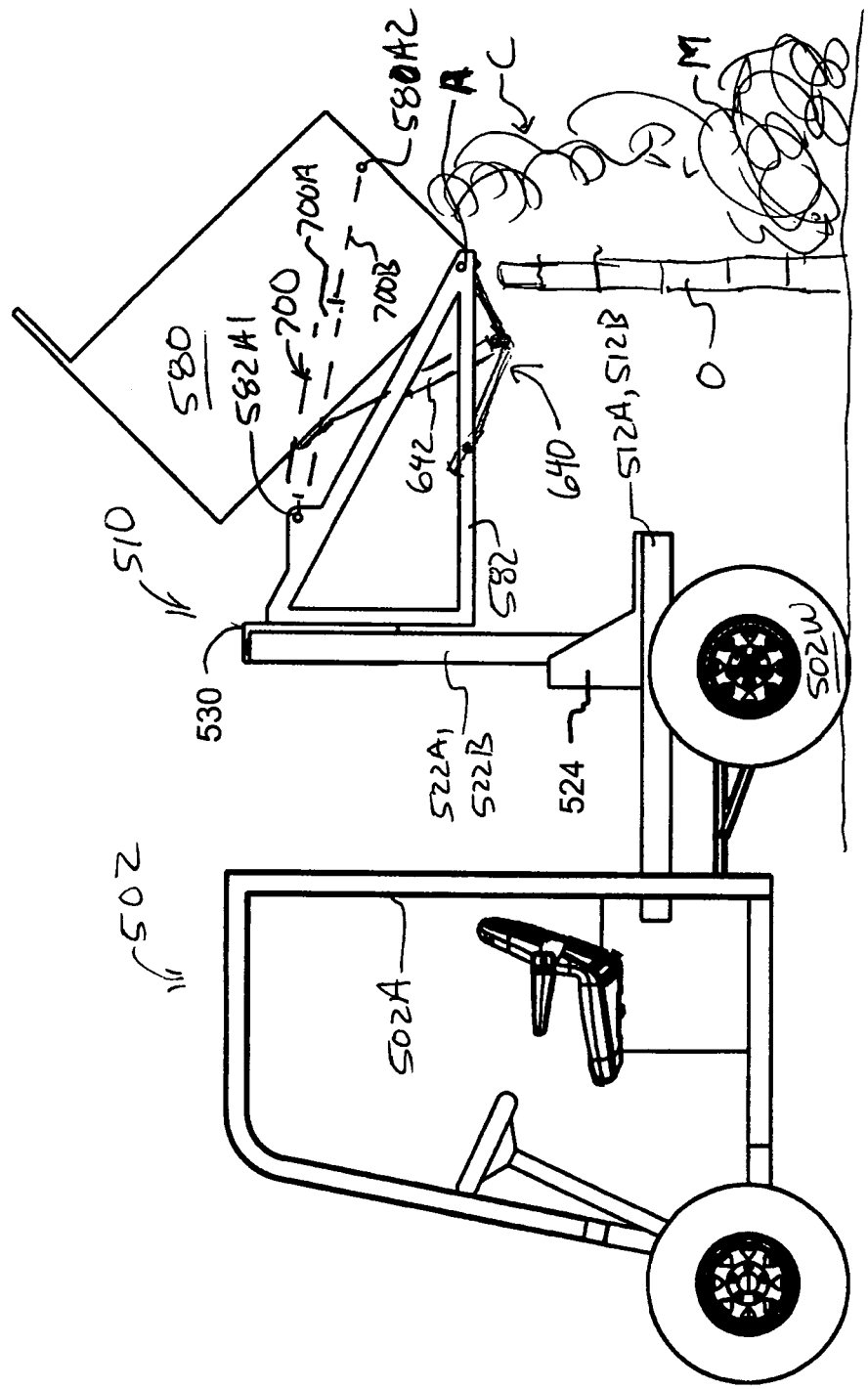
FIG. 24 is a side view showing a second embodiment of a translating cargo bed with the cargo bed in a raised rearward position with a cargo bed dump mechanism in an extended position so that the cargo bed is tilted up for dumping materials from the cargo bed suitable for dumping materials over a raised obstacle or on to a pile.

Cargo bed 580 is carried by a cargo bed sub-frame 582. Cargo bed 580 is pivotably mounted to cargo bed sub-frame 582 to rotate about axis A between a level hauling position shown in FIG. 23 through a range of motion to a tilted dumping position shown in FIG. 24. As can be seen in FIG. 24, a dump mechanism 640 is employed to power the tilting motion of cargo bed 580. Dump mechanism 640 may preferably be arranged very similarly to dump mechanism 400 described above.

Figure 20:
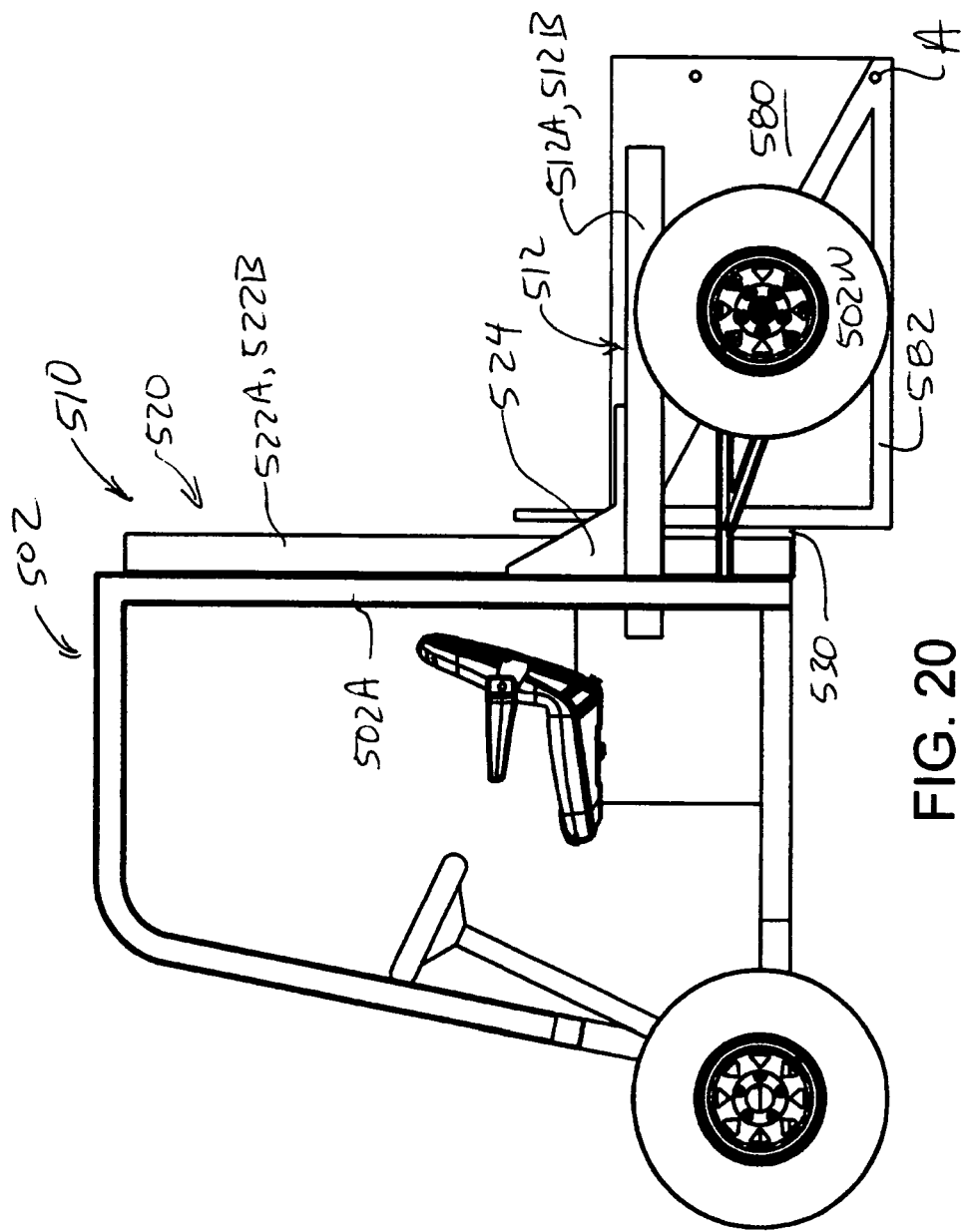
FIG. 20 is a side view showing a second embodiment of a translating cargo bed with the cargo bed in a lowered position.

Cargo bed sub-frame 582 is, in turn, mounted to a vertical carriage assembly 530 which makes it possible to translate cargo bed sub-frame 582 and cargo bed 580 up and down in a range of motion including a lowered position shown in FIG. 20 and a raised position shown in FIG. 22. Vertical carriage assembly 530 is mounted to upright mast rails 522A and 522B of mast assembly 520 and is adapted for powered controlled movement up and down mast rails 522A and 522B. The skilled reader should bear in mind only vertical motion is discussed in this connection. When this vertical range of motion is combined with the horizontal range of motion described above, cargo bed 80 may be translated to any position within an envelope E shown in FIG. 21. In order to accommodate this range of motion, in this example, the space between rear wheels 502W and rails 512A and 512B is open to accommodate upright mast rails 522A and 522B and at least the lower portions cargo bed 580 and cargo bed sub-frame 582.

Figure 21:
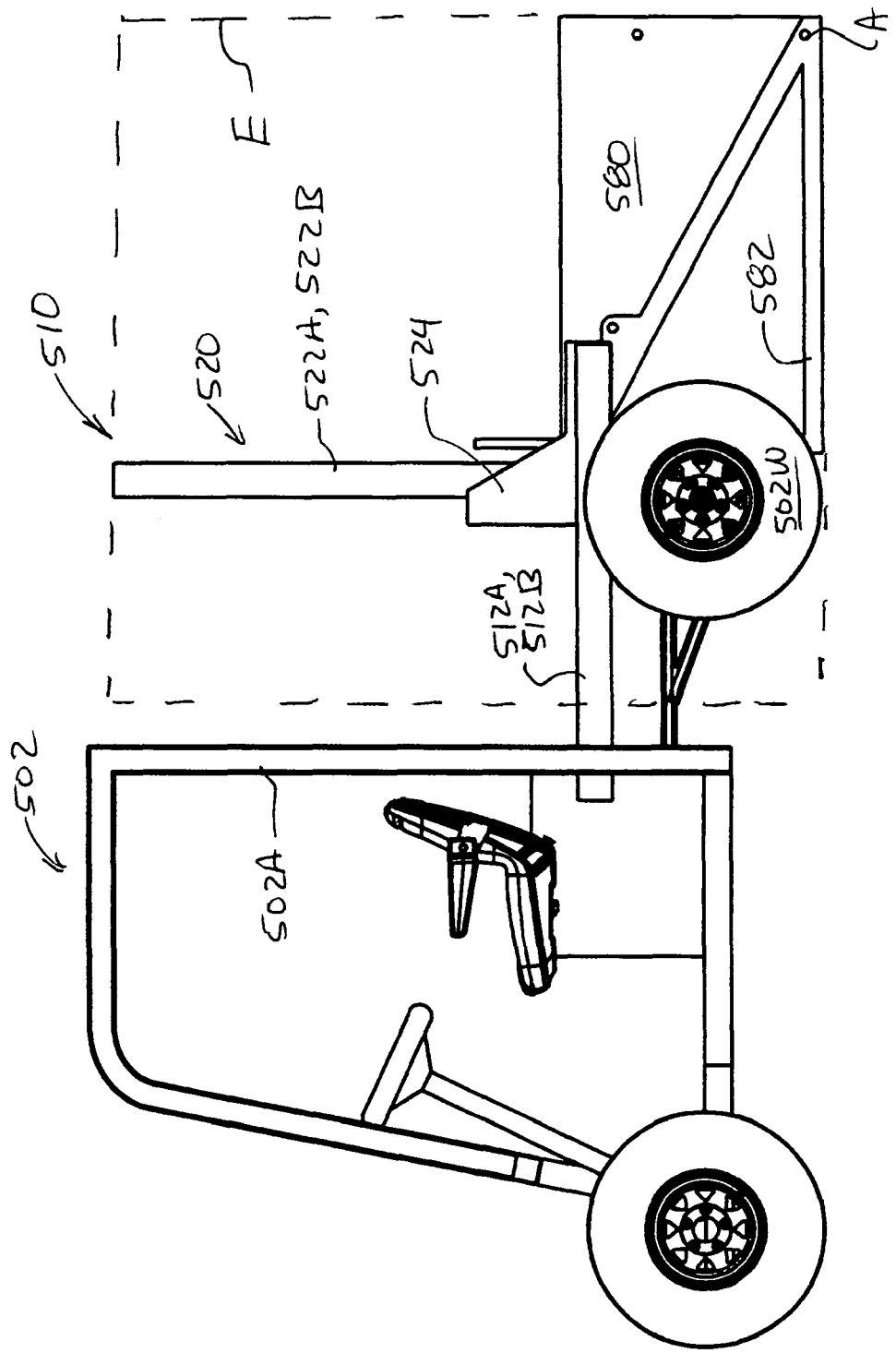
FIG. 21 is a side view showing a second embodiment of a translating cargo bed with the cargo bed in a rearward lowered position.

Because of the ranges of motions of translating mast assembly 520 and mast shuttle assembly 530, as described above, it is possible to effect any of the following types of motion: (a) raising cargo bed assembly 580 from a transport position shown in FIG. 19 to a raised position shown in FIG. 22. (b) Translating cargo bed 580 and raising cargo bed 580 from a transport position shown in FIG. 19 to an elevated rearward extended position shown in FIG. 23. (c) Translating cargo bed 580 from a transport position shown in FIG. 19 to a lowered position shown in FIG. 20. (c) Translating cargo bed 580 from a transport position shown in FIG. 19 to a lowered and rearward extended position shown in FIG. 21. Accordingly, an operator may use the modes of movement described above to place cargo bed assembly 580 anywhere in an envelope E as shown in FIG. 21. Moreover, by adding dump mechanism 640 as shown in FIG. 24, it is possible to dump the contents of cargo bed 580 from nearly any position within envelope E including from a raised and rearward extended position as shown in FIG. 24. As the skilled reader will observe, FIG. 24 shows contents C of cargo bed 580 being dumped over an obstacle O onto a pile of material M. Cargo bed 580 may be used as a working platform when elevated as shown in FIG. 22 or from other locations within envelope E shown in FIG. 21. Still further, an outrigger assembly such as the one described above may be needed to prevent the combined center of gravity of the vehicle and cargo bed 580 (when loaded) from translating behind the center of rotation of wheel 502W. The skilled reader may also appreciate it may not be possible to operate the dump mechanism shown in FIG. 24 from the loading positions shown in FIGS. 20 and 21 because the dump mechanism can not rotate to provide leverage for actuator 402 when cargo bed sub-frame 582 is resting on ground surface in a loading position.

An second optional dump mechanism 700 for actuating the tilting motion of cargo bed 580 is also shown in phantom in FIGS. 23 and 24. Second optional dump mechanism 700 an actuator portion 700A which could be a linear actuator or a hydraulic cylinder and a drive rod portion 700B which moves through a range of motion including a retracted position shown in FIG. 23 and an extended position shown in FIG. 24. Dump mechanism 700 connects between an attach point 582A1 of sub-frame 582 and an attach point 580A2 near the back end of cargo bed 580 which is spaced in a vertical direction away from axis A. The connection between drive rod portion 700B and cargo bed attach point 580A2 is preferably releasable so that cargo bed 580 may be removed from cargo bed sub-frame 582 as needed. An advantage of second optional dump mechanism 700 is that it does not interfere with the ground even when extend even when sub-frame 582 is at rest on the ground as shown in FIG. 21.

Figure 25:
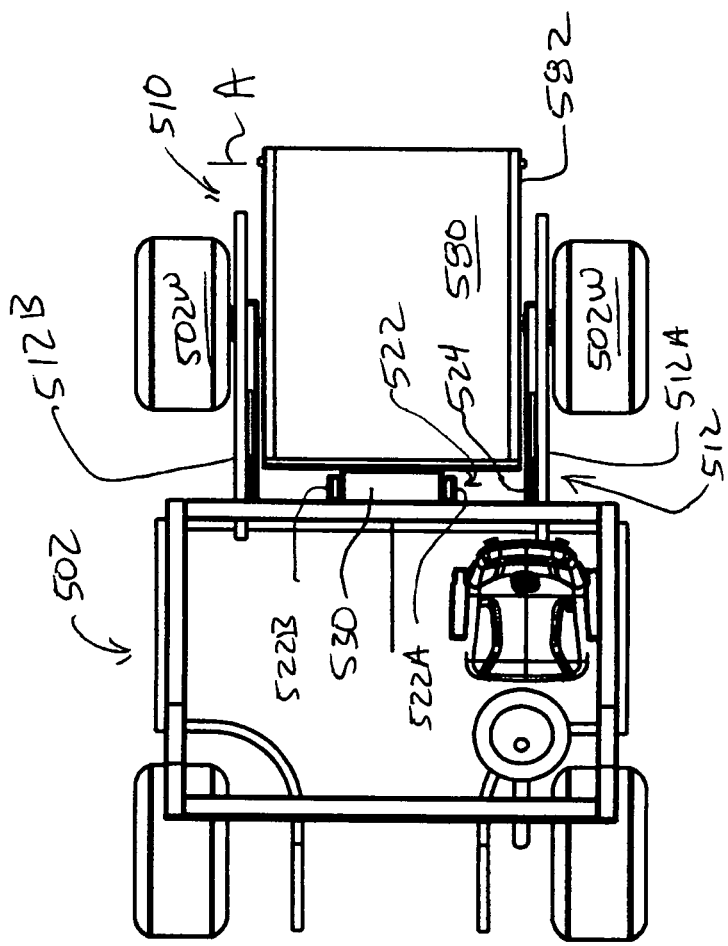
FIG. 25 is a top view showing a second embodiment of a translating cargo bed with the cargo bed in a forward position.
Figure 26:
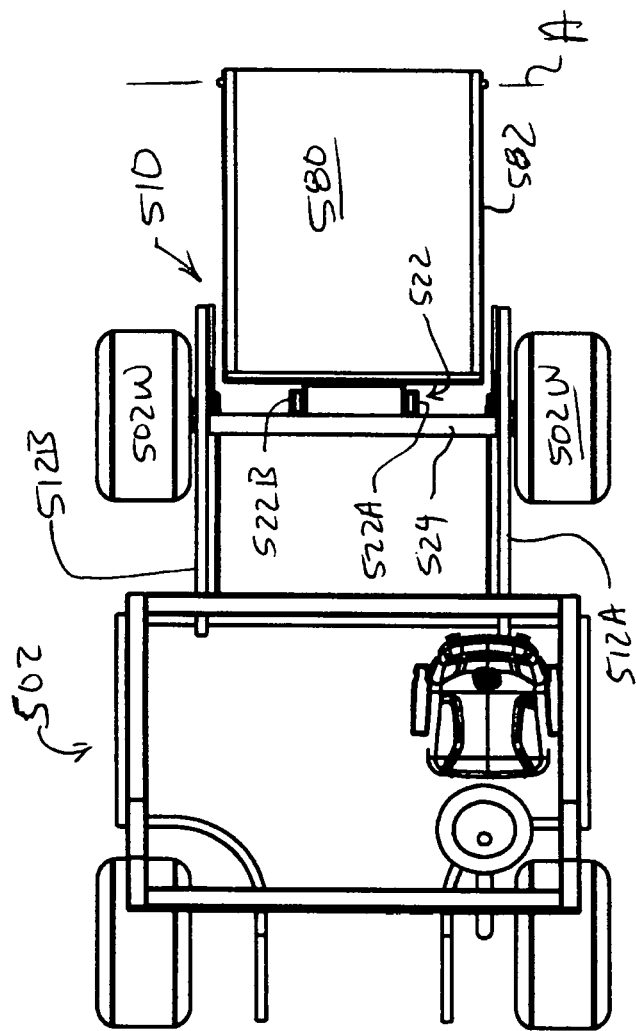
FIG. 26 is a top view showing a second embodiment of a translating cargo bed with the cargo bed in a rearward position.
Figure 27:
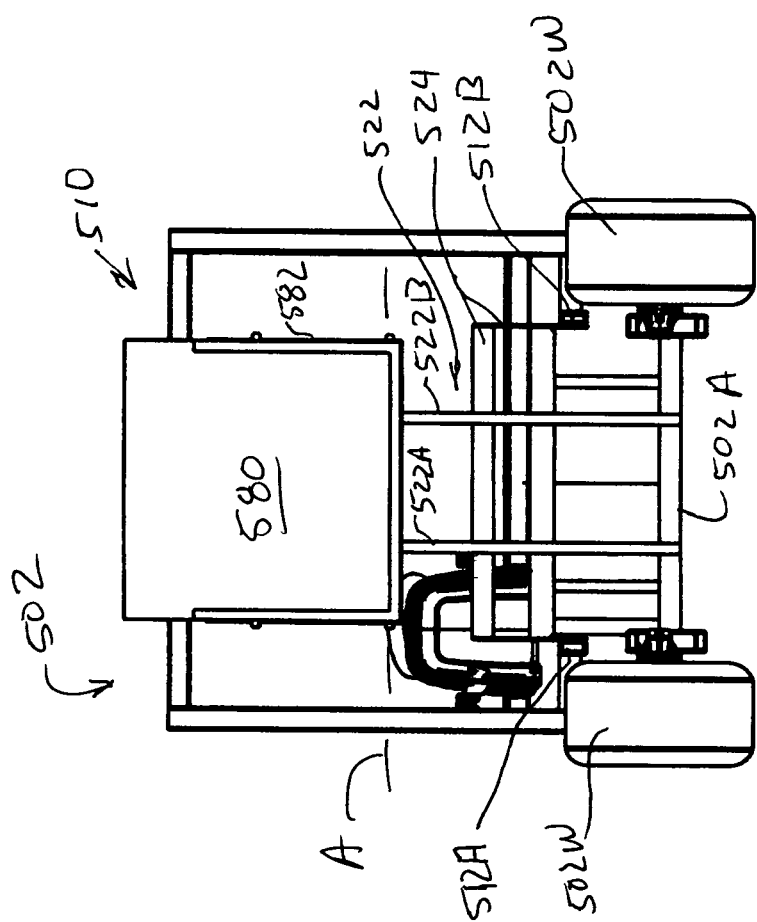
FIG. 27 is a rear view showing a second embodiment of a translating cargo bed with the cargo bed in a raised position.
Figure 28:
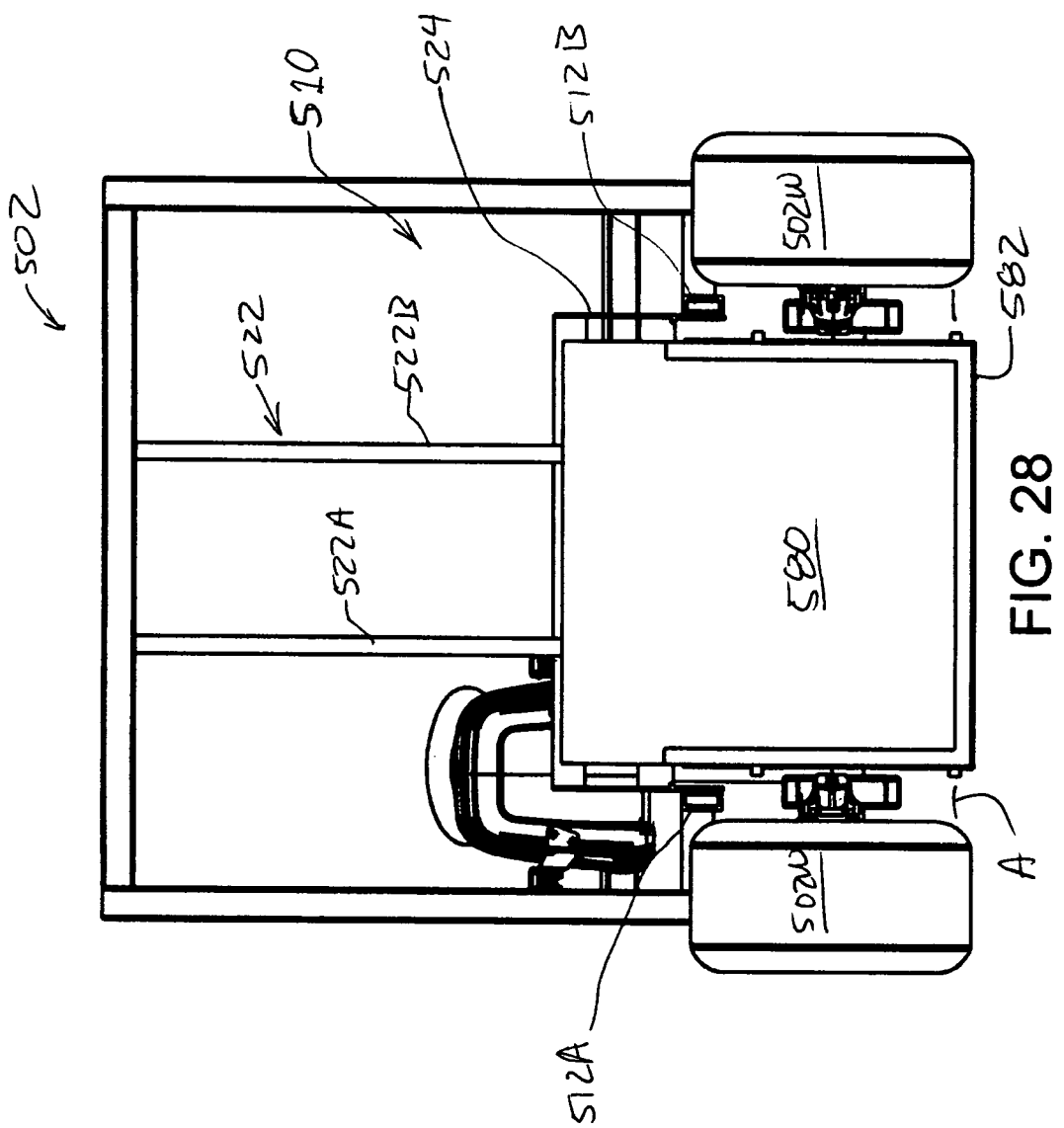
FIG. 28 is a rear view showing a second embodiment of a translating cargo bed with the cargo bed in a lowered position.

FIG. 25 should be understood as showing a top view of vehicle 502 when cargo bed 580 is in one of the positions shown FIG. 19, 20 or 22 or within a range of positions between those positions and thus shows the horizontal location of the cargo bed when mast assembly 520 is in a forward position. FIG. 26 should be understood as showing a top view of vehicle 502 when cargo bed 580 is in one of the positions shown FIG. 21 or 23 or within a range of positions between those positions and thus shows the horizontal location of the cargo bed 580 when mast assembly 520 is in a rearward position. FIG. 27 should be understood as showing a rear view of vehicle 502 when cargo bed 580 is in one of the positions shown FIG. 22 or 23 or within a range of positions between those positions and thus shows the position of cargo bed 580 when vertical carriage assembly 530 is in a raised position. FIG. 28 should be understood as showing a rear view of vehicle 502 when cargo bed 580 is in one of the positions shown FIG. 20 or 21 or within a range of positions between those positions and thus shows the position of cargo bed 580 when vertical carriage assembly 530 is in a lowered position.

FIGS. 29-38 illustrate a third embodiment including a cargo bed 880 and a translation mechanism 810. When considering the third embodiment, the skilled reader is encouraged to consider the configuration on one side of the vehicle with the understanding that the same configuration is repeated symmetrically on the opposite side of the vehicle. In this embodiment, cargo bed 880 is supported by a cargo bed sub-frame 882. Translation mechanism 810 is mounted to a vehicle frame 802. As is conventional, vehicle frame 802 includes wheels 802A. Translation mechanism 810 includes a transverse shaft 804, opposite arms 816, lower sprockets 832, upper sprockets 834, and a drive unit 850. Transverse shaft 804 is rotatably mounted to vehicle frame 802 for rotation about a first transverse axis A-A shown in FIG. 29. The rotation of shaft 804 is powered by drive unit 850. With the exception of a means for angular adjustment which will be described below, arms 816 are fixed to the opposite ends of shaft 804. Although drive unit 850 will be described in greater detail below, it is sufficient to understand that drive unit 850 is operable for controllably rotating shaft 804 and arms 816 between a transport position shown in FIG. 32 and a loading position shown in FIG. 38. While each arm 816 is fixed to shaft 804 at the lower end of each arm 816, cargo bed sub-frame 882 is pivotably mounted to the upper ends of arms 816 at bearings 818 for rotation of sub-frame 882 about a second transverse axis BB with respect to arms 816. Axis BB can also be seen in FIG. 29.

Figure 29:
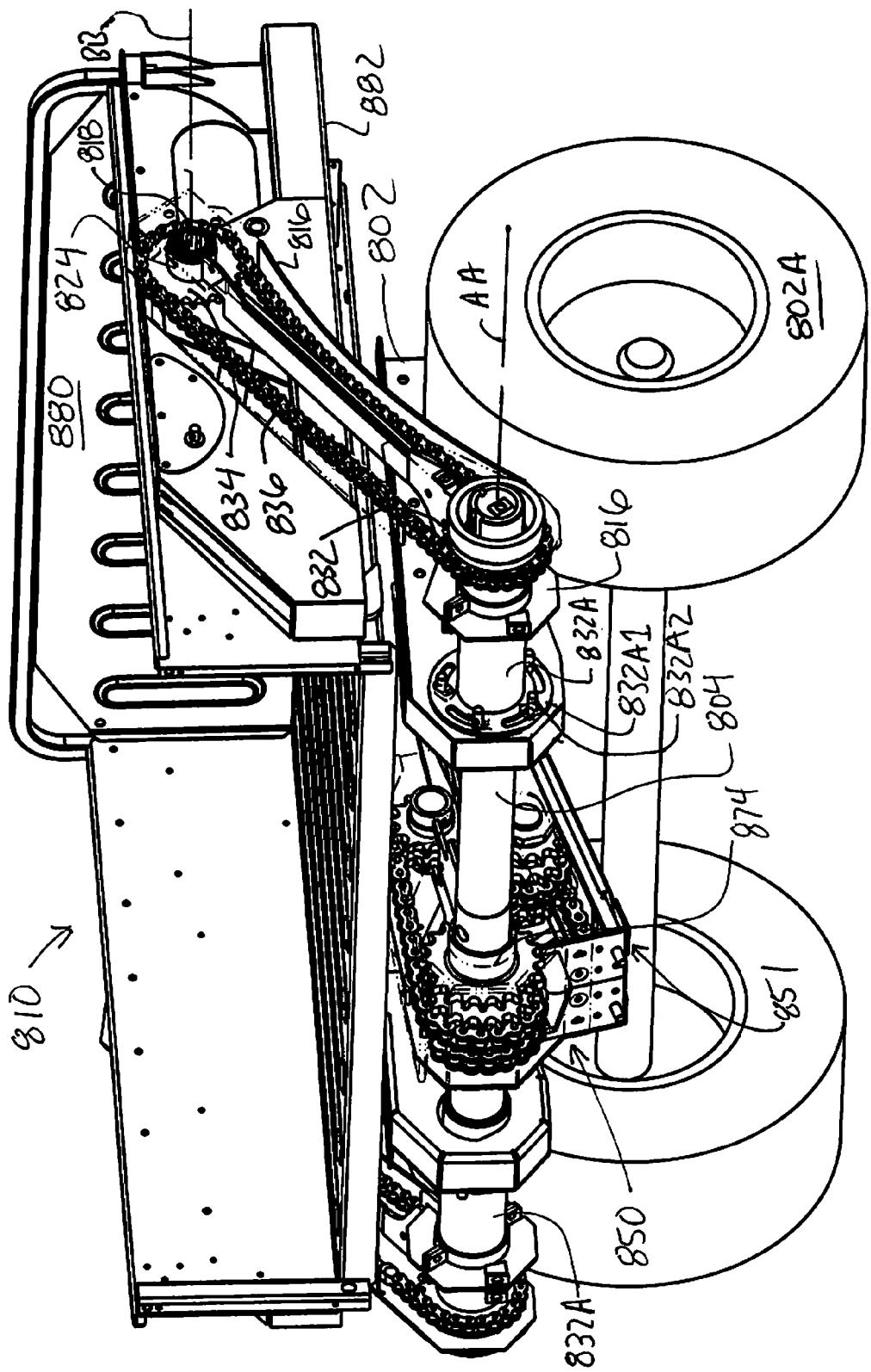
FIG. 29 is a perspective view showing a third embodiment of a translating cargo bed with the cargo bed in a lowered position.
Figure 32:
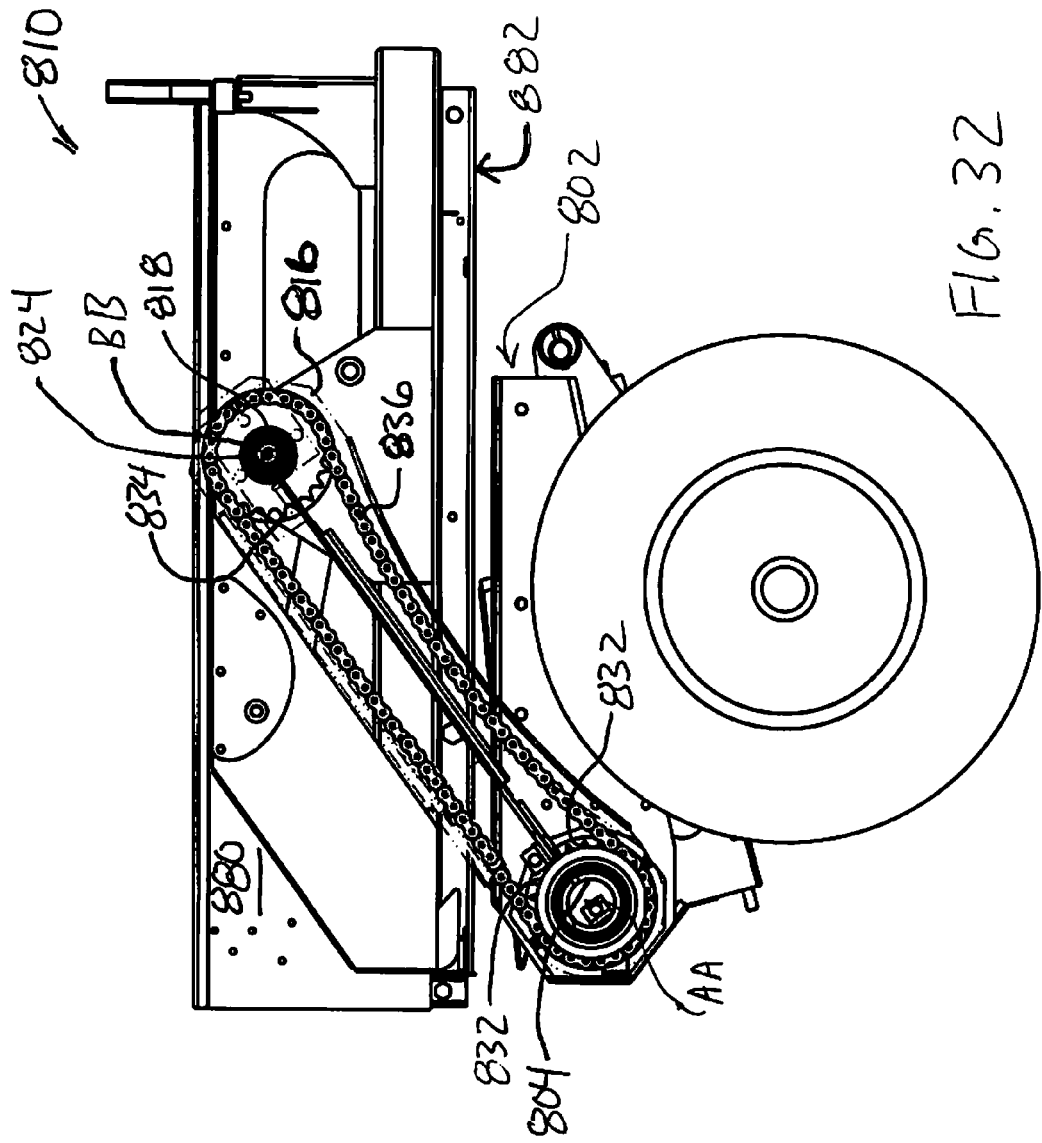
FIG. 32 is a side view showing the third embodiment of the translating cargo bed with the cargo bed in a transport position.
Figure 33:
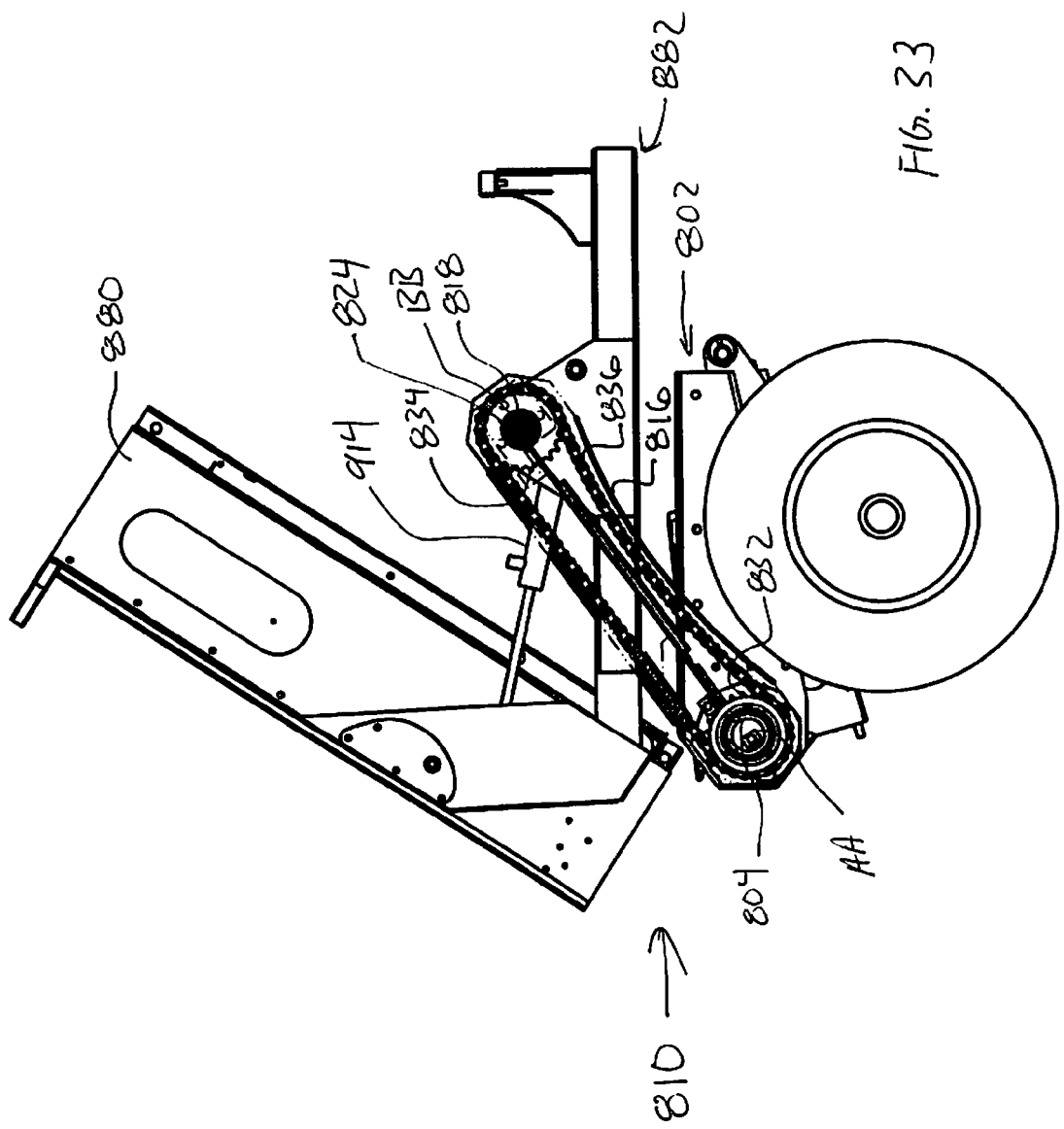
FIG. 33 is a side view showing the third embodiment of the translating cargo bed with the cargo bed support frame in the transport position and with the cargo bed tilted up in a dumping position.

An important feature of translation mechanism 810 is the combination of lower sprockets 832, upper sprockets 834 and chains 836. This combination of sprockets and chains is operable for maintaining a generally parallel relationship between vehicle frame 802 and cargo bed sub-frame 882 (and cargo bed 880 when it is not tilted for dumping) as cargo bed 880 is translated between the transport position shown in FIG. 32 and the loading position shown in FIG. 38. With reference to FIGS. 29 and 32, lower sprocket 832 is fixed to shaft 804. However, an angular adjustment device is interposed between lower sprocket 832 and shaft 804. Lower sprocket 832 is actually fixed to the outboard end of an adjustment sleeve 804A. Adjustment sleeve 804A has a radial flange 804A1 at its inboard end that is tangentially slotted and that is adjustably bolted to a shaft flange 804A2. Shaft flange 804A2 is fixed to shaft 804 and extends radially from shaft 804. Shaft flange 804A2 presents a pattern of bolts that register with the tangential slots of radial flange 804A1 of adjustment sleeve 804A. This arrangement makes it possible to adjust the angular position of arm 816 in relation to shaft 804 in order to maintain parallelism between frame 802 and cargo bed sub-frame 882. This is necessary because, with any mechanism, wear and tear will occur and components will move out of adjustment. Except for such occasional adjustments, adjustment sleeve 804A should be regarded as being fixed to shaft 804.

While lower sprocket 832 is fixed to shaft 804, upper sprocket 834 is fixed to cargo bed sub-frame 882. Because lower sprocket 832 and upper sprocket 834 are connected by chain 836, when arm 816 rotates counter-clockwise, upper sprocket 834 and cargo bed sub-frame 882 rotate clockwise with respect to arm 816. Because sprockets 832 and 834 have the same number of teeth, the counter rotation of sub-frame 882 matches the rotation of arm 816, thereby maintaining the parallel relationship between vehicle frame 802 and cargo bed sub-frame 882. Those skilled in the art will appreciate that the above described components of translation mechanism 810 should be fashioned from steel or other suitable tough strong materials as are typically selected by those skilled in the art for fashioning such components and structures.

Figure 30:
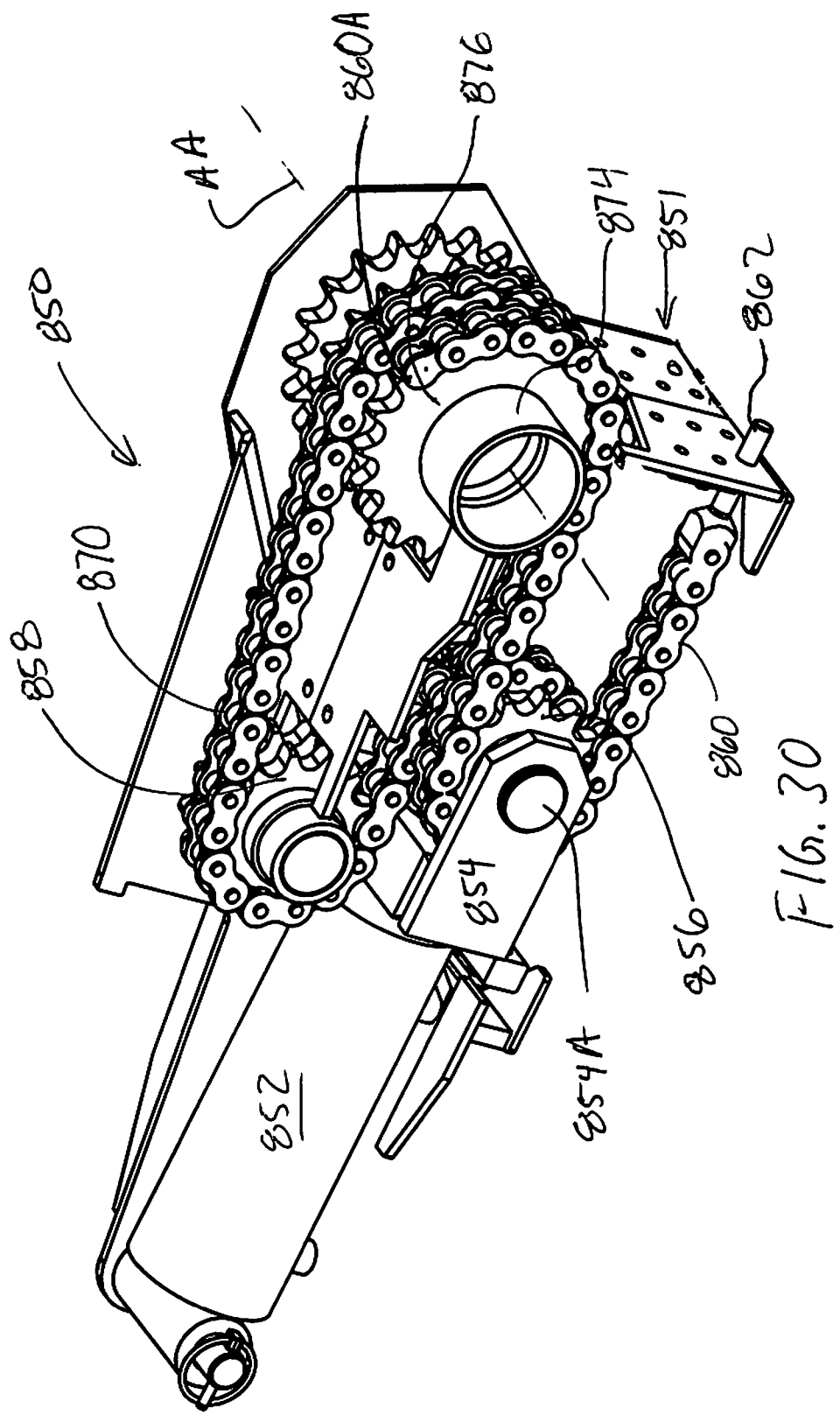
FIG. 30 is a first perspective view showing the lift drive mechanism for the third embodiment of a translating cargo bed.
Figure 31:
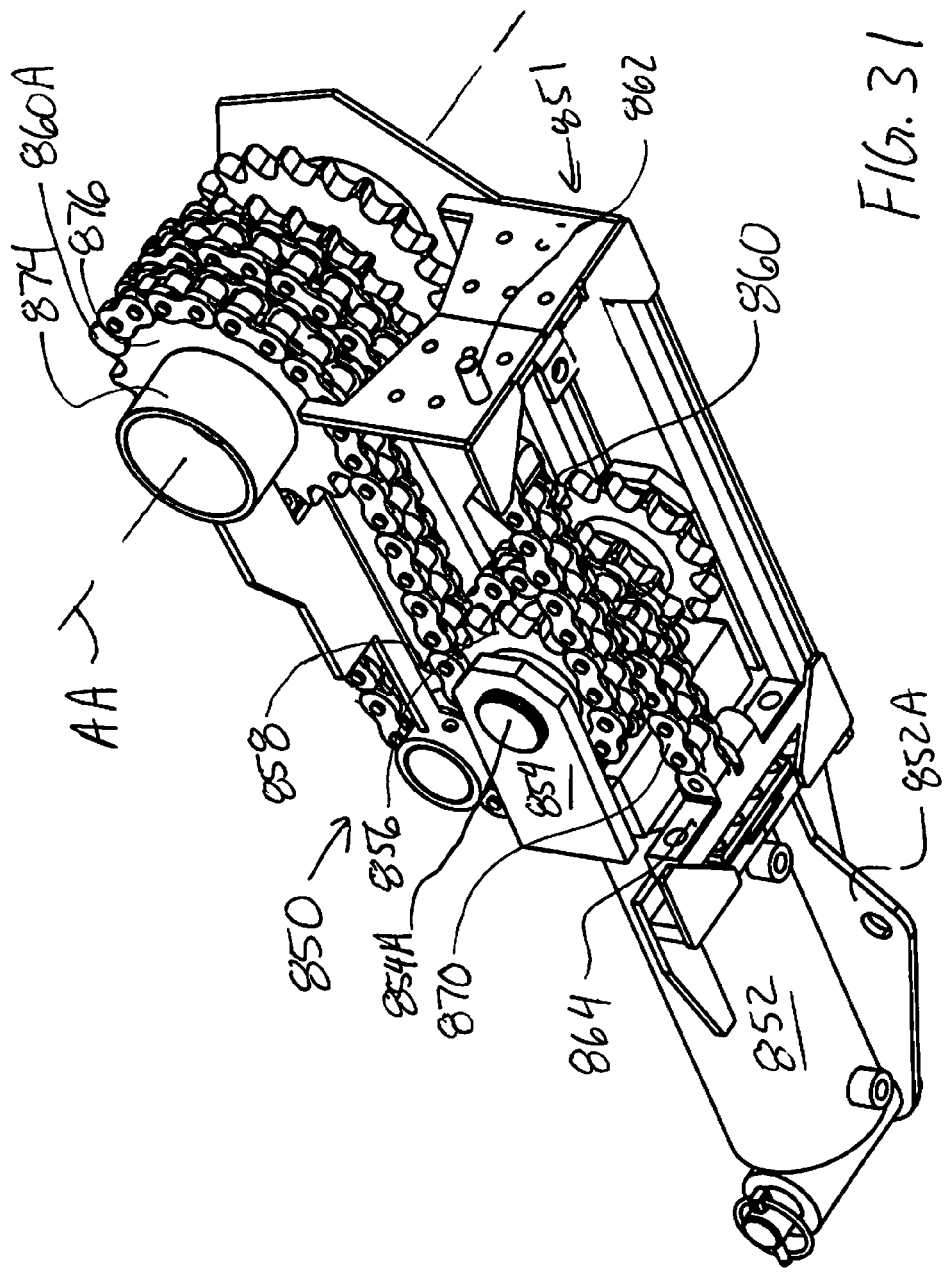
FIG. 31 is a second perspective view showing the lift drive mechanism for the third embodiment of a translating cargo bed.

Drive mechanism 850 can be best understood by referring to FIGS. 30 and 31. Drive mechanism 850 is operable for converting the linear movement of a hydraulic cylinder into the rotational movement of shaft 804. As can be seen in FIGS. 30 and 31, drive mechanism 850 includes a two directional hydraulic cylinder 852 which is fixed to vehicle frame 802 and operates to translate a clevis 854. Clevis 854 carries a transverse shaft 854A to which a set of sprockets 856 are rotatably mounted. Clevis 854 is fixed to the distal end of the piston rod of hydraulic cylinder 852 which is not shown. With regard to drive mechanism 850, the skilled reader should understand that only the piston rod of hydraulic cylinder 852, clevis 854, shaft 854A and sprockets 856 translate with respect to vehicle frame 802. As noted above, hydraulic cylinder 852 is fixed to vehicle frame 802.

Drive mechanism 850 also includes an arrangement of sprockets and corresponding chains that are arranged to rotate a collar 874. Collar 874 is fixed to shaft 804, so that when it is rotated through the range of angular movement, shaft 804 and arms 816 rotate between the transport position shown in FIG. 32 and the loading position shown in FIG. 37. A set of sprockets 876 are fixed to collar 874. Drive mechanism 850, in this example, employs four chains but only two of the four chains on one side of the mechanism are shown for clarity. Thus, in FIGS. 30 and 31 we can see how an outboard chain 860 and an inboard chain 870 are associated with frame 802 and sprockets 856, 858 and 876 and how they work to convert linear motion to rotational motion. Outboard chain 860 is anchored to a bracket 862 which is fixed to frame 802. Outboard chain 860 wraps around a sprocket 856 which is mounted to clevis 854 and then wraps around one of sprocket 876 where its opposite end is anchored to sprocket 876 at link 860A. As can be seen in FIG. 30, sprocket 876 is fixed to collar 874 which is fixed to shaft 802. Thus, when clevis 854 translates from a position close to bracket 862 to the position shown in FIG. 30, sprockets 876, collar 874 and shaft 804 will rotate in a clockwise direction as shown in FIG. 30 which corresponds to a counter-clockwise direction of rotation as shown in FIG. 32. Inboard chain 870 is anchored to a bracket 864 which is generally spaced away and opposite from bracket 862. Bracket 864 is also fixed to frame 802. As can be best understood by referring to FIGS. 30 and 31, inboard chain 870 wraps around one of sprockets 856, then wraps around idler sprocket 858 (which is also rotatably mounted to frame 802) and then is anchored to one of sprockets 876. When clevis 854 translates from the position shown in FIG. 30 to a position close to bracket 862, sprockets 876, collar 874 and shaft 804 will rotate in a counter-clockwise direction as shown in FIG. 30 which corresponds to a clockwise direction of rotation as shown in FIG. 32. Two chains are needed, because, as the skilled reader can appreciate, drive chains 860 and 870 can only transmit loads when in tension and can not transmit any forces when in compression. Those skilled in the art will appreciate that the above described components of drive mechanism 850 should be fashioned from steel or other suitable tough strong materials as are typically selected by those skilled in the art for fashioning such components and structures.

Figure 34:
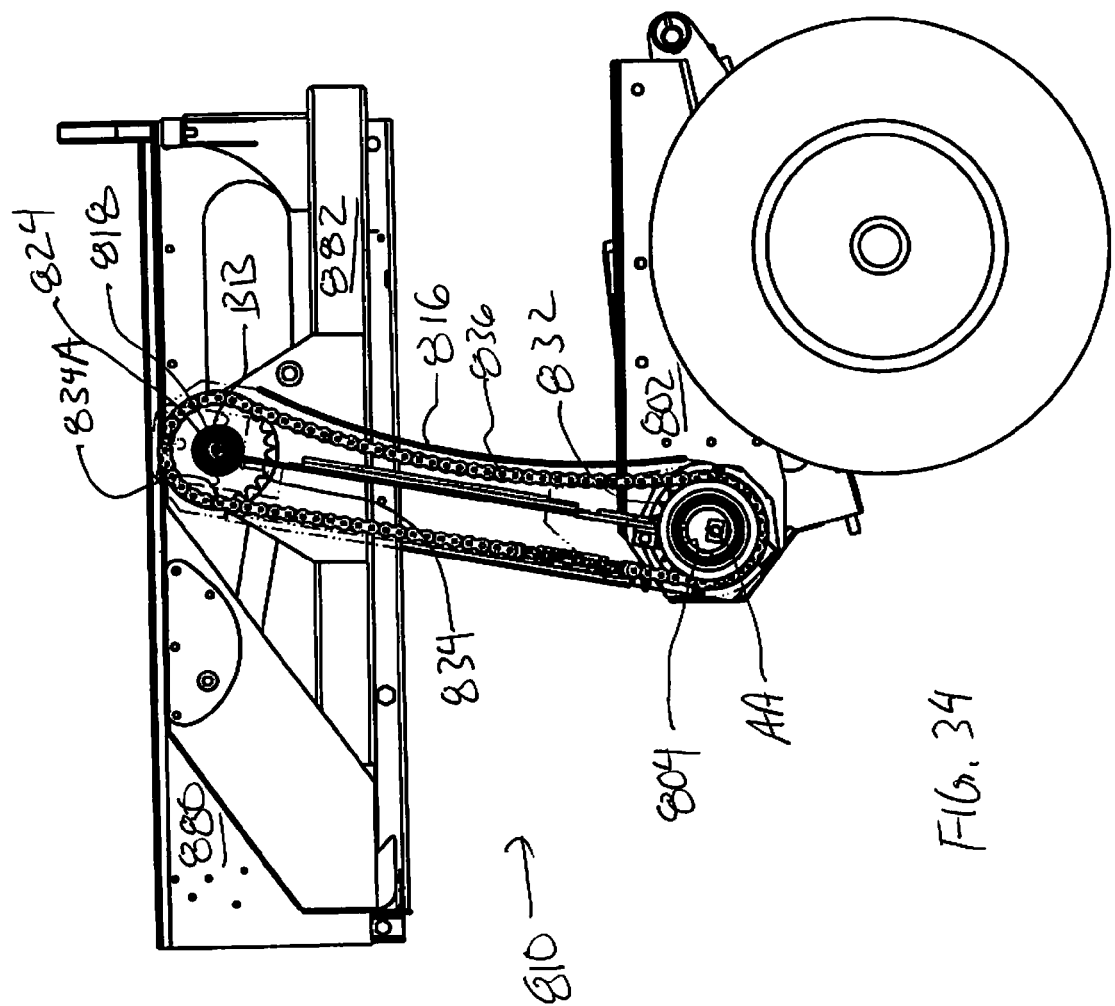
FIG. 34 is a side view showing the third embodiment of the translating cargo bed with the cargo bed in a raised position.
Figure 35:
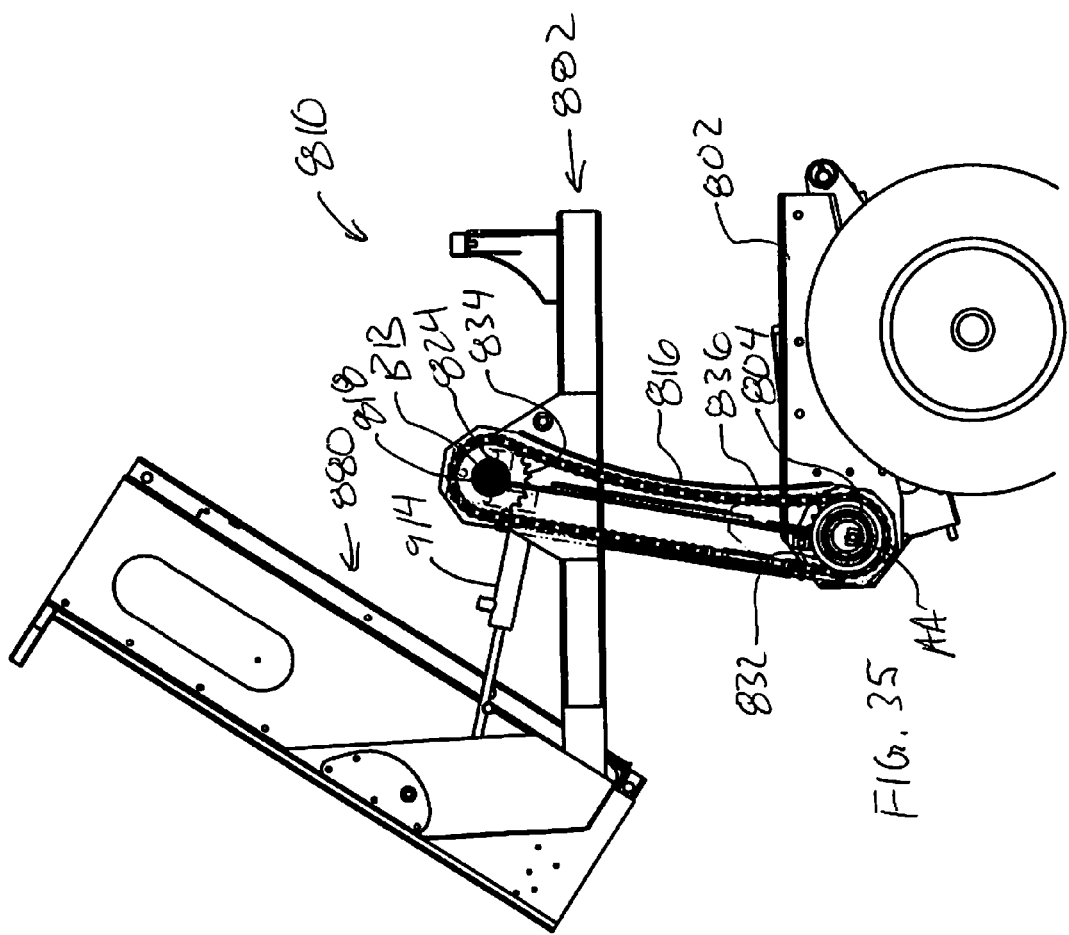
FIG. 35 is a side view showing the third embodiment of the translating cargo bed with the cargo bed support frame in a raised position and with the cargo bed tilted up in a dumping position.
Figure 36:
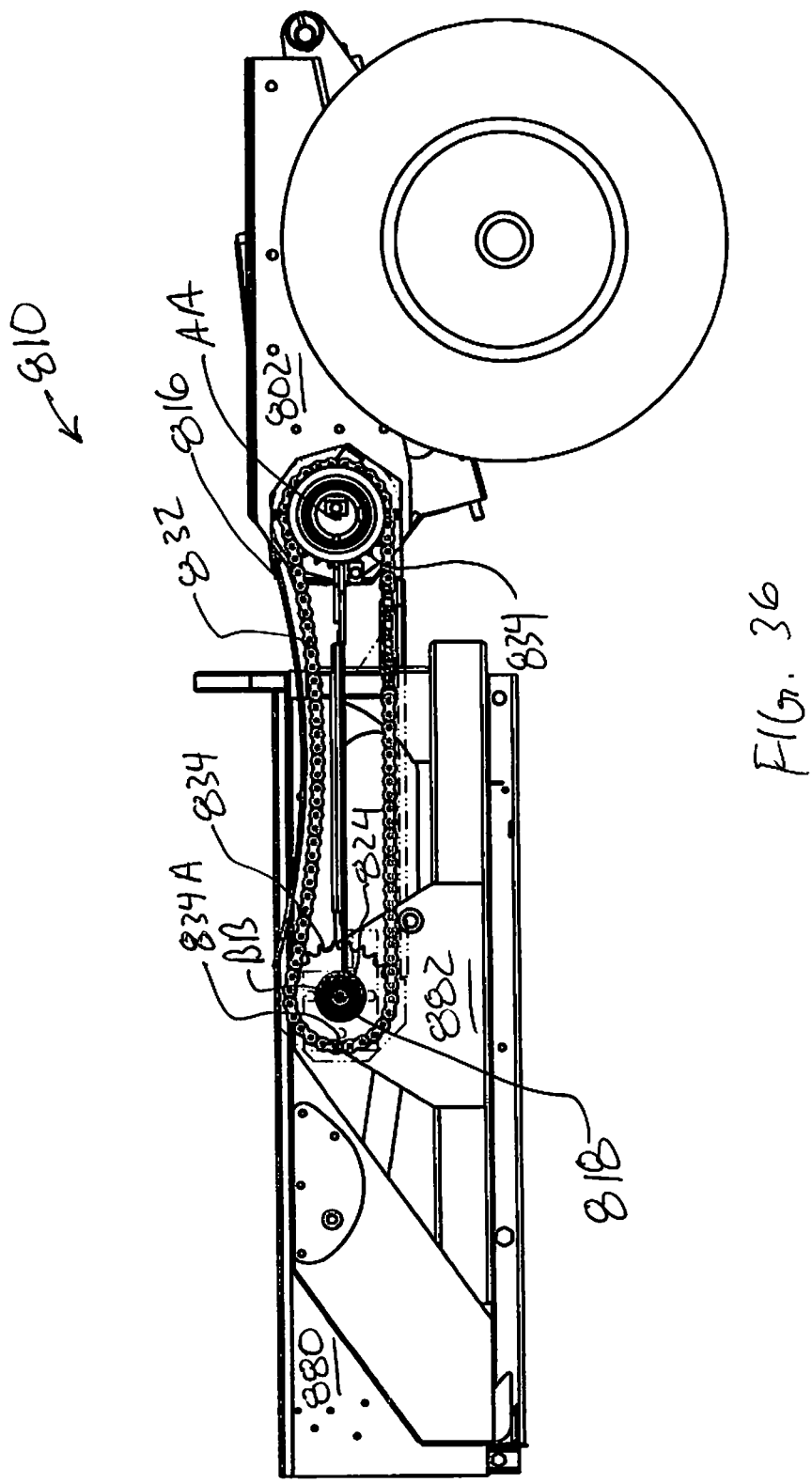
FIG. 36 is a side view showing the third embodiment of the translating cargo bed with the cargo bed in a rearward extended position.
Figure 37:
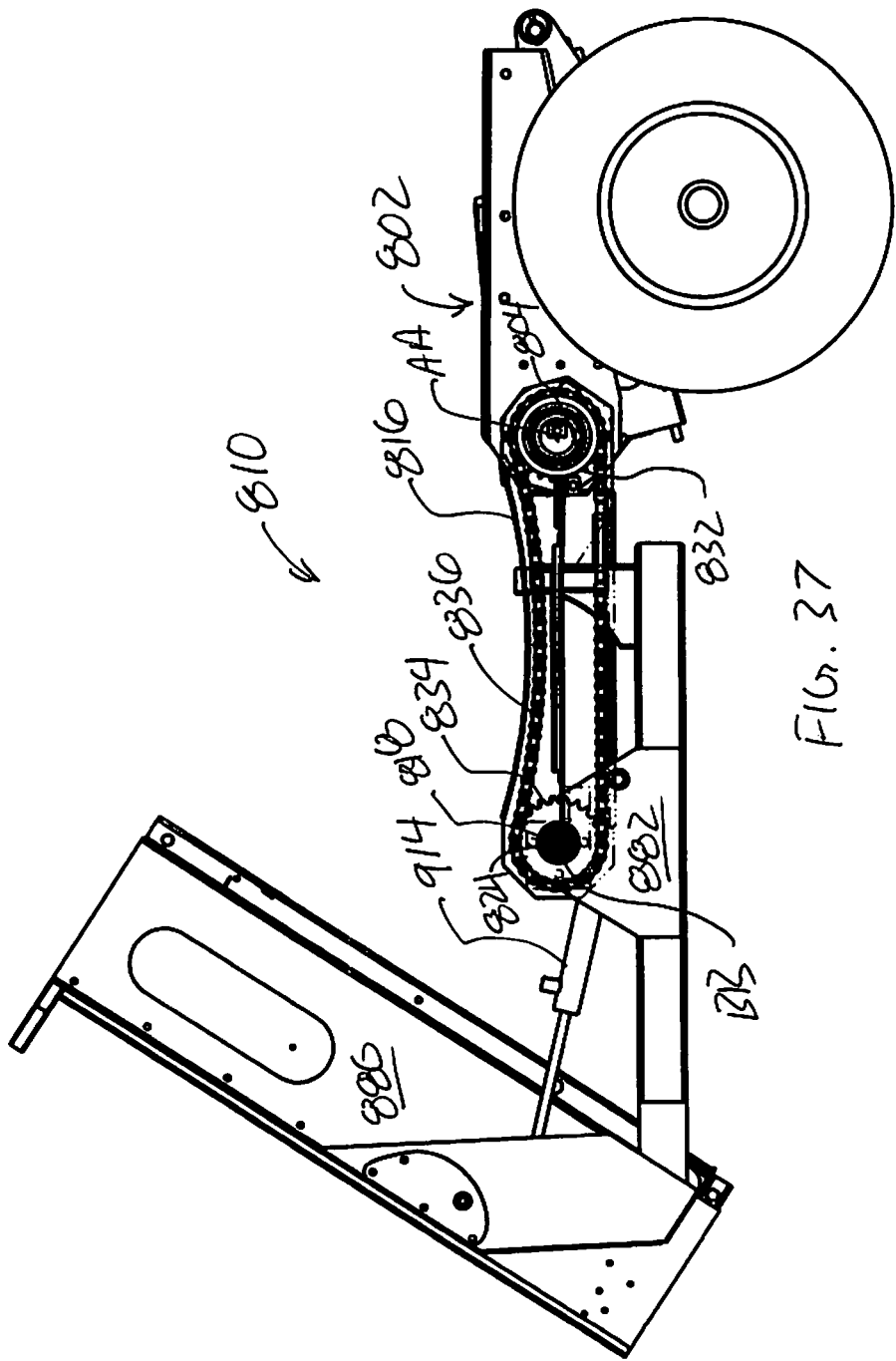
FIG. 37 is a side view showing the third embodiment of the translating cargo bed with the cargo bed support frame in a rearward extended position and with the cargo bed tilted up in a dumping position.
Figure 38:
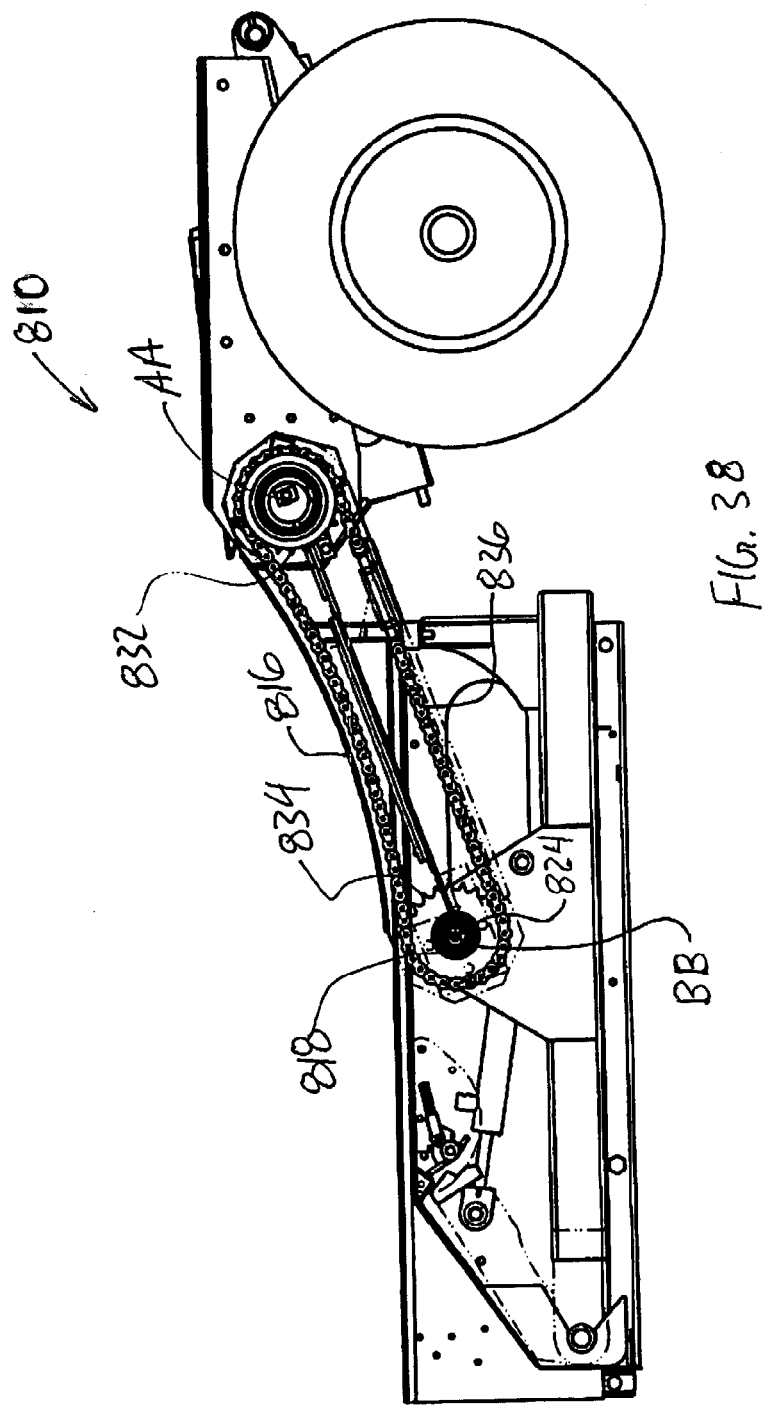
FIG. 38 is a side view showing the third embodiment of the translating cargo bed with the cargo bed in a rearward lowered position.

As has been described and shown with earlier embodiments described above, cargo bed 880 is preferably pivotably mounted to cargo bed sub-frame 882 to permit the tilting and dumping action shown in FIGS. 34 and 38. FIGS. 39-45 illustrate an example dump mechanism 910 and securing components which include components that are operable for releasably securing cargo bed 880 to sub-frame 882 and that are operable for tilting cargo bed 880 with respect to sub-frame 882 between a level, transport position and a tilted position suitable for dumping out the contents of cargo bed 880. The capability of alternately securing and removing a cargo bed make it possible for an operator of a utility vehicle to drop off and pick up cargo beds which are either filled with or emptied of materials or even replace a cargo bed with another item or apparatus such as a sprayer module for spraying herbicides and the like. All that is required is that the substitute apparatus have interfaces that are compatible for sliding onto and securing to sub-frame 882.

Figure 39:
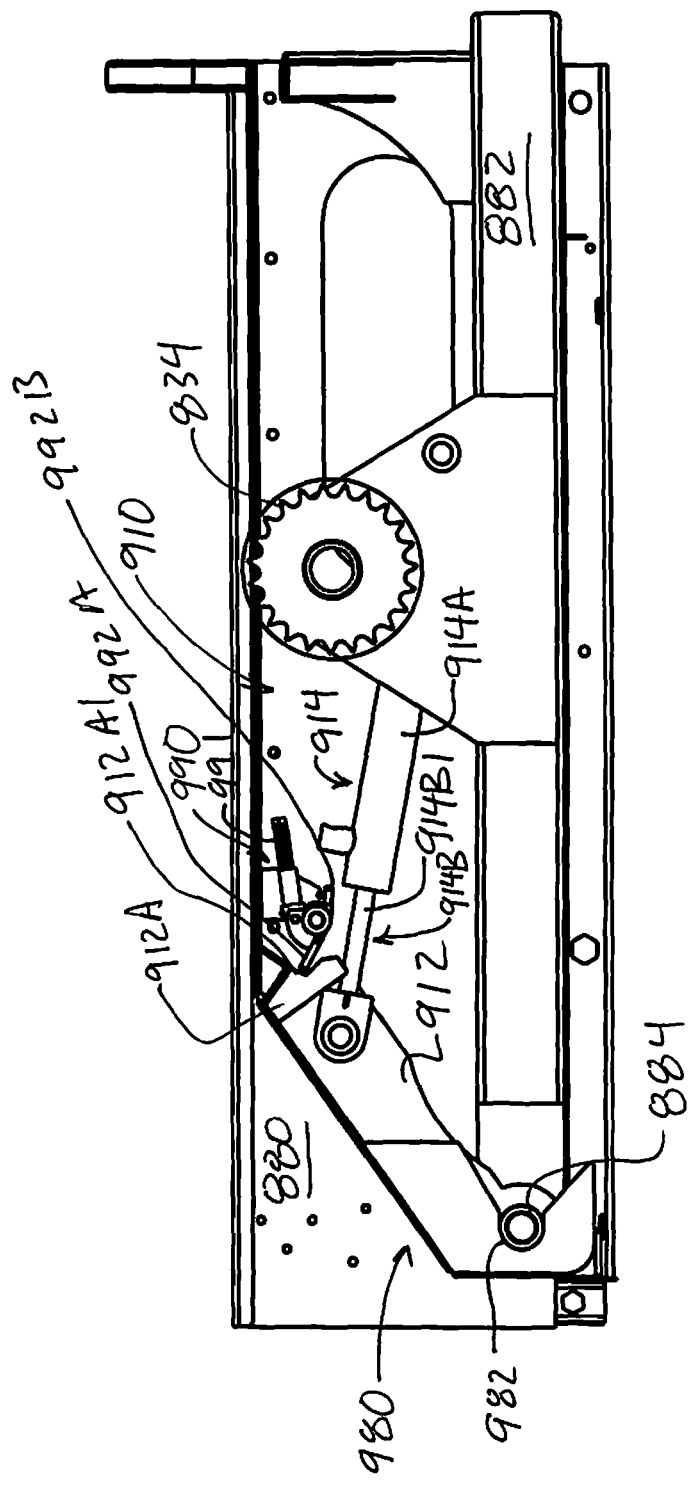
FIG. 39 is a side view showing a cargo bed sub-frame and a cargo bed with a dump mechanism wherein the dump mechanism is latched to the cargo bed such that a pivot arm receiving structure mounted to the cargo bed is receiving a pivot arm of the dump mechanism and a locking tang extending from a latch assembly mounted to the cargo bed is engaging a notch defined in a notch plate mounted to the distal end of the pivot arm of the dump mechanism.

FIGS. 39-45 illustrate an example arrangement for dump mechanism 910. More particularly FIGS. 39-45 show an example arrangement that is operable for removing and replacing cargo bed 880 from sub-frame 882 and that is also operable for tilting cargo bed 880 from a level position to a dumping position. As can be seen in FIG. 39, cargo bed 880 includes a bed tilt mechanism 910. The skilled reader should understand that this description of bed tilt mechanism 910 considers one side of the cargo bed. The skilled reader will appreciate that a practical mechanism will have identical symmetrical structures on both sides of cargo bed 880 and sub-frame 882 of the type that will be described below.

In this example, bed tilt mechanism 910 includes components that are mounted to sub-frame 882 and cooperating components that are mounted to cargo bed 880. First, we will consider the components of bed tilt mechanism 910 that are mounted to cargo bed sub-frame 882. As can be seen in FIG. 39, the portion of bed tilt mechanism 910 mounted to sub-frame 882 includes a pivot arm 912 and a two way linear actuator 914. In this example, linear actuator 914 is a hydraulic cylinder. As can be seen in FIG. 39, the proximate end of pivot arm 912 is pivotably mounted to a short transverse shaft 884 that is fixed to the side of sub-frame 882 near the rear end of sub-frame 882. A notch plate 912A is fixed to the distal end of pivot arm 912. Notch plate 912A presents a notch 912A1. Hydraulic cylinder 914, is a typical two way hydraulic cylinder that includes a cylinder portion 914A and a piston portion 914B with an extending piston rod 914B1. Cylinder portion 914A is pivotably connected at its proximal end to sub-frame 882 toward the front end of sub-frame 882. The distal end of piston rod 914B1 is pivotably connected to the distal end of pivot arm 912. Thus, as piston rod 914B1 is extended and retracted, pivot arm 912 pivots about shaft 884 counterclockwise and clockwise respectively as viewed from the perspective of FIGS. 39-45. The full extension of piston rod 914B1, which is not shown in FIGS. 39-45, will tilt cargo bed 880 to the dumping position shown in FIG. 37.

Figure 40:
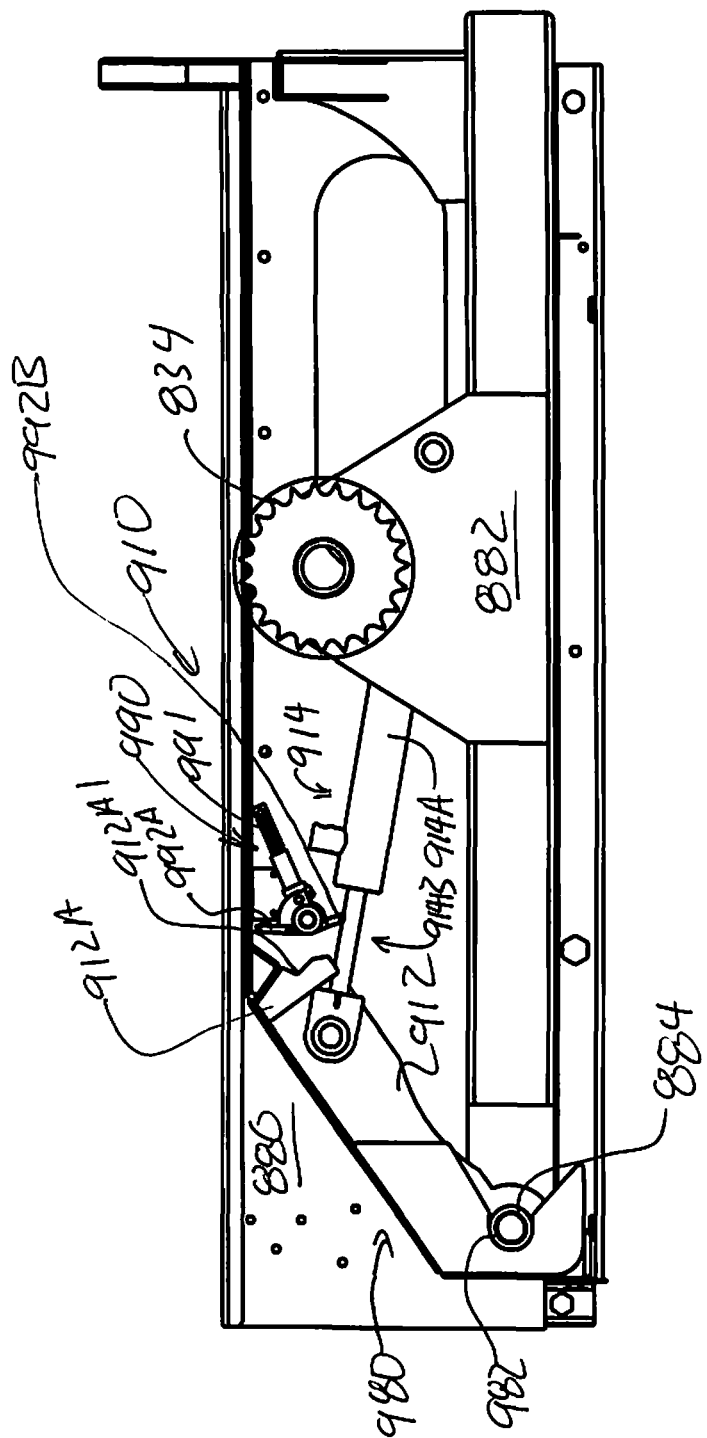
FIG. 40 is a side view showing a cargo bed sub-frame and a cargo bed shown in FIG. 40 wherein the latch assembly is unlatched.
Figure 41:
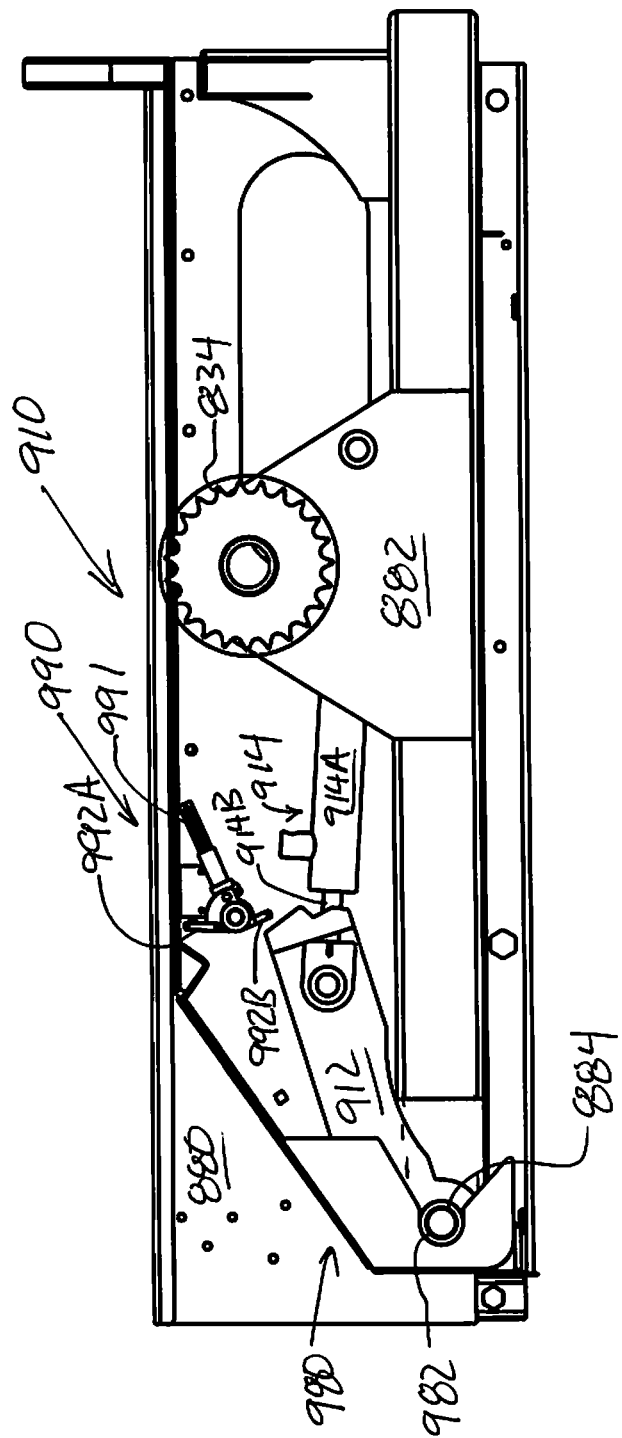
FIG. 41 is a side view showing the cargo bed sub-frame and the cargo bed wherein the latch for securing the cargo bed to the dump mechanism is unlatched and wherein the linear actuator of the dump mechanism is in a retracted position.
Figure 42:
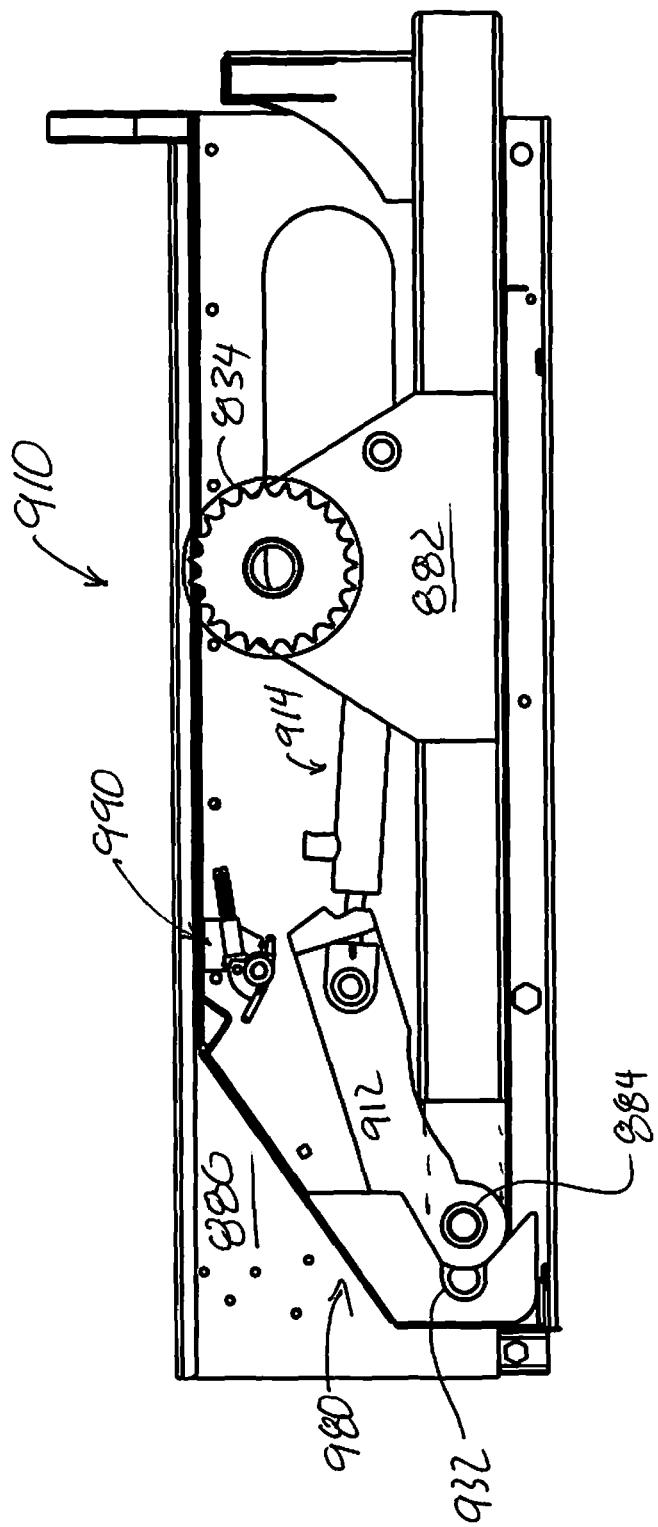
FIG. 42 is a side view showing the cargo bed sub-frame and the cargo bed wherein the latch for securing the cargo bed to the dump mechanism is not engaged, wherein the linear actuator of the dump mechanism is retracted, wherein the cargo bed is partially translated toward a disengaging position for removal of the cargo bed from the sub-frame and wherein a notch plate of a pivot arm of the dump mechanism has contacted a reset tang of the latch assembly thereby pivoting the latch assembly from a unlocked position to a locking position.
Figure 43:
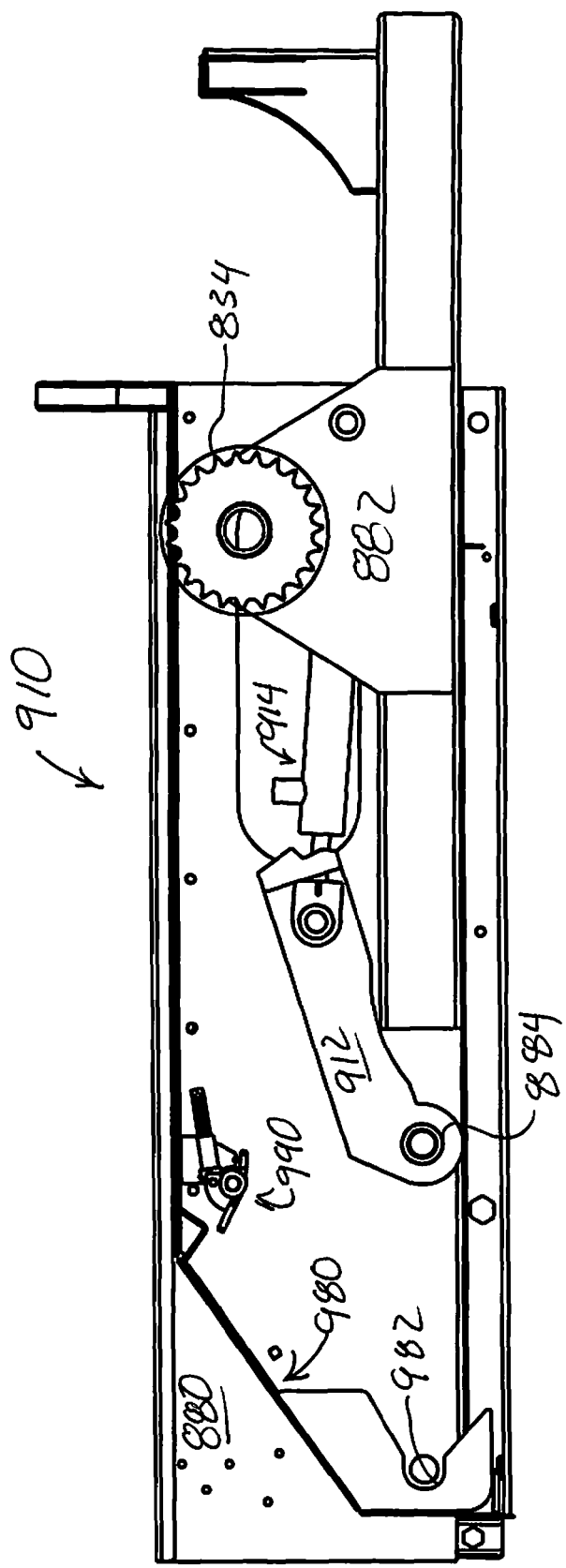
FIG. 43 is a side view showing the cargo bed sub-frame and the cargo bed wherein the linear actuator of the dump mechanism is retracted and wherein the cargo bed is partially translated toward a disengaging position to an extent greater than shown in FIG. 42.
Figure 44:
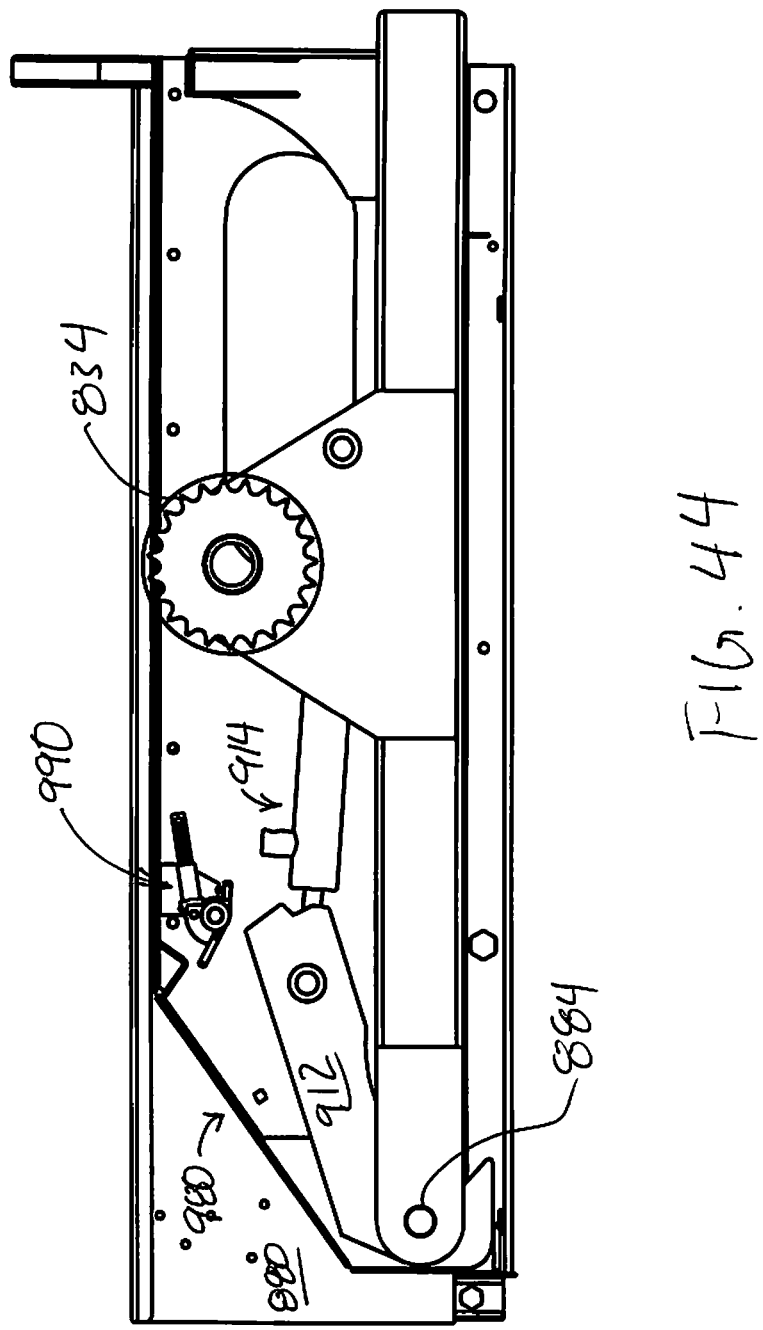
FIG. 44 is a side view showing the cargo bed sub-frame and the cargo bed with a dump mechanism wherein the cargo bed is fully translated to a mounted position with respect to the cargo bed sub-frame, wherein the locking tang of the latch assembly is not engaging the notch plate of the pivot arm of the dump mechanism but is in a locking position to do so and wherein the linear actuator of the dump mechanism is retracted.
Figure 45:
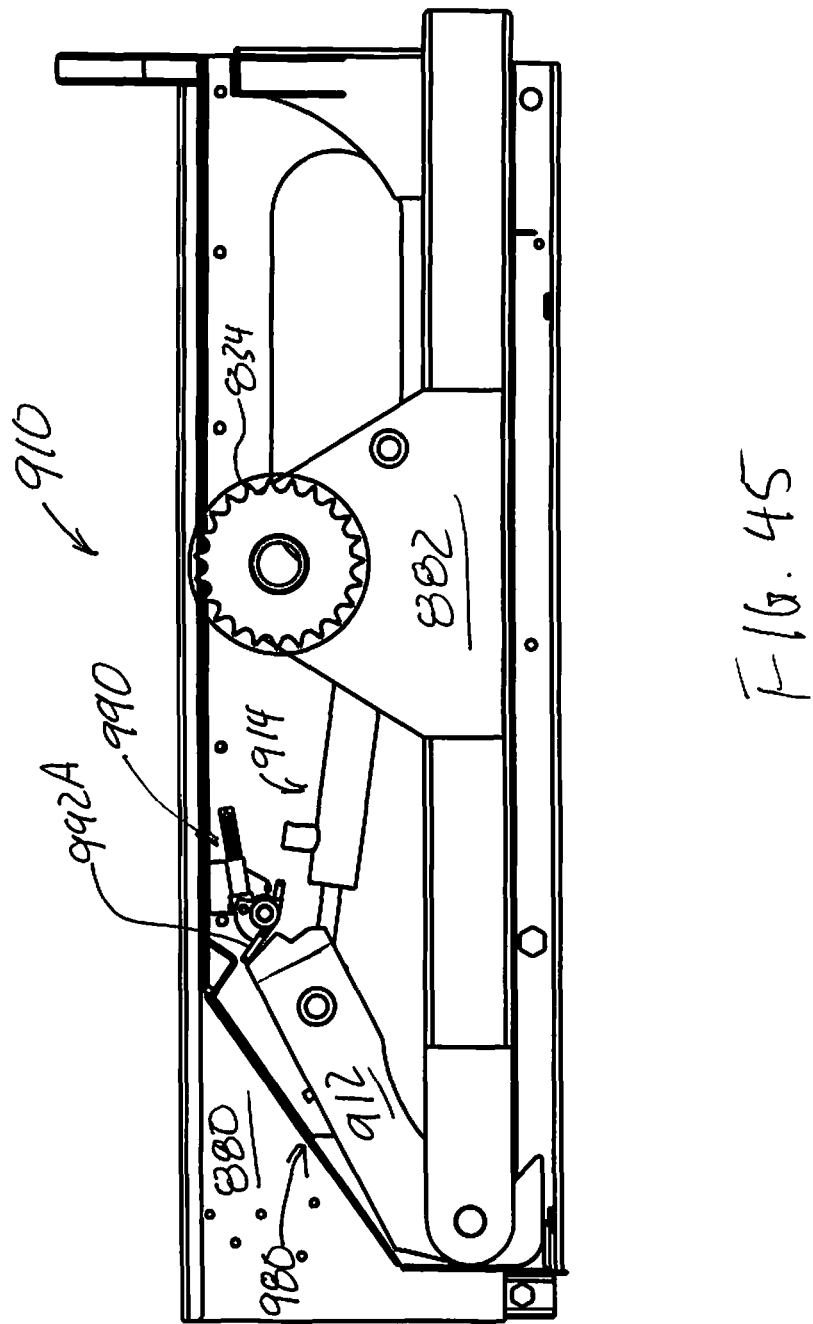
FIG. 45 is a side view showing the cargo bed sub-frame and the cargo bed wherein the cargo bed is fully translated into a mounted position as in FIG. 44, wherein the locking tang of the latch assembly is not engaging the notch plate of the pivot arm of the dump mechanism but is in a locking position to do so and wherein the linear actuator of the dump mechanism is partially extended such that the pivot arm of the dump mechanism is about to be received by the pivot arm receiving portion of the cargo bed and the notch of the notch plate of the pivot arm is about to receive the locking tang of the latch assembly which would thereby secure the pivot arm to the cargo bed as shown in FIG. 39.

Cargo bed 880 includes a pivot arm receiving structure 980 and a latch mechanism 990 that cooperate with the other components of bed tilt mechanism 910 described above. Receiving structure 980 is shaped to receive pivot arm 912 and is operable for transferring loads between pivot arm 912 and cargo bed 880. Further, receiving structure 980 includes a recess 982 at its lower end that is adapted to receive shaft 884 of sub-frame 882. Latch mechanism 990 is operable for selectively engaging notch 912A1 of notch plate 912A which, as noted above, is mounted to the distal end of pivot arm 912. Latch mechanism 990, in this example, is a spring biased over-center arrangement with two nearly opposite tangs, a locking tang 992A and a reset tang 992B. When latch mechanism 990 is in a first locking position so that locking tang 992 engages notch 912A1 as shown in FIG. 39, pivot arm 912 is fixed relative to receiving structure 980 and, in turn, cargo bed 880. With sufficient leverage provided by a handle which is not shown, latch mechanism 990 is rotated against its over-center spring bias in a clockwise direction (as seen from the perspective of FIGS. 30 and 40) from the first locking position to a second unlocked position. When latch mechanism 990 is in the second unlocked position, locking tang 992A is rotated away from notch 912A1 and reset tang 992B is rotated down as shown in FIG. 40. The over center spring bias is also present when latch mechanism 990 is in the second unlocked position thereby tending to hold latch mechanism 990 in the unlocked position. Prior to translating cargo bed 880 away from sub-frame 882, piston 914B is fully retracted as shown in FIG. 41. As can be seen in FIG. 42, as cargo bed 880 is further translated toward a fully translated position appropriate for its disengagement and removal, the upper corner of notch plate 912A bumps the depending end of reset tang 992B. This causes latch mechanism 990 to rotate counter-clockwise (as seen from the perspective of FIG. 42) and reset. Because of the over-center spring pressure applied by spring 991, latch mechanism 990 returns to the first locking position as shown in FIG. 42 (as well as FIGS. 43-45 and 39) and remains in that position. Once cargo bed 880 is in a mounted position with respect to sub-frame 882 as shown in FIG. 44 and when pivot arm 912 is rotated from the retracted position shown in FIG. 44 and through the positions shown in FIGS. 45 and 39 (in the order recited here), notch plate 912A returns to the position shown in FIG. 39 with locking tang 992A1 engaging notch plate 912A thereby fixing pivot arm 912 relative to cargo bed 880. Thus, with pivot arm 912 secured relative to cargo bed 880 as described above, it is once again possible to rotate cargo bed 880 from a level position to a dumping position. Those skilled in the art will appreciate that the above described components of dump mechanism 910 should be fashioned from steel or other suitable tough strong materials as are typically selected by those skilled in the art for fashioning such components and structures.

Figure 47:
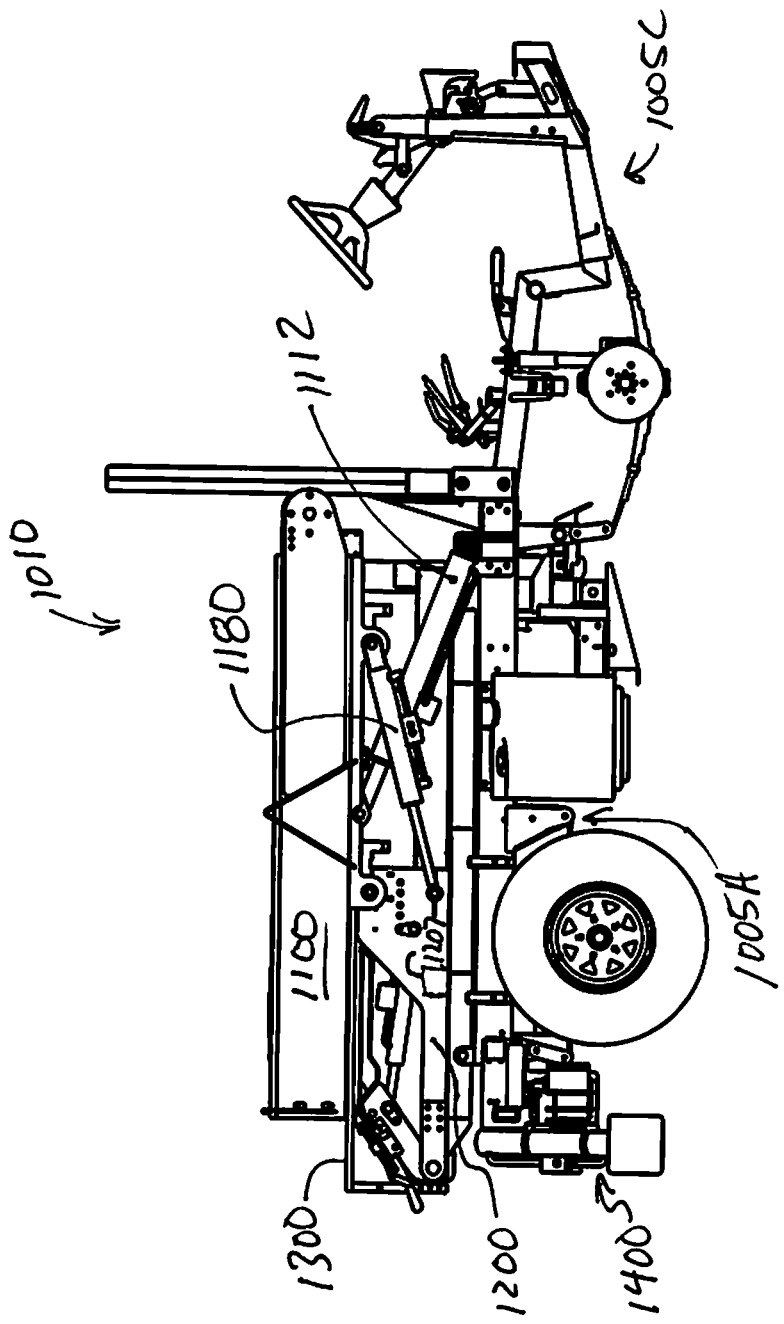
FIG. 47 is a side view of a vehicle including a forth embodiment of a translating cargo bed.
Figure 48:
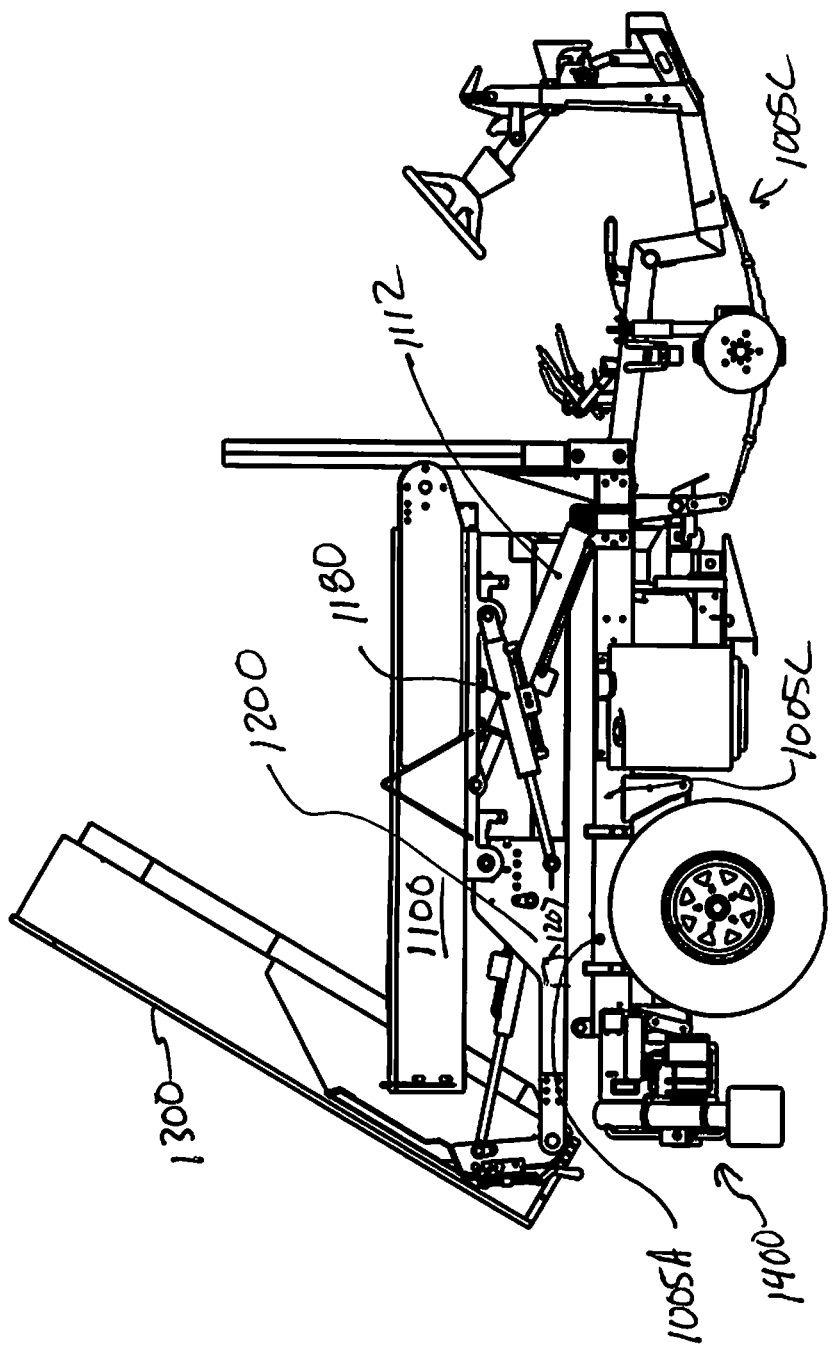
FIG. 48 is a side view of a fourth embodiment of a translating cargo bed shown with the cargo bed tilted in a dumping position.
Figure 49:
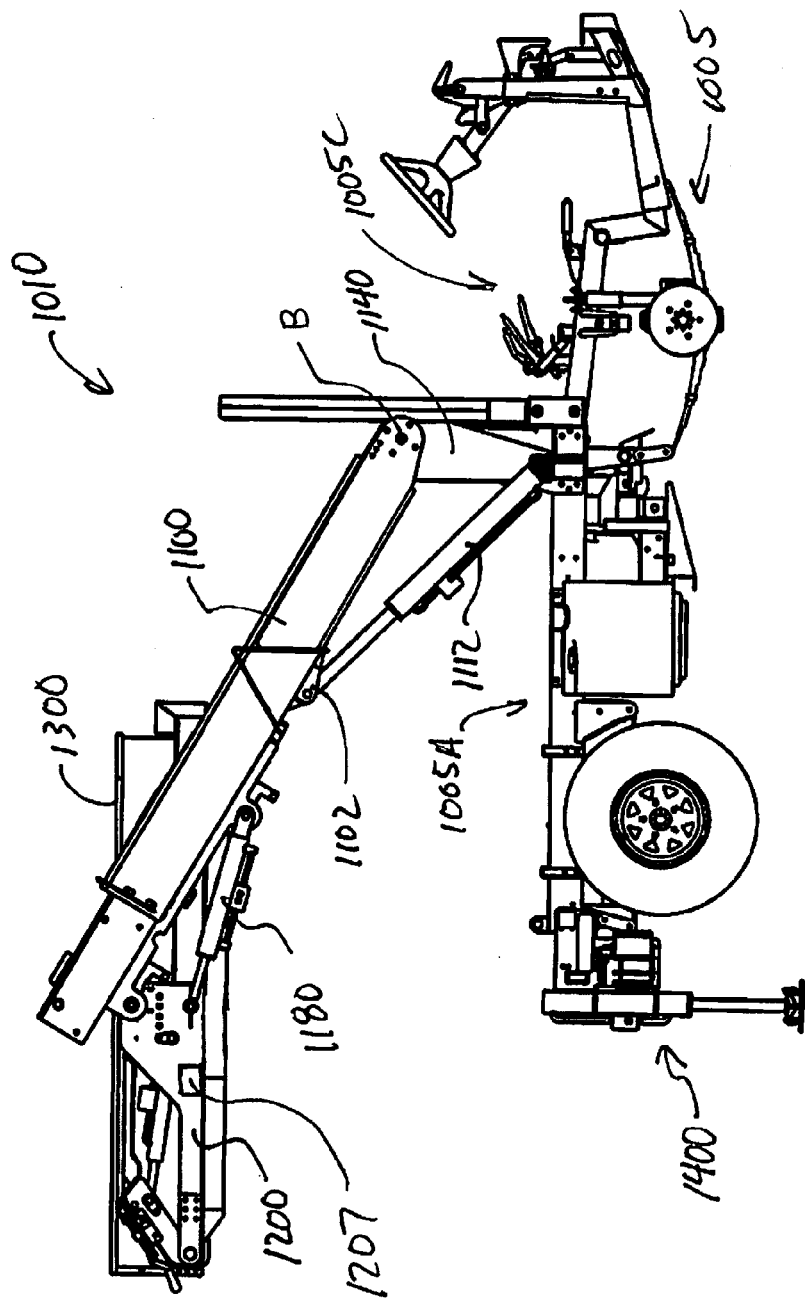
FIG. 49 is a side view of a fourth embodiment of a translating cargo bed shown with the cargo bed partially raised and extended by telescoping arms which are partially raised and partially extended.

FIGS. 46-56A illustrate another embodiment of a translating cargo bed, namely cargo bed apparatus 1010. As can be seen in FIG. 49, translating cargo bed apparatus 1010 is mounted to a vehicle frame 1005. Vehicle frame 1005 includes a cargo bed support portion 1005A and cab support portion 1005C. As can be seen in FIG. 49, translating cargo bed apparatus 1010 includes a pair of telescoping arms 1100, a cargo bed support frame 1200 and a cargo bed 1300.

Figure 46:
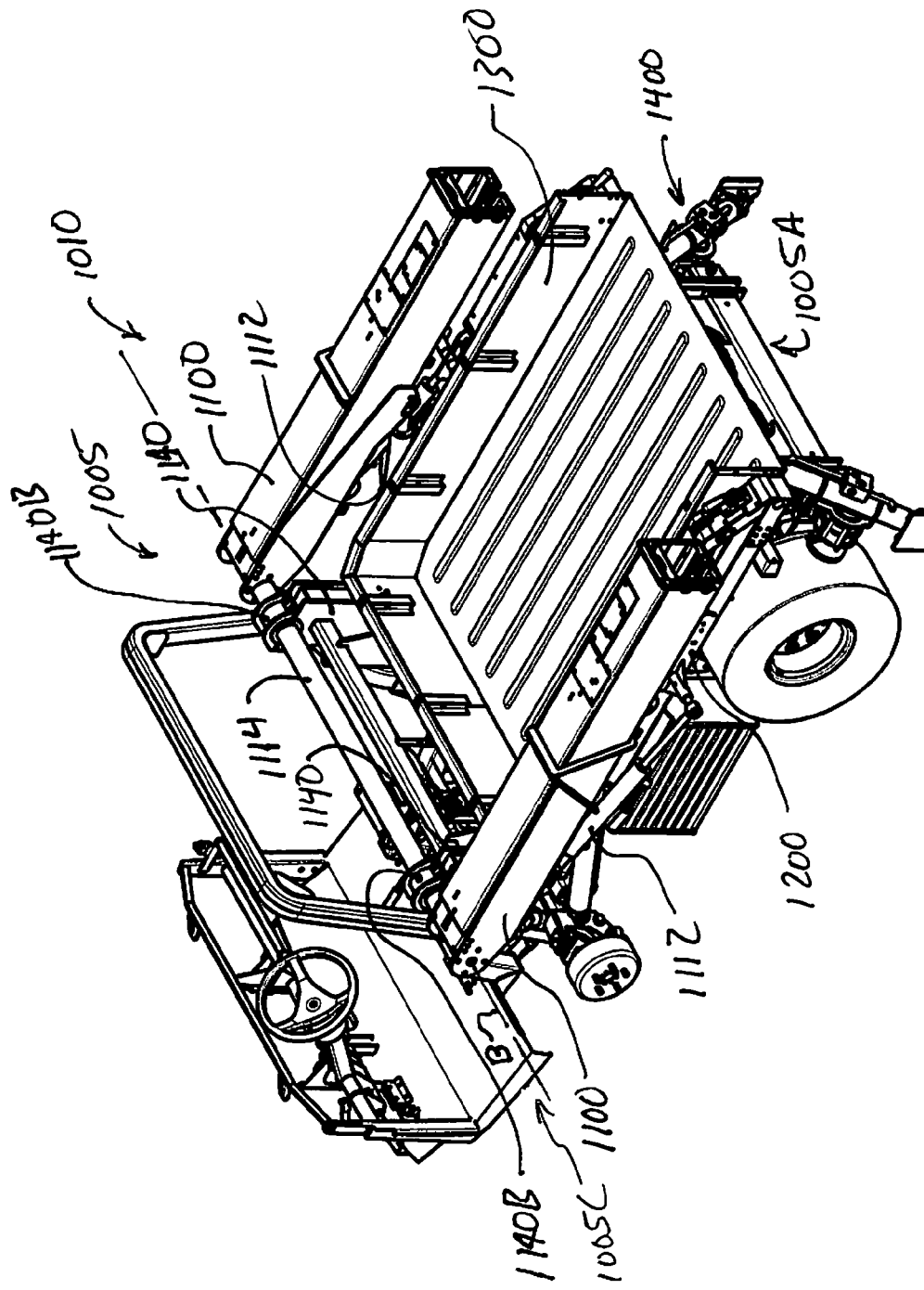
FIG. 46 is a perspective view of a vehicle including a forth embodiment of a translating cargo bed.
Figure 50:
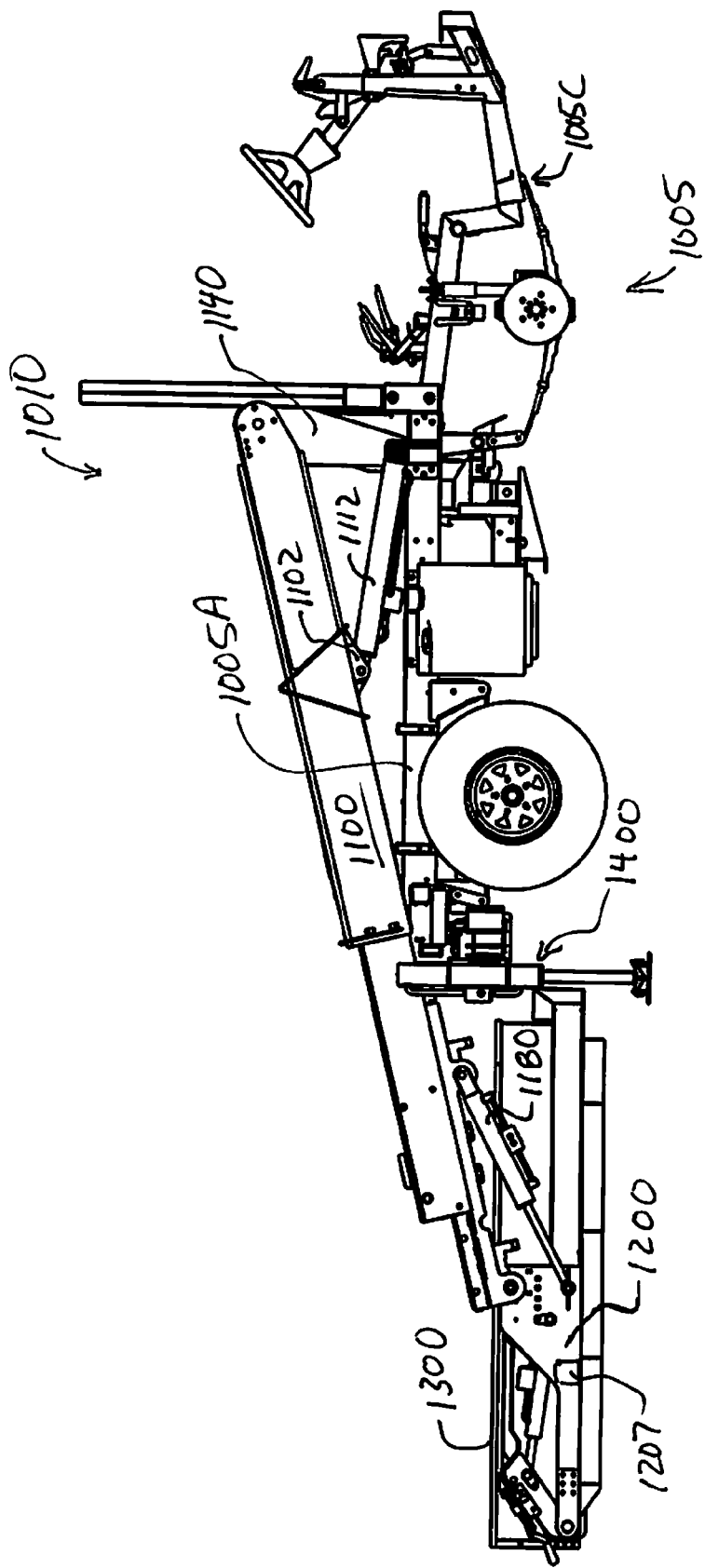
FIG. 50 is a side view of a fourth embodiment of a translating cargo bed shown with the cargo bed placed behind the vehicle by telescoping arms which are fully extended and lowered to place the cargo bed on the ground.

Telescoping arms 1100 are pivotably mounted to cargo bed support portion 1005A of vehicle frame 1005. In this example, telescoping arms 1100 are identical and preferably spaced on opposite sides of cargo bed support portion 1005A. Telescoping arms 1100 are each pivotably mounted to fixed supports 1140. Telescoping arms 1100 are actuated for synchronized pivoting movement by hydraulic cylinders 1112. As shown in FIG. 46, a torque tube 1114 is fixed to the proximate ends of telescoping arms 1100 and extends transversely between the proximal ends of telescoping arms 1100. Accordingly, telescoping arms 1100 are constrained to pivot about a transverse axis B (indicated in FIG. 46) in unison as hydraulic cylinders 1112 are extended and refracted. Each fixed support 1140 presents a bearing 1140B which, in this example, is elevated above cargo bed support portion 1005A for receiving torque tube 1114. Bearings 1140B carry torque tube 1114 as is shown in FIG. 46. In this example, on opposite sides of cargo bed support portion 1005B, each hydraulic cylinder 1112 connects between the base of fixed support 1140 and a lug 1102 fixed to the underside telescoping arm 1100. Lug 1102 is spaced away from the proximate end of telescoping arm 1100. When hydraulic cylinders 1112 are retracted, telescoping arms 1100 are tilted down in the position shown in FIG. 50. This position may also be referred to as a "lowered to the ground position". However, in this example, in order for cargo bed 1300 to be placed in the lowered to the ground position shown in FIG. 50, telescoping arms 1100 are extended as shown in FIG. 50. When hydraulic cylinders 1112 are extended, telescoping arms 1100 are tilted up in the position shown in FIG. 52. Telescoping arms 1100 may also be tilted up and retracted rather than extended as shown in FIG. 52.

Figure 51:
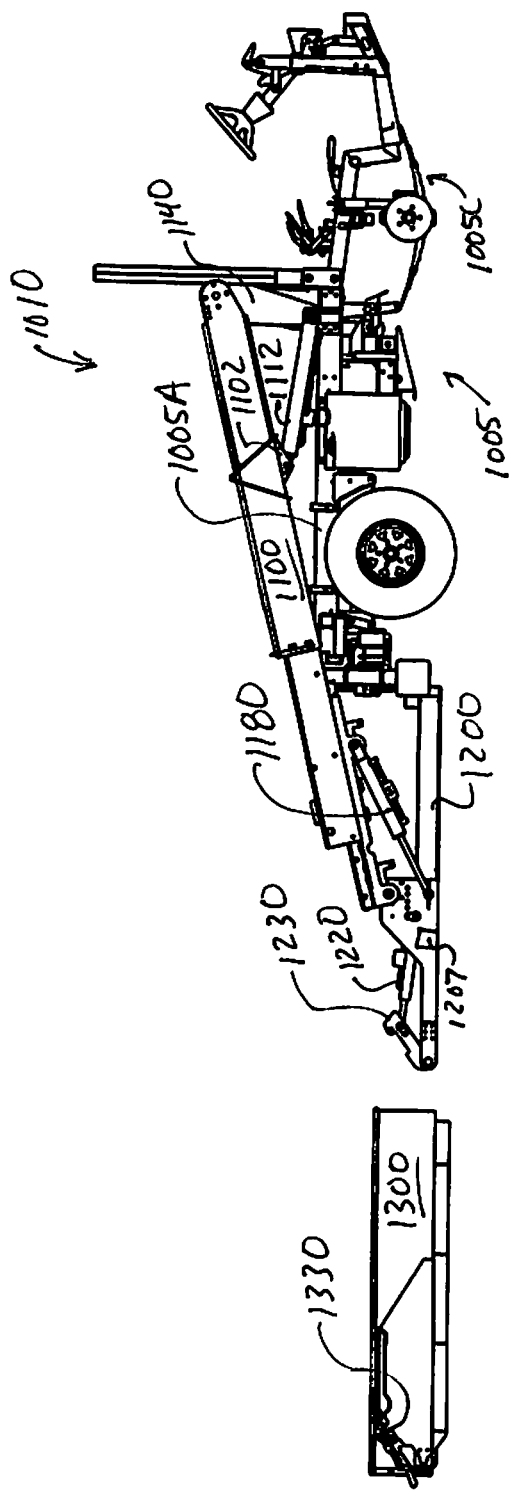
FIG. 51 is a side view of a fourth embodiment of a translating cargo bed shown with the cargo bed placed behind the vehicle by telescoping arms which are fully extended and lowered to place the cargo bed on the ground and with the cargo bed removed from the cargo bed support frame.
Figure 52:
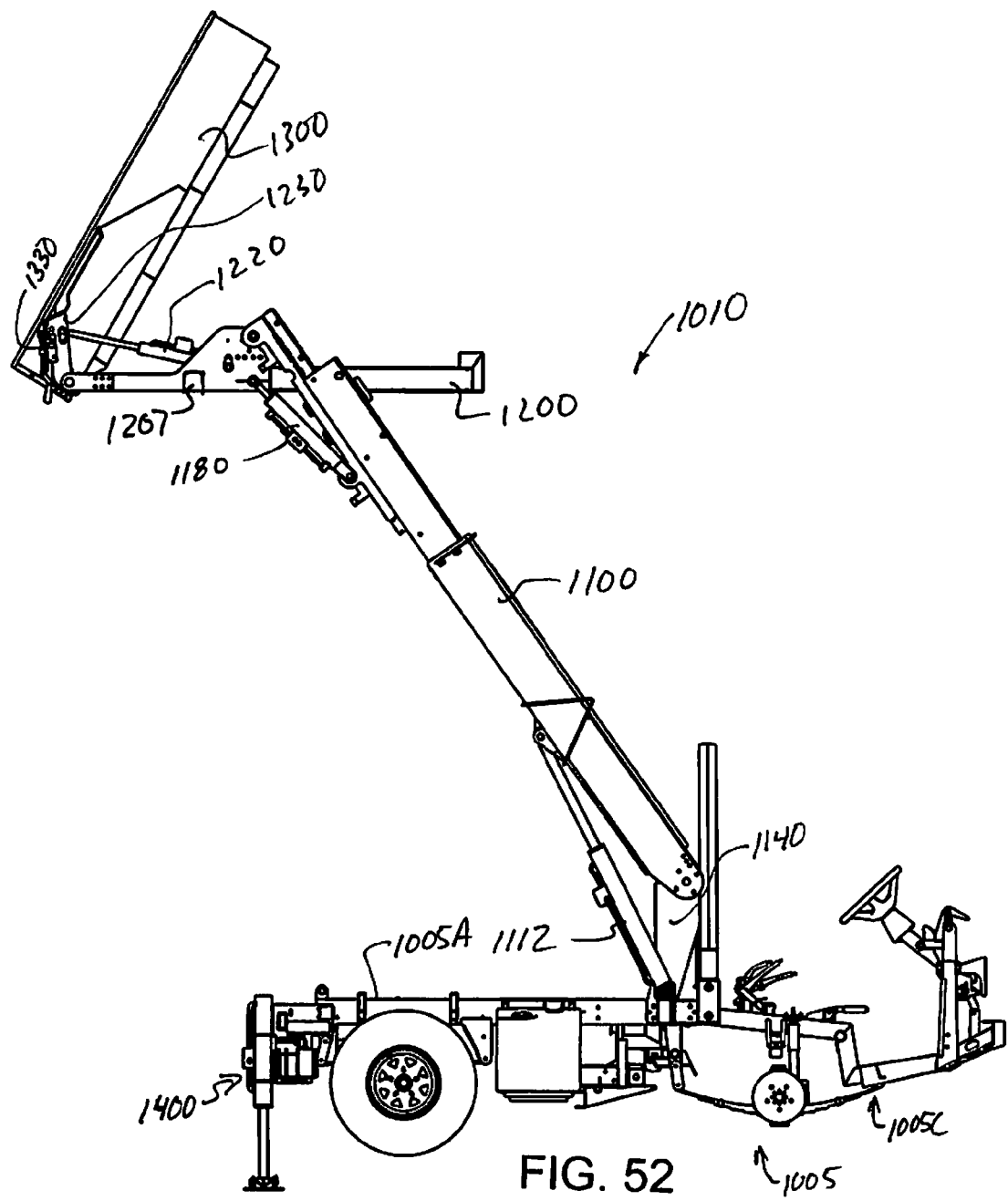
FIG. 52 is a side view of a fourth embodiment of a translating cargo bed shown with the telescoping arms fully extended and fully raised and the cargo bed tilted up in a dumping position.

Each telescoping arm 1100 may be extended from a retracted position shown in FIGS. 46, 47 and 48 to a fully extended position as shown in FIGS. 50, 51 and 52. As can be seen in FIGS. 55, 55A, 56 and 56A, in this example, each telescoping arm 1100 includes a internal powered mechanism operable for extending and retracting the telescoping arm.

As can be seen in FIG. 49, cargo bed support frame 1200 is pivotably mounted to the distal ends of telescoping arms 1100. In this example, an identical pair of hydraulic cylinders 1180 each extend between a lug 1180A which is spaced from the distal end of telescoping arm 1100 and a pivot joint on cargo bed support frame 1200. Hydraulic cylinders 1180 extend and retract in unison in order to maintain cargo bed support frame 1200 in a generally level orientation. As can be best seen in FIG. 52, in this example, a pitch sensor 1207 is fixed to cargo bed support frame 1200. Pitch sensor 1207 generates a signal that corresponds to the angle of cargo bed support frame 1200 with respect to level. The extension and retraction of hydraulic cylinders 1180 is controlled so that pitch sensor 1207 generates a signal which is within predetermined limits. This maintains cargo bed support frame 1200 in a generally level orientation. As can be seen in FIG. 52, hydraulic cylinders 1180 are fully retracted when hydraulic cylinders 1112 are fully extended. Conversely, as can be seen in FIG. 50, hydraulic cylinders 1180 are fully extended when hydraulic cylinders 1112 are fully retracted for lowering cargo bed support frame to a position near the ground. Preferably, hydraulic cylinders 1180 are arranged to operate in unison. Further, a method for insuring the proper parallel or level orientation of cargo bed support frame 1200 as described above would be to slave the movement of hydraulic cylinders 1112 to hydraulic cylinders 1180 in an inverse relationship. However, in order for a master/slave concept to work there would need to be a separate cylinder in addition to cylinders 1112 to act as a master. In this example, a sensor is used to control the orientation of cargo bed support frame 1200.

As can be best seen in FIG. 52, cargo bed 1300 is pivotably mounted to cargo bed support frame 1200 for rotation between a cargo transport position as shown in FIGS. 46, 47 and 49 and a cargo dumping position as shown in FIGS. 48 and 52. Rotating cargo bed 1300 to the cargo dumping position may be accomplished when cargo bed support frame 1200 is retracted and resting on cargo bed support portion 1005A. However, the rotation of cargo bed 1300 to the dumping position may also be accomplished (at any extension or elevation of the telescoping arms range) when telescoping arms 1100 are extended or elevated or extended and elevated as shown in FIG. 52 or extended and downwardly oriented as shown in FIG. 50 or any other combination of telescoping arm extension or elevation including partial degrees of extension and elevation.

In this example, cargo bed 1300 is actuated by two opposite hydraulic cylinders 1220. Hydraulic cylinders 1220 connected between cargo bed support frame 1200 and a latching arm 1230 on each side of cargo bed support frame 1320. Each latching arm 1230 is pivotably connected to the back end of cargo bed support frame 1320. A latching structure 1330 located on each side of cargo bed 1300 is operable to releasably secure cargo bed 1300 to latching arms 1230. When both latching structures 1330 are released, it is possible to slide cargo bed 1300 away from cargo bed support frame 1200 as shown in FIG. 51.

FIGS. 53, 53A, 54 and 54A illustrate a pair of optional lateral stabilizer assemblies 1400 which are mounted at the rear of frame 1005 and may be extended on opposite sides cargo bed support portion 1005A of vehicle frame 1005 at locations which, in this example, are on opposite sides at the extreme back end of vehicle frame 1005. Lateral stabilizer assemblies 1400, when deployed, function to laterally stabilize vehicle frame 1005. In this example, each lateral stabilizer assembly 1400 includes a telescoping lateral portion 1410 and a telescoping upright portion 1440. Each upright portion 1440 is pivotably mounted to the distal end of a respective lateral portion 1410. In this example, each telescoping upright portion 1440 presents a pivoting foot pad 1442 for contacting the ground in a secure and stable manner.

As can be seen in FIGS. 53, 53A, 54 and 54A, lateral portions 1410 of stabilizer assemblies 1400 extend between a first retracted position shown in FIGS. 53 and 53A and an extended position as shown in FIGS. 54 and 54A. Also, as can be seen in FIGS. 53-54A, as lateral portions 1410 extend, upright portions 1440 rotate from an inwardly tilted position shown in FIGS. 53 and 53A to an upright position shown in FIGS. 534 and 54A. As upright portions 1440 rotate to the upright position, upright portions 1440 also extend to the extended position shown in FIGS. 54 and 54A. When lateral portions 1410 and upright portions 1440 are fully extended, foot pads 1442 contact the ground thereby stabilizing vehicle frame 1005. This capability is particularly useful when telescoping arms 1100 are fully raised and extended as shown in FIG. 52.

Accordingly, cargo bed apparatus 1010, provides a cargo bed 1300 which may be placed in elevated positions. Further, when cargo bed 1300 is in an elevated position, it may be used to support, deliver materials or receive materials to or from an elevated location. Moreover, the translating cargo bed of this embodiment may be used to dump material into elevated or difficult to reach locations. Cargo bed 1300 may also be placed in a position on the ground behind the vehicle and even removed or re-installed on its support frame 1200.

It is to be understood that while certain forms of this invention and the above described embodiments have been illustrated and described, it is not limited thereto, except in so far as such limitations are included in the following claims and allowable equivalents thereof.

I claim:

1. A translating cargo bed apparatus for a vehicle having a vehicle frame, the translating cargo bed apparatus comprising:
   (a) a pair of spaced telescoping arms mounted to the vehicle frame, the telescoping arms each having a proximal end and a distal end, the telescoping arms being pivotably mounted to the vehicle frame at their proximal ends, the telescoping arms operable for synchronized extension and retraction between a first retracted position and a second extended position, the telescoping arms also operable for synchronized pivoting motion between a lowered position and a raised position,
   (b) a cargo bed support frame pivotably mounted to the distal ends of the telescoping arms, the motion of the cargo bed support frame controlled such that the cargo bed support frame remains substantially level as the telescoping arms pivot between the lowered position and the raised position,
   (c) a cargo bed pivotably mounted to the cargo bed support frame operable for pivoting movement between a first transport position suitable for carrying material and a second dumping position suitable for dumping material from one end of the cargo bed.

2. The apparatus of claim 1, wherein:
the telescoping arms and the cargo bed support structure are arranged such that when the telescoping arms are extended and tilted downwardly, it is possible to rest the cargo bed support structure on the ground behind the vehicle to permit loading and unloading of items in to and out of the cargo bed.

3. The apparatus of claim 1, wherein:
the cargo bed is removable from the cargo bed support frame.

4. The apparatus of claim 2, wherein:
the cargo bed is removable from the cargo bed support frame.

5. The apparatus of claim 4, wherein:
a latch mechanism secures the cargo bed to the cargo bed support frame when the cargo bed is mounted to the cargo bed support frame.

* * * * *